US007461137B2

(12) United States Patent
Ryan et al.

(10) Patent No.: US 7,461,137 B2
(45) Date of Patent: Dec. 2, 2008

(54) WEATHER INFORMATION DELIVERY SYSTEMS AND METHODS PROVIDING PLANNING FUNCTIONALITY AND NAVIGATIONAL TOOLS

(75) Inventors: Mark Ryan, Atlanta, GA (US); Jody Fennell, Marietta, GA (US); Joe Pearson, Kennesaw, GA (US)

(73) Assignee: The Weather Channel, Atlanta, GA (US)

( * ) Notice: Subject to any disclaimer, the term of this patent is extended or adjusted under 35 U.S.C. 154(b) by 48 days.

(21) Appl. No.: 11/606,565

(22) Filed: Nov. 29, 2006

(65) Prior Publication Data

US 2007/0073841 A1 Mar. 29, 2007

Related U.S. Application Data

(63) Continuation of application No. 09/766,295, filed on Jan. 19, 2001, now Pat. No. 7,185,044.

(60) Provisional application No. 60/254,211, filed on Dec. 8, 2000.

(51) Int. Cl.
*G06F 15/16* (2006.01)
(52) U.S. Cl. .................. 709/217; 709/219; 709/226; 709/229; 715/738; 702/3
(58) Field of Classification Search .............. 709/226, 709/229, 203, 217–219; 715/711–713, 738–739; 702/3
See application file for complete search history.

(56) References Cited

U.S. PATENT DOCUMENTS 4,725,886 A   2/1988   Galumbeck et al.

(Continued)

FOREIGN PATENT DOCUMENTS

EP   0601254   6/1994

(Continued)

OTHER PUBLICATIONS

Petrou, "An XML-based, 3-Tier Scheme for Integrating Hetergeneous Information Sources to the WWW.", Proceedings, International Workshop on Database and Expert Systems Applications, XX, XX, 1999, pp. 706-710, XP002156322 *paragraph (0002); figure 1*.

(Continued)

*Primary Examiner*—Bharat N Barot
(74) *Attorney, Agent, or Firm*—Kilpatrick Stockton LLP

(57) ABSTRACT

A weather system available through the Internet provides for clean and consistent global navigation, brings content close to the consumer, and allows consumers to plan their lives based on the weather. The weather system provides consumers with multiple methods of navigating through the site, including: geographical, categorical/activity-based, localized/contextual, and temporal. These navigation methods are not mutually exclusive but instead are tightly nested to allow consumers to navigate seamlessly through the site, switching from one method to the next. On a local weather page, the information is organized in a hub-and-spoke fashion so that consumers can navigate to interrelated information. The weather system can quickly give consumers the local weather at any location, but also empowers consumers to plan their lives based on the weather. The weather system parses weather information and other data into a database and uses a combination of presentation beans, data beans, and advertisement beans to build pages that are delivered to the consumers. Business logic is incorporated into the beans to allow the system to select content and displays based on the consumer, the consumer's product, network, geography, weather, co-brand, language, and locale.

17 Claims, 48 Drawing Sheets

U.S. PATENT DOCUMENTS

| | | | |
|---|---|---|---|
| 4,916,539 | A | 4/1990 | Galumbeck |
| 5,140,419 | A | 8/1992 | Galumbeck et al. |
| 5,654,886 | A * | 8/1997 | Zereski et al. ............... 702/3 |
| 6,018,699 | A | 1/2000 | Baron et al. |
| 6,236,330 | B1 | 5/2001 | Cohen |
| 6,356,905 | B1 | 3/2002 | Gershmann et al. |
| 6,360,172 | B1 | 3/2002 | Burfeind et al. |
| 6,427,101 | B1 | 7/2002 | Diaz et al. |
| 6,498,987 | B1 | 12/2002 | Wilt et al. |
| 6,542,825 | B2 | 4/2003 | Jones et al. |
| 6,590,529 | B2 | 7/2003 | Schwoegler |
| 6,816,878 | B1 * | 11/2004 | Zimmers et al. ............ 709/217 |
| 6,871,137 | B2 * | 3/2005 | Scaer et al. ................ 709/219 |
| 7,185,044 | B2 * | 2/2007 | Ryan et al. ................. 709/200 |
| 7,275,089 | B1 * | 9/2007 | Marshall et al. ............. 709/219 |
| 2001/0003846 | A1 | 6/2001 | Rowe et al. |

FOREIGN PATENT DOCUMENTS

| | | |
|---|---|---|
| JP | 10-332840 | 12/1998 |
| WO | 98/15122 | 4/1998 |

OTHER PUBLICATIONS

Chakravarty, Dipto et al., "Solution for the Internet and the Enterprise, Building Rich-media Digital Asset Management Systems with XML," .artesia.com/info_xml, Jan. 21, 2001, pp. 1-9.

Chakravarty, Dipto, "Rich Media Storage, Solving High-end Storage Demands for Rich-media Assets," .artesia.com/info_storage.html, Jan. 21, 2001, pp. 1-5.

"Application Development Using Interwoven," Version 1.1, Interwoven, Inc., pp. 1-11, no date.

"Comprehensive Personalization and Content Management," Version 1.1, Interwoven, Inc., pp. 1-9, no date.

"Databases and File Systems on the Web," Version 1.3, Interwoven, Inc., pp. 1-10, no date.

"Next Generation Management, File Systems and Databases - The Hybrid Architecture," .Interwoven.com/developer/products/hybric_arch.html, Nov. 7, 2000, pp. 1-3.

"Time-to-Web is Everything, Secure your Future with Interwoven," .Interwoven.com/customers, Dec. 12, 2000, pp. 1-2.

"Content Replication and Syndication," Version 1.3, Interwoven, Inc., pp. 1-8.

"Content Replication and Syndication, Mobilizing for the Content Explosion," .Interwoven.com/developer/products/replication.html, Nov. 7, 2000, pp. 1-5.

"Interwoven Customers," .Interwoven.com/customers/customers.html, Dec. 12, 2000, pp. 1-3.

"My Local Page," .accuweather.com/adcbin/index, Feb. 22, 2000, pp. 1-2.

"Welcome to WeatherPager?," .weatherpager.com, Feb. 22, 2000, p. 1.

"Welcome to WeatherPager?," .accuweather.com/www/vol5/weatherpager/features.html, Feb. 22, 2000, pp. 1-4.

"AccuData(r) - The World's Largest Weather Database," .accuweather.com/wx/accudata/index/htm, Feb. 22, 2000, pp. 1-2.

"Welcome to AccuWeather Direct (tm)," \\direct.accuweather.com/, Feb. 22, 2000, pp. 1-2.

"Sign Up For AccuWeather Direct (tm)," \\direct.accuweather.com/ewxsignup/signup, Feb. 22, 2000, p. 1.

"AccuWeather Direct (tm) Sample Products," \\direct.accuweather.com/eweather/samplesind.htm, Feb. 22, 2000, p. 1.

"Sign Up for AccuWeather Direct (tm),"\\direct.accuweather.com/eweather/terms.htm, Feb. 22, 2000, pp. 1-3.

"About AccuWeather Direct (tm),"//direct.accuweather.com/eweather/about.htm, Feb. 22, 2000, p. 1.

"AccuWeather Direct (tm),"direct.accuweather.com/eweather/sample.htm, Feb. 22, 2000, p. 1.

Webpage,.wunderground.com/about/adinfo.asp, dated May 8, 1999 by the Wayback Machine, http://www.archive.org/web/web.php.

AccuWeather.com, dated Oct. 13, 1999 by the Wayback Machine, .archive.org.web/web.php.

"Accuweather.com, Affiliate Opportunities, Advertising. "Webpage dated May 11, 2000 by the Wayback Machine, archive.org/web/web.php.

Melendez, W.A., et al., "The Upper Layers of the ISO/OSI Reference Model (Part II)", Computer Standards and Interfaces, Elsevier Sequoia. Lausanne, CH, vol. 5, No. 2, 1986, pp. 65-77, XP000814414 ISSN: 0920-5489 * paragraph (02.2); fig. 2.1*.

Helal, S. et al., "A Three Tier Architecture for Ubiquitous Data Access." Computer Systems and Applications, ACS/IEE International Conference ON, 2001 Beirut, Lebanon, Jun. 25-29, 2001, Los Alamitos, CA, USA IEEE Comput. Soc., US, Jun. 25, 2001, pp. 177-180, XP010551207 ISBN: 0-7695-1165-1 *paragraph (0002); figure 1*.

Stevens, L. "Consider Three-Tier Client/Server." Datamation, Technical Publishing Co. Barrington, US, vol. 42, No. 4, Feb. 15, 1996, pp. 61-62, XP001179561 ISSN: 0011-6963 *the whole document*.

Harack, Tom. "Harnessing the Weather." Published in GolfBusiness Magazine, Sept. 2004. golfbusinessmagazine.com/pagereview.asp?doc=1114.

"Climatology." Published by Longitudes Group., 2003, longitudesgroup.com/climate.html.

* cited by examiner

| 7 Day Forecast for Dallas, TX 75201 | | | | | | |
|---|---|---|---|---|---|---|
| as reported at Dallas, TX. Last updated Monday, July 17, at 1:10 PM Central Daylight Time (2:10 PM EDT) | | | | | | |
| TODAY | MON | TUE | WED | THU | FRI | SAT |
| JUL 16 | JUL 17 | JUL 18 | JUL 19 | JUL 20 | JUL 21 | JUL 22 |
| Sleet | Scattered T-Storms | Isolated T-Storms | Hazy | Foggy | Partly Cloudy | Light Rain |
| hi 101° F | hi 101° F | hi 101° F | hi 101° F | hi 101° F | hi 101° F | hi 101° F |
| lo 82° F | lo 82° F | lo 82° F | lo 82° F | lo 82° F | lo 82° F | lo 82° F |
| UV Index - 7 | UV Index - 7 | UV Index - 7 | UV Index - 7 | UV Index - 7 | UV Index - 7 | UV Index - 7 |

FIGURE 4

| 10 Day Forecast for Paris, France | | | | | | |
|---|---|---|---|---|---|---|
| as reported at Paris, France. Last updated Monday July 17, at 7:10 PM Europe Standard Time (July 17, 2:10 PM ET) | | | | | | |
| SUN | MON | TUE | WED | THU | FRI | SAT |
| JUL 16 | JUL 17 | JUL 18 | JUL 19 | JUL 20 | JUL 21 | JUL 22 |
| Sleet | Scattered T-Storms | Isolated T-Storms | Hazy | Foggy | Partly Cloudy | Light Rain |
| hi 101° F | hi 101° F | hi 101° F | hi 101° F | hi 101° F | hi 101° F | hi 101° F |
| lo 82° F | lo 82° F | lo 82° F | lo 82° F | lo 82° F | lo 82° F | lo 82° F |
| UV Index - 7 | UV Index - 7 | UV Index - 7 | UV Index - 7 | UV Index - 7 | UV Index - 7 | UV Index - 7 |

WEATHER INFORMATION DELIVERY SYSTEMS AND METHODS PROVIDING PLANNING FUNCTIONALITY AND NAVIGATIONAL TOOLS

RELATED APPLICATIONS

This application is a continuation of, claims priority to, and incorporates by reference, application Ser. No. 09/766,295 filed Jan. 19, 2001, now U.S Pat. No. 7,185,044 and entitled "Weather Information Delivery Systems and Methods Providing Planning Functionality and Navigation Tools," which claims priority to and incorporates by reference provisional application Ser. No. 60/254,211 filed on Dec. 8, 2000, entitled "Weather Information Delivery Systems and Methods Providing Planning Functionality and Navigation Tools."

FIELD OF THE INVENTION

The present invention relates to systems and methods for providing weather information through the Internet and, more particularly, to systems and methods for providing weather information which adopt new navigational tools and new planning functionality.

BACKGROUND

Weather sites are some of the most popular, if not the most popular, visited sites on the Internet. Weather affects our daily lives and it is no surprise that people use the Internet to obtain weather information. Consumers of weather information generally fall into three categories: weather enthusiasts who genuinely have an interest in weather itself, weather planners who use weather information in planning their daily lives, and those consumers who view weather as a commodity.

The conventional approach in providing weather information to all consumers is a publishing model. According to this publishing model, weather data gathered and accumulated from various sources is processed to generate the local weather conditions and in generating local forecasts. The local conditions and forecasts are then assembled into web pages for each city or location. A consumer visiting a weather site on the Internet can then enter a city or a zip code and obtain the local forecast and current conditions for that city. This conventional approach in publishing weather information is therefore highly structured along the city pages.

Weather sites, such as weather.com operated by The Weather Channel, are relatively well-suited to meet the needs of the consumers who view weather as a commodity. These consumers can go to the site, enter their city or zip code, and quickly obtain the information they desire. Weather.com goes one step farther and has a "Customize My Weather" option whereby consumers can specify the local forecasts and other weather information they desire.

The publishing model for weather information, on the other hand, is generally ill-suited to satisfy all the needs of the weather enthusiasts and also of the weather planners. Weather.com has content on its site that addresses the needs of weather planners and also the weather enthusiasts. For example, for the weather enthusiasts, weather.com has a link "learn more" where consumers can learn more about the science behind the weather and about weather safety. For the weather planners, weather.com has "Weather and . . . " links to such things as financial forecasts, fall foliage, travel, health, golf, driving, outdoors, home and garden, events, aviation, and school day. For example, in selecting the golf link, a consumer can obtain news on golf tournaments or see weather information that may be of interest to golfers, such as lightning strikes, current temperatures, and other maps. When a consumer selects the aviation link, the consumer can obtain weather information that is of interest to aviators, such as wind conditions, jet stream forecast, and other maps. When selecting the events link, consumers can view weather information of interest to outdoor events, such as thunderstorm forecast, rainfall forecast, and temperature conditions across the country.

The weather sites on the Internet are generally focused on providing weather information and have limited content for the weather planners or enthusiasts. Furthermore, consumers generally have to go through several layers of navigation before reaching weather information that is useful for planning purposes. As is evident from the examples given above, the weather information that is available for planning purposes is generally a subset of weather information that may be of interest for planning an event or activity. Some of the weather sites are therefore cumbersome and complicated to use for weather planning purposes.

A need therefore exists for weather sites that can still satisfy the desires of the consumers who view weather as a commodity yet provide better service to the weather enthusiasts and weather planners. In some ways, the needs of the weather planners and enthusiasts are counter to those who view weather as a commodity. For those who view weather information as a commodity, these consumers want to be able to go to a site and quickly and easily obtain weather information for a particular location or region. In contrast, the weather planners and enthusiasts want more information and content available through the site. The weather sites have had difficulty in meeting the needs of the weather enthusiasts and planners since this would entail generating additional pages each hour, which would be in addition to the millions of pages are already being generated each hour for city pages.

SUMMARY

The invention addresses the problems above by providing systems and methods for delivering weather information which preferably adopt new navigational tools and planning functionality. The preferred system adopts a clean, simple, and consistent global navigation and brings deep content closer to the consumer. The system also provides consumers with functionality that allows them to better plan their lives around the weather.

In a preferred embodiment, the system is designed so that the consumer can navigate through multiple methods, which are tightly nested to each other and are not mutually exclusive. These preferred navigational methods include geographical, categorical-activity-based, and localized-contextual. Additionally, the system allows consumers to navigate temporally, such as by year, month, day, or even by hour. The system adopts a geographical architecture that allows the consumer to "drill down" from higher-level geography to a lower-level geography. The system has information organized by category/activity whereby consumers can search by category information or activity, such as maps or news center. The localized/contextual architecture of the system has information organized in a hub-and-spoke fashion such that the consumer can access any page from any other page in that grouping.

Another way in which consumers can navigate or use the system is through a What/Where tool. With this tool, consumers can enter a city, zip code, or other geographical division in a "Where" portion of the tool and by default will receive the local weather forecast for that geographical division. The consumer, however, has the ability to change the "What" part of the tool to do something other than get a local forecast. As one example, the consumer can plan for golf and then specify a geographical division in the "Where" portion of the tool. Other options that the consumer can select from, or input, include Plan for ski, Plan for travel, Plan for health, Plan for gardening, etc.

The system also provides the consumers with a map navigator. The maps are organized into categories and into a plurality of collections within each category. For instance, under Popular maps, one collection might be maps showing the current surface conditions. The maps are further organized into families such that any current map may be part of a family of maps, such as maps of different sizes or resolution.

The system of the invention preferably provides a clean, simple, and consistent interface to the consumer. The home page preferably has the What/Where tool to allow the consumer to jump quickly to a desired local weather forecast or to input another request in the "What" portion of the tool. The home page, as well as all other pages within the site, preferably has a global navigation section which allows consumers to easily find a desired section of the site. The interface also preferably has information organized in a tabular format, such as information placed within a home page tab, local weather tab, climatology tab, maps tab, and my weather tab. The home page preferably also has a map navigator, links to activities, as well as links to other portions of the site or related sites. The consumer can therefore use the global navigation, the tabs, the links on each tab, or the various navigational tools, such as the map, temporal, and What/Where tool to navigate to a desired portion of the site.

The preferred architecture for the system is separated into four layers: a presentation layer, control layer, application layer, and data access layer. The presentation layer is a front end portion which controls the look and feel and delivers results to the consumers. The control layer controls the application flow through the system and the application layer manages the application data and provides business data rules processing. The data access layer deals with how data is accessed from a database. The various pages available through the system are separated into one or more presentation components. The presentation components may comprise static HTML, may contain dynamic data retrieved using Java scriplets, may contain data retrieved through presentation beans, or may contain advertisements retrieved by an advertisement bean. A control servlet will determine which page needs to be built based on a consumer's request and will build the appropriate presentation beans. The presentation beans will in turn acquire appropriate data beans for interfacing with the database. The presentation beans process both the business rules and presentation rules on the data and build the appropriate pages. Advertisements are preferably retrieved from advertisement servers that track the advertisements served as well as targeting advertisements based on parameters passed to them from an advertisement interface. From these parameters, the advertisements as well as all content on the site can be modified according to the consumer, the consumer's product, the network or platform, the weather, geography, language, locale, and co-brand partner relationship.

BRIEF DESCRIPTION OF DRAWINGS

The accompanying drawings, which are incorporated in and form a part of the specification, illustrate preferred embodiments of the present invention and, together with the description, disclose the principles of the invention. In the drawings:

FIG. 4 is an exemplary screen shot of a temporal navigator reflected in a seven day forecast;

FIG. 5 is an exemplary screen shot of a temporal navigator reflected in a ten day forecast;

FIGS. 8(A) and 8(B) are exemplary screen shots of interfaces available through a Local Weather tab;

FIG. 9 is an exemplary screen shot of an interface available through a Climatology tab;

FIG. 10 exemplary screen shot of an interface available through the Climatology tab for an international city;

FIGS. 11(C) and 11(D) illustrate screen shots of an interface according to a preferred embodiment of the invention for providing weather and planning content and functionality;

DETAILED DESCRIPTION

I. Overview

Figure 1:
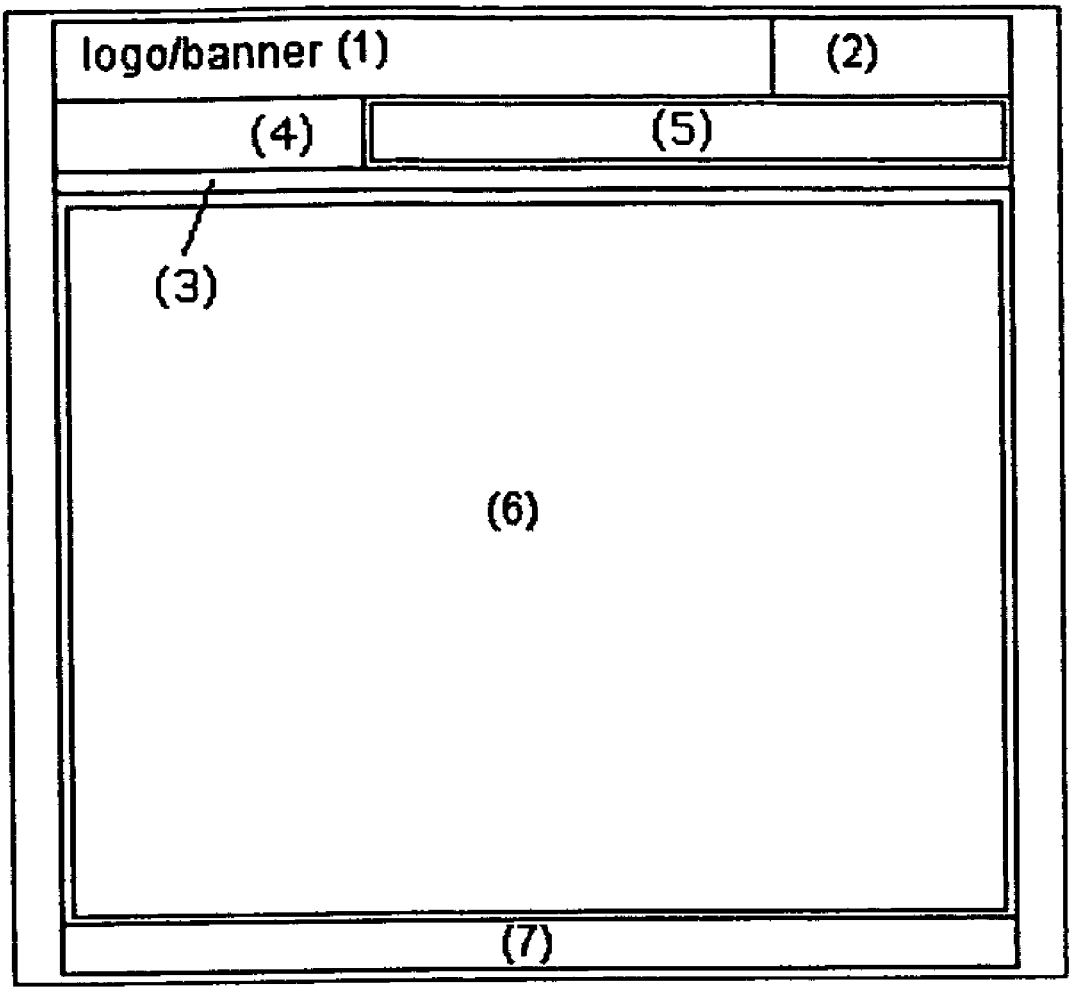
FIG. 1 is a diagram of an interface to a system according to a preferred embodiment of the invention.

With preferred embodiments of the invention, systems and methods for providing weather information over the Internet reflect an entirely different design and approach in delivering weather information and other content to consumers. The systems still allow consumers who view weather information as a commodity to obtain their weather information quickly and easily over the Internet. The systems and methods are further able to address the needs and desires of weather enthusiasts and weather planners. The systems and methods provide functionality to consumers which allows them to more intelligently plan their lives based on the weather and predictions or forecasts of the weather. The systems and methods also address the needs and desires of weather enthusiasts by providing them with the information they desire in a more efficient and user-friendly manner.

The systems and methods according to the preferred embodiments of the invention adopt clean, simple, and consistent global navigation. Whereas many publishing sites on the Internet can easily confuse and complicate navigation, the systems and methods of the invention make it easy for consumers to navigate throughout the site and obtain the information they desire. The systems and methods also bring content closer to the consumer making it easier for the consumer to find what they desire. Many publishing sites on the Internet require consumers to delve deeper and deeper into a site in order reach their final destination. In contrast, the systems and methods of the invention adopt an architecture that eliminates the need for the consumer to go deep into the site but instead allows consumers to more quickly and easily find the desired destination.

The systems and methods of the invention also merge weather information and other content with activities-based content. Presently, many weather sites on the Internet are focused mainly on publishing weather information and may group subsets of the weather information for different activities. For instance, aviators can obtain weather information that is of interest to them, such as wind speed and the jet stream, which differs from the weather information presented to golfers, which may be temperature and precipitation. The systems and methods of the invention, in contrast, tie the weather information to specific activities, such as golf at a particular course or weather conditions for an outdoor sporting event. Thus, consumers can not only use the systems and methods to obtain relevant weather information but can, at the same time, use the systems and methods in planning their activities.

As will be described in more detail below, the systems and methods adopt some new navigational paradigms for delivering weather information. Whereas conventional weather sites rely on the city or zip code as the primary navigational tool, the systems and methods permit consumers to navigate by city or zip code but also give consumers the choice of searching in other ways. In the preferred embodiment, the systems and methods use a "What?" and "Where?" tool whereby consumers can specify what they want to do and also where they want to do it. For instance, the default setting for the What/Where search is to get a forecast and the consumer specifies the city or zip. With the What/Where tool, consumers can also plan a certain activity at a certain location or learn more about the weather at certain locations.

In addition to the What/Where tool, the systems and methods of the invention also allow consumers to navigate geographically, categorically, by activity, by locale, contextually, and/or also by time. As will be apparent from the description below, these modes of navigation are not mutually exclusive but instead a consumer can jump from one type of navigational method to a different method. For instance, a consumer can search according to an activity and, after the results are returned, then navigate through time.

II. Page Layout

An interface 10 according to a preferred embodiment of the invention will now be described with reference to FIG. 1. The interface 10 is the general template for the look and feel of the interface and has a logo or banner in a section (1) of the interface 10. For instance, for The Weather Channel the logo/banner would be weather.com and can contain the logo for The Weather Channel.

A second section (2) is intended to contain featured links associated with the site, which may be replaced on a periodic basis. These links preferably have some relevance to present activities or events, such as pollen count in the spring or hurricane watch during hurricane season. These links need not be limited to weather conditions but can also contain news items or weather-related events, such as flight arrivals and delays. Overall, the featured links promote different areas of the site and can change from page to page within the site. These links may be static or, alternatively, an applet may be used to scroll a number of links through the section (2).

The interface 10 also includes a global navigation section (3) which preferably has pop-up menus. In the preferred embodiment the global navigation section (3) has headings of "Home," "Forecast and Maps," "NewsCenter," "Activities," "Interact," "Services," and "International." The global navigation section (3) is preferably positioned near the top of the interface 10 such as in the position shown or immediately beneath the logo section (1) and the featured links section (2).

The interface 10 also includes a What/Where navigation section for allowing consumers to use the What/Where navigational tool. In the preferred implementation of the What/Where tool, the "What" choices appear in a drop-down menu and the default is always "Get a forecast." The "Where" choice of the navigational tool is preferably a text entry box to allow the consumer to enter location information, such as country, region, zip code, city, etc.

The systems and methods of the invention preferably operate under a business model that is heavily dependent upon advertising revenue. Accordingly, the interface 10 includes a section (5) set aside for a banner ad or other relevant content. The ad section (5) is in a fairly prominent portion of the interface 10, covers a significant amount of "real estate" of the interface 10, and accordingly should be valuable to advertisers.

A main content area (6) is the largest section of the interface 10. This main content area (6) contains both content and preferably advertisements. In the preferred implementation, the content is separated into a set of tabbed pages to allow for simple and straightforward navigation. In the preferred embodiment, the tabs that appear on the interface include tabs for "Homepage," "Local Weather," "Climatology," "Maps," and "My Weather." The systems and methods are not limited to use of just these tabs but, as will be apparent from the description below, incorporates the use of other sets of tabbed pages.

The interface 10 also includes a footer section (7) which contains miscellaneous information. For example, the footer section (7) can contain copyright information, legal restrictions, terms of use, privacy statement and related certifications, and partnership information. The footer information is preferably static and appears on every page.

Figure 2A:
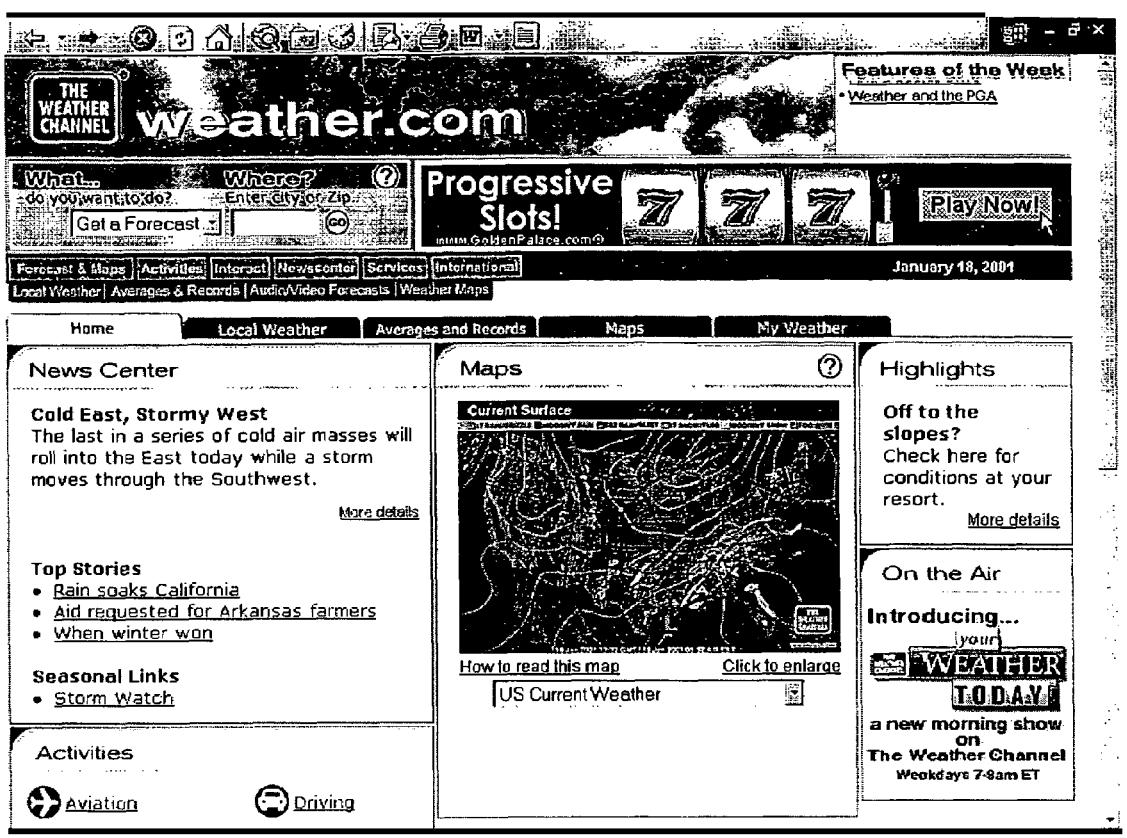
FIGS. 2(A) to 2(I) depict exemplary screen shots of an interface to the system showing tabular arrangement of information, global navigation, and a what/where tool.
Figure 2B:
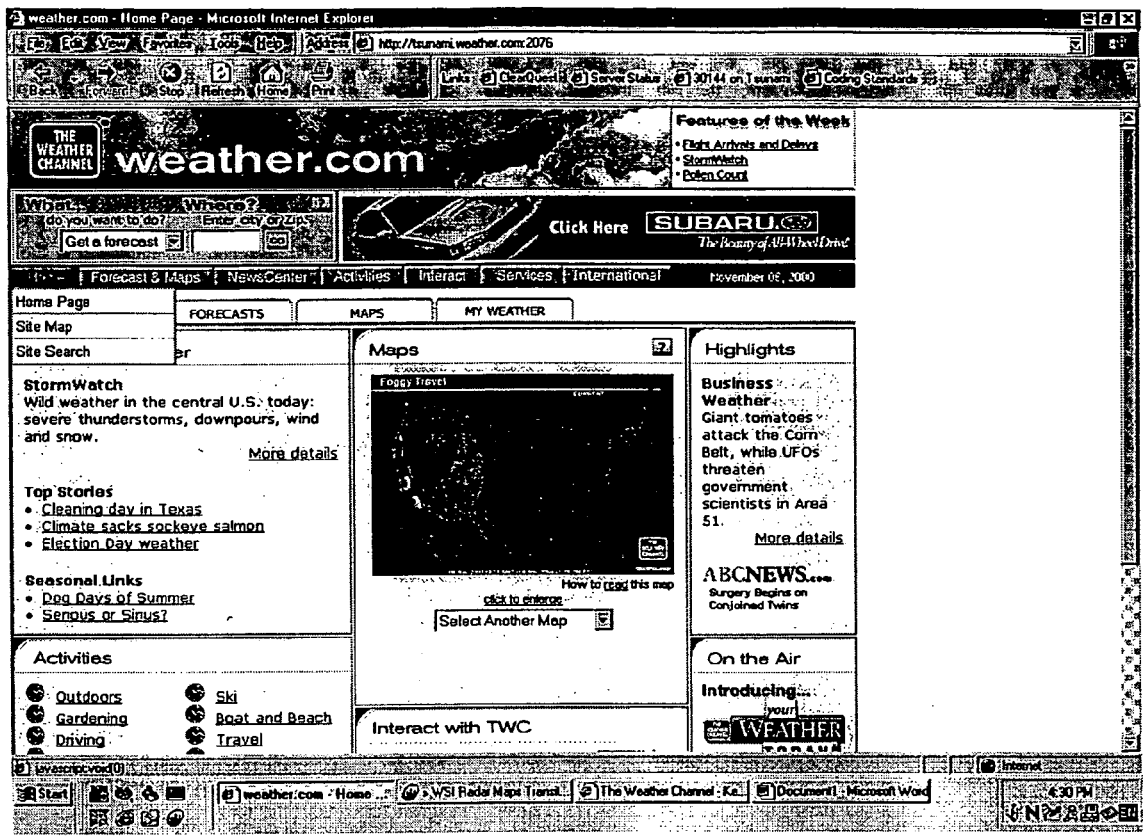
Figure 2C:
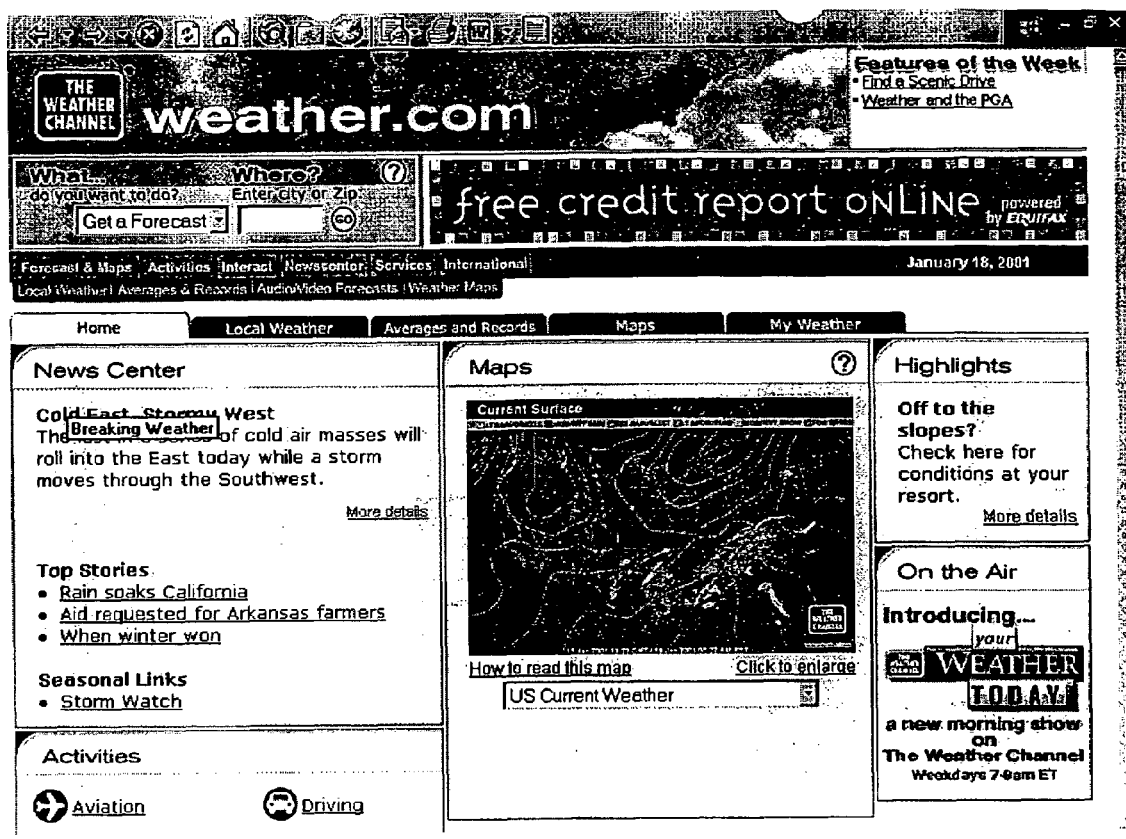
Figure 2D:
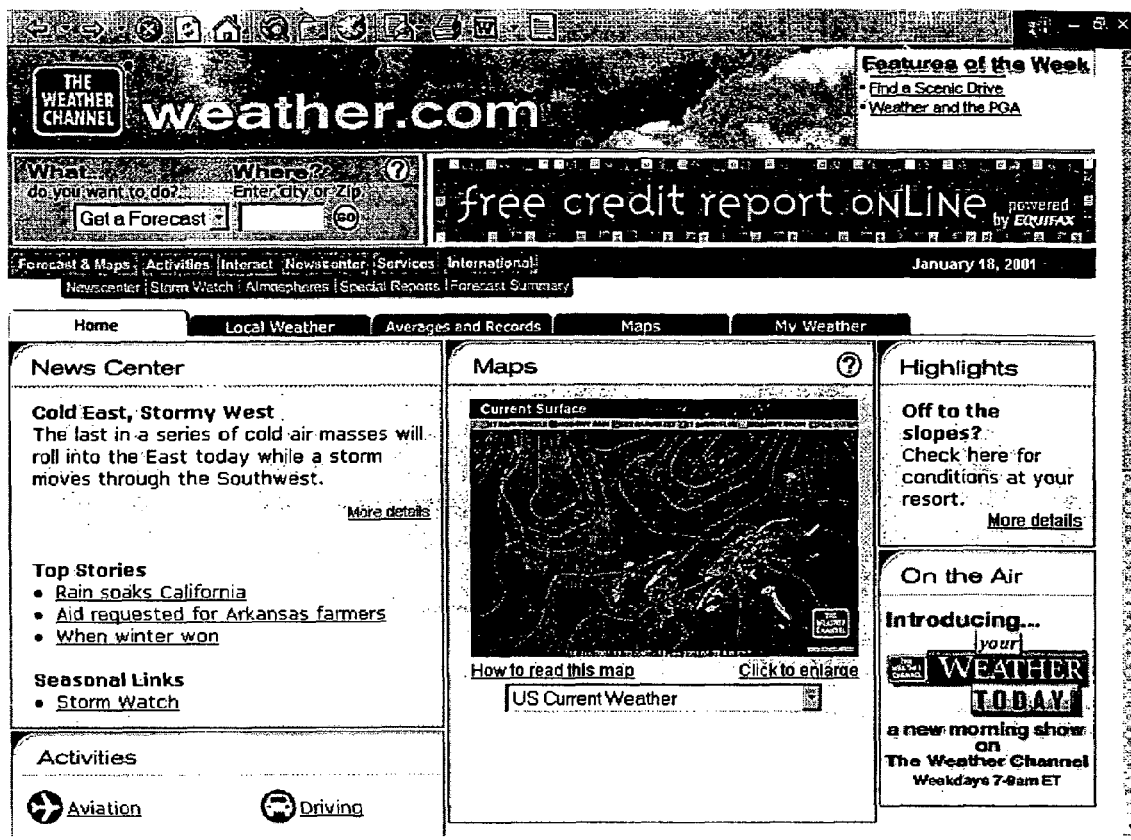
Figure 2E:
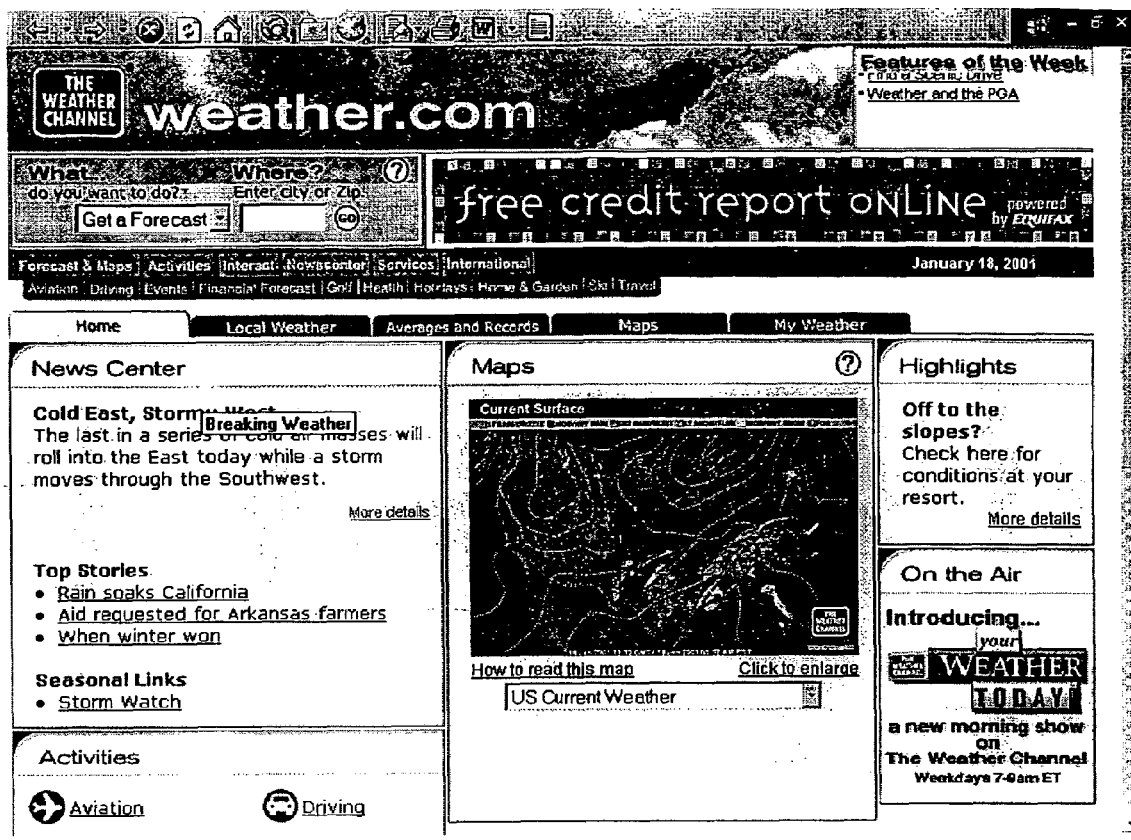
Figure 2F:
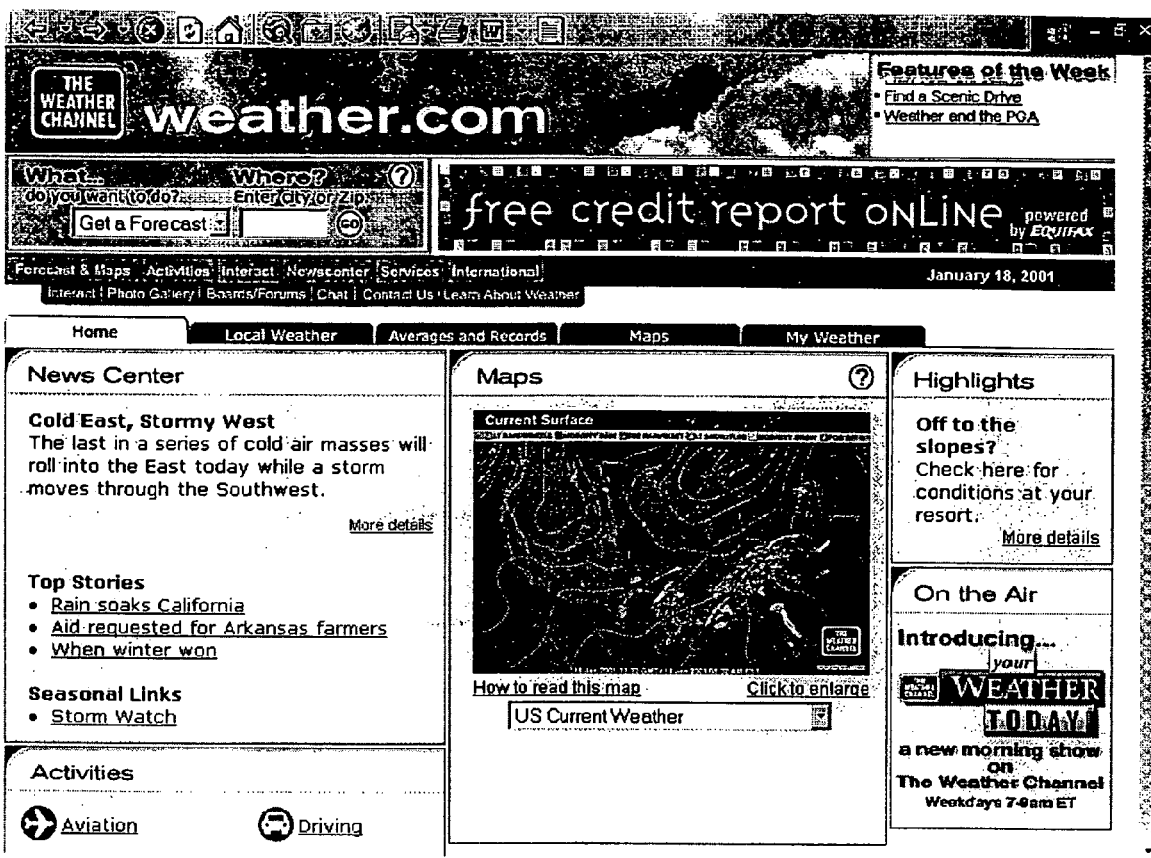
Figure 2G:
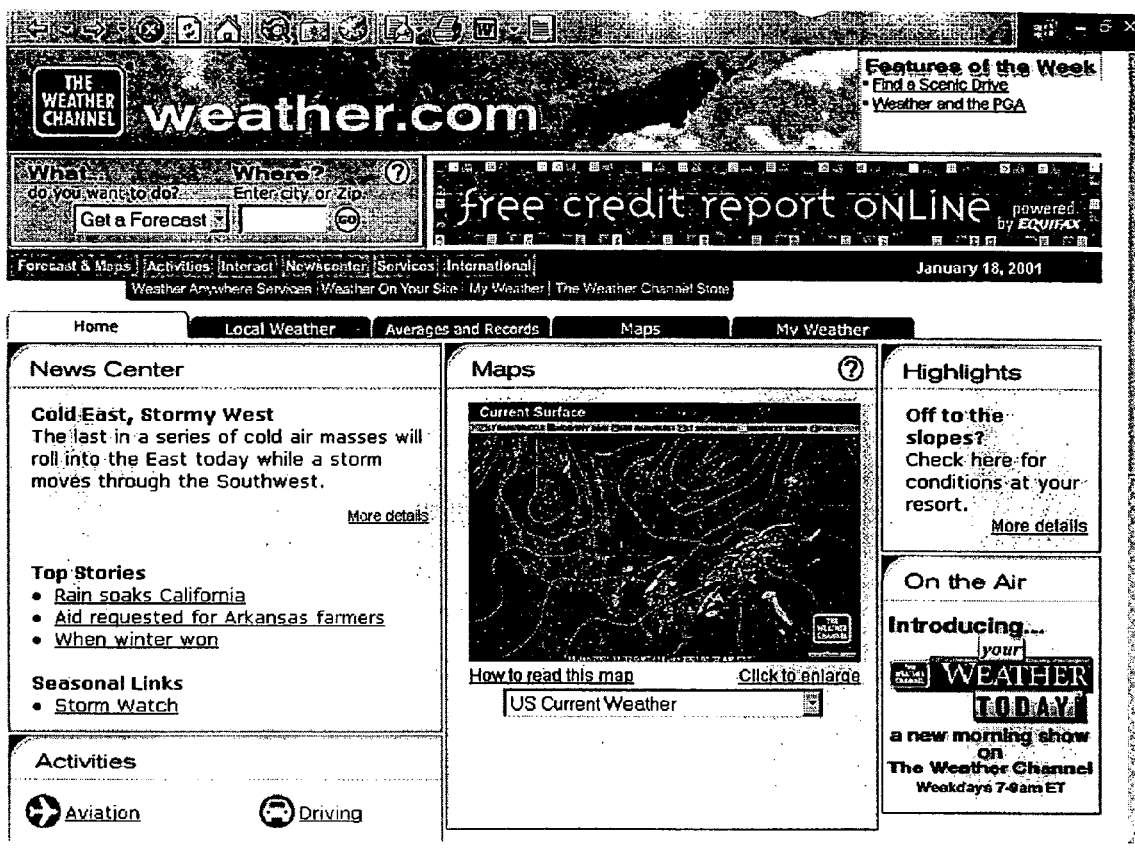
Figure 2H:
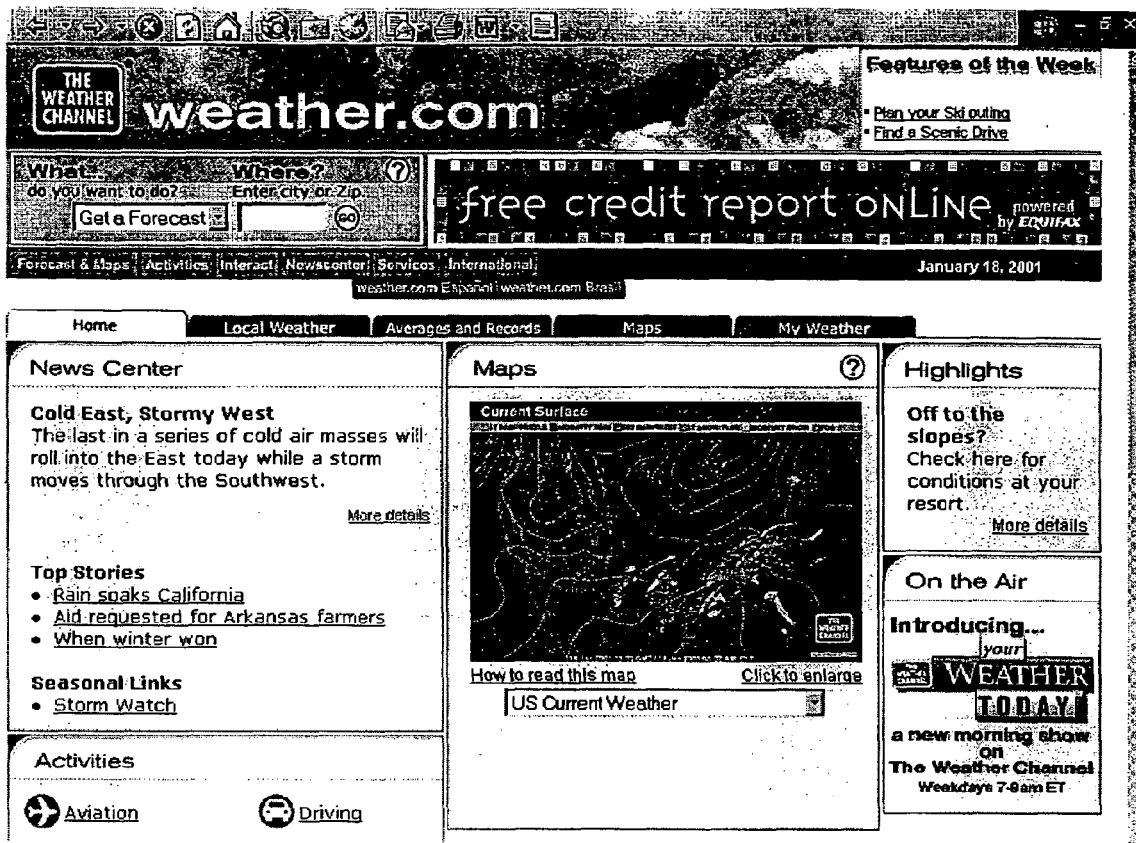
Figure 2I:
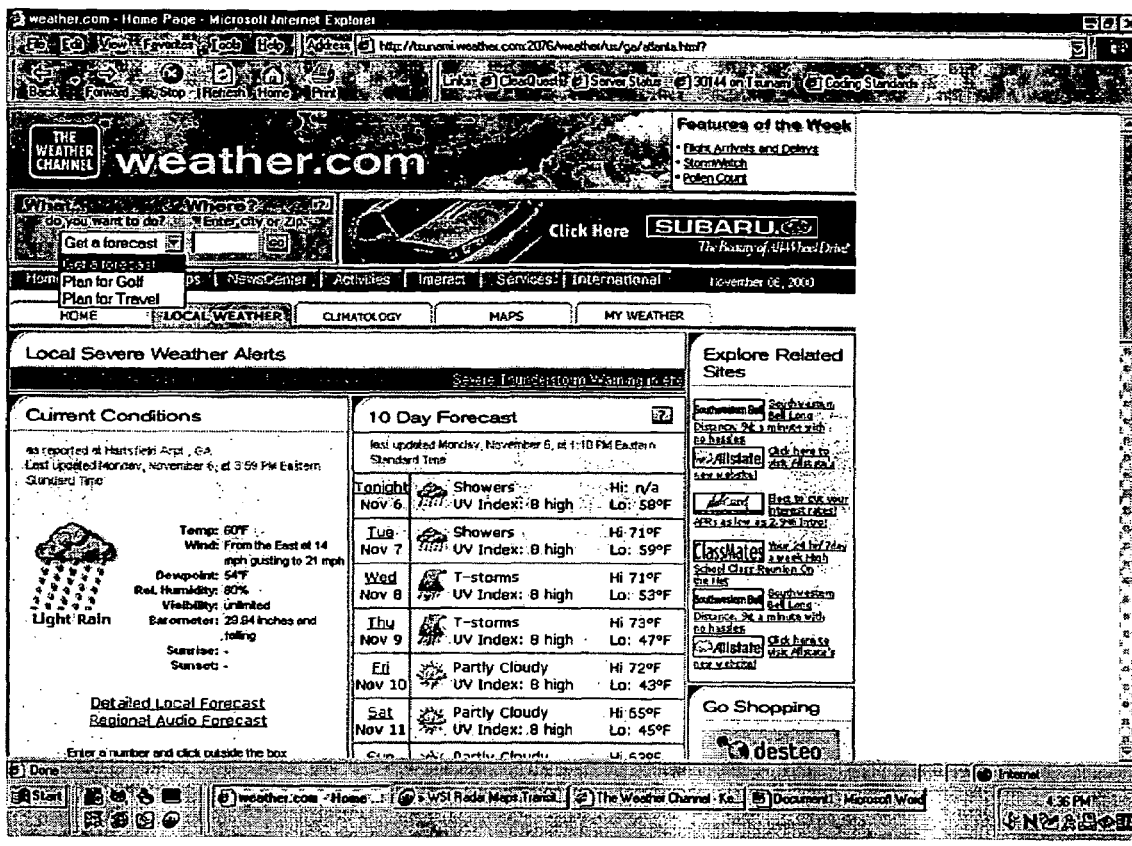

An example of a main interface 10 populated with content is shown in FIGS. 2(A) to 2(I). As shown in these examples, the logo/banner section (1) contains the banner for weather.com and The Weather Channel and the featured links section (2) contains three features of the week, such as "Pollen Count," "Flight Arrival and Delays," and "StormWatch." The global navigation section (3) is positioned under sections (1) and (2) and contains drop-down menus which are shown in FIGS. 2(B) to 2(H). The What/Where navigation section (4) illustrates the default search of "Get a forecast" but FIG. 2(I) illustrates some of the choices available in the drop-down menus, such as "Plan for Golf" or "Plan for Travel." The ad section (5) shows a banner advertisement, the main content area (6) shows content and advertisements arranged in a tabular format and as an assembly of presentation components, and the footer section (7) contains the copyright notice, AOL partnership banner, and Trust-e information.

The main content area (6), as discussed above, includes a number of presentation components which in this example comprise "Breaking Weather," "Maps," "Highlights," "Activities," "Interact with TWC," and "On the Air." The arrangement of the presentation components shown in FIG. 2 is one template used in presenting weather and other content to consumers. The actual content that is delivered to a particular presentation component is defined by rules associated with that template and that presentation component. The manner in which templates and presentation components are used to formulate pages and interfaces shown to consumers will be described in more detail below. The invention is not limited to this precise interface 10 with the presentation components and sections shown but may have other sections and/or different arrangements of the presentation components.

III. Preferred Layout of Main Content Area

As mentioned above, the main content area (6) on the interface 10 is preferably presented as a set of tabbed-pages. By using these tabbed-pages, relevant content/functionality can be exposed to the consumer which allows the consumer to navigate quickly to desired content. The systems and methods of the invention support two kinds of tabbed-pages, static and results. The static pages are always visible and hold things such as the home page, index pages, planner pages, etc. In contrast, the results pages are tabbed pages that are added to static pages only when the consumer explicitly requests them, such as a result of a search. For example, a consumer on a ski index page that checks resort conditions near Denver would obtain a list of the resorts and the conditions on a results page. For some sections of the site, a single tabbed-page holds all the content. For example, the home page or the maps index page holds all relevant content. In contrast, for all activities sections of the site, the content is preferably spread across multiple tabbed-pages. For consistency purposes, the first page is preferably an index page and the other pages, in order, are a planner page, planner advanced functionality page(s) and a MyPlanner page.

For example, a set of tabs for the activity of skiing may include, in order, "Ski Index," "Ski Planner," "Find a Resort," and My Ski Planner." An intended purpose of the index page, such as the Ski Index page, is to list all of the available "tasks" that the consumer can perform in that section. When the task requires a results page, the results page appears as its own tabbed page immediately after the page from where the task was performed. For example, a set of tabs may appear in order as the "Ski Index," "Snow Conditions," "Ski Planner," "Find a Resort," and My Ski Planner." These tabbed-pages appear after a consumer selects a "Check Snow Conditions" task from the Ski Index page. If the consumer then selects the Ski Index page again, the "Snow Conditions" tabbed-page is removed.

IV. Navigation Architecture

As briefly mentioned above, the systems and methods of the invention employ multiple navigational paradigms. In general, these navigational architectures include geographical, categorical/activity-based, and localized/contextual. As will be more apparent from the description below, these navigation architectures are not mutually exclusive but instead are tightly nested and interrelated.

A. Geographical Architecture

A purpose of the geographical architecture is to allow the consumer to "drill down" between different levels of geography. For instance, a consumer can drill down from a higher-level geography to a lower-level geography. The preferred geographical navigation architecture is as follows: world, continent, geo-political region, country, region, state, and city. With this architecture, the world page would show a list of continents, the continent page would show a list of countries for that continent, the geo-political region page would show a list of countries in that region, and a country page would show a list of states or cities. A region page would show a list of states, a state page would show a list of cities, and a local weather page would show the local weather information for that city. It should be understood that this geographical hierarchy is just one example and that other divisions and classifications are possible. Furthermore, the geographical hierarchy discussed above is preferably presented to the consumer and may or may not reflect the segmentation of the data and content. For example, the segmentation of the data and content may be based on hemisphere, county, telephone area code, ocean, national weather service zone, marine zone, landmarks, latitude/longitude, direct marketing area (DMA), etc.

According to one aspect, consumers can navigate geographically through this hierarchy to arrive at a desired geographical division. Preferably, however, the consumer is presented with one of the above-specified geographical pages only when the consumer enters ambiguous search criteria, such as in the What/Where search tool. The geographical navigation is preferably displayed at the top of a search results page, such as World: North America: United States: Southeast: Georgia:. By displaying this geographical navigation, the consumer is given easy and visible access to the geographical organization of information and can select and navigate through the different divisions of the hierarchy. For example, in the example above, the consumer can go from a Georgia state page and select the United States and obtain weather information on a national level.

B. Categorical/Activity-Based Architecture

The weather information and other content is grouped by category/activity. Each of these distinct categories is directly accessible via the global navigation section (3) of the interface 10. These categorical/activity-based categories include "Forecast & Maps," "NewsCenter," "Activities," "Interact," "Services," and "International."

The global navigation is presented in the form of a pop-up menu structure that appears horizontally across the top of the page in section (3). As the consumer rolls the cursor over the top-level menu items, a pop-up menu appears showing a list of links associated with that category, such as the ones shown in FIGS. 2(B) to 2(H). The pop-up menu generally only contains links to index pages of the different content category sections of the site. This method of global navigation provides quick access to main content areas of the site and also provides users a quick overview of the content contained on the site.

In the preferred embodiment, as shown in FIG. 2(B), the "Home" menu item contains links to "Home Page," "Site Map," and "Site Search." The "Forecasts & Maps" menu item preferably contains links to "Local Weather," "World Weather," "Schoolday Forecasts," "Audio/Video forecasts," and "Weather Maps." As shown in FIG. 2(D), the "NewsCenter" menu item contains links to a "News Center" index page, "Forecast Summary," "Storm Watch," and "Special Reports." As shown in FIG. 2(E), the "Activities" menu item preferably contains links to "Golf," "Ski," "Travel," "Driving," "Outdoors," "Home & Garden," "Health," "Aviation," "Events," and "Holidays." The "Interact" menu item, as shown in FIG. 2(F), preferably has links to "Messages Boards & Chat," "Learn About Weather," "Talk To Us," "Work With Us," and "About the Weather Channel." The "Services" menu item preferably has links to "My Weather," "Free Email," "Inbox Weather," "Wireless Weather," "Weather On Your Site," "The Weather Channel Store," and "Business Services," as shown in FIG. 2(G). Finally, as shown in FIG. 2(H), the "International" menu item has links to weather.com Espanõl and weather.com Brasil. The above-mentioned menu items and links are only examples and it should be understood that other menu items and also other links may be used in the global navigation section (3) of the interface 10. Furthermore, sub-menu items may be added to the links that appear under the menu items. For example, under the link to "Ski" under "Activities," the different sections or tasks available on the ski index page can be shown as separate links.

C. Localized/Contextual Architecture

Figure 3:
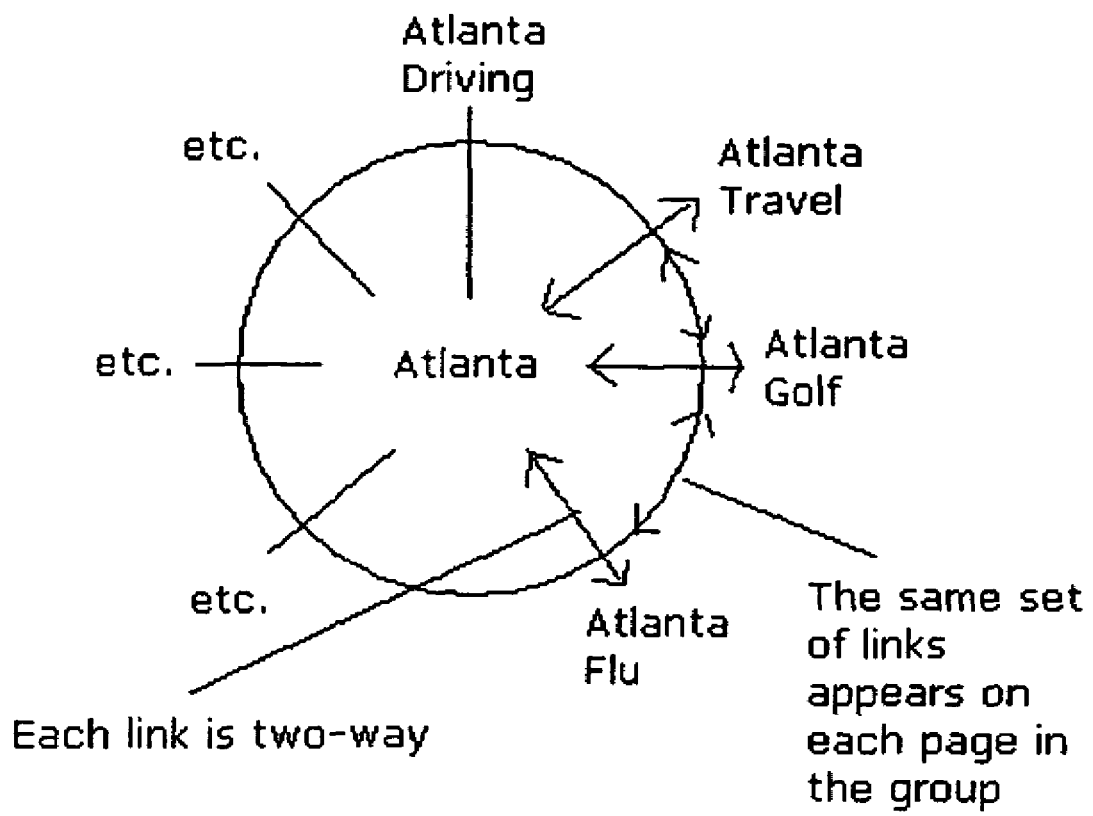
FIG. 3 is a diagram of a hub-and-spoke navigational architecture adopted in the preferred embodiment of the invention.

The systems and methods of the invention advantageously enables consumers to navigate amongst contextually-related groups of pages. Each group of contextually-related pages is organized in a hub-and-spoke fashion such that a main page acts as a hub and each other page is accessible directly from that page. Also, every page in a group of contextually-related pages is preferably accessible from every other page in that group. A diagram illustrating this hub-and-spoke architecture is shown in FIG. 3. In this example, one such group of contextually-related pages would be a locale, such as a local weather page and all of the related localized content pages for that city. With reference to FIG. 3, the Atlanta Local Weather page is the hub and the spokes are Atlanta Golf, Atlanta Travel, Atlanta Driving, Atlanta Flu, etc. In general, a consumer enters this group of pages normally through the local weather page. From the local weather page, the consumer can jump directly to a localized activity page and then, from that page, to any other localized activity page in that group or back to the local weather page. The localized/contextual architecture is supported by a set of links shown on each related page so that the user can, with a single click, jump to a contextually-related page. This simple navigation enforces the grouping of localized content and makes it more likely and easier for a consumer to jump to another page which ordinarily may have been hidden or deeply buried in conventional weather sites. This hub-and-spoke arrangement also greatly facilitates use of the site for planning purposes.

D. What/Where Search

The What/Where search tool which appears in section (4) of the interface 10 and shown in FIG. 2(I) is one of several navigational tools available to the consumer. The What/Where search tool can be used in the same manner as a city or zip code search found in many conventional weather sites. As mentioned above, the default entry for "What" is to "Get a forecast." Thus, by default, the consumer can go to this tool and enter a city or zip code and obtain local weather information. Additionally, the What/Where tool allows the consumer to specify an activity other than getting a local forecast and obtain results based on the specified activity. For example, the "What" component of the tool can contain a drop-down menu of a predefined list of activities, such as "Plan for golf," "Plan for travel," and "Plan for health." Preferably, the predefined list of activities are phrased to lead the consumer to enter something in the text box for "Where." For instance, the language should preferably be a call to action that implies the need for a location such as "Plan for golf in" or "Plan for skiing in." Instead of, or in addition to, the list of predefined activities, the What/Where tool could have a text entry box that allows the consumer to enter anything in the "What" component of the search. The systems of the invention would then try to match what was entered by the consumer with a category of content or information.

In the "Where" component of the What/Where tool, the consumer enters the geographical region of interest or division in the hierarchy. In the preferred embodiment, the consumer can specify any division in the hierarchy, such as a US zip code, city, state, region, country, city and state, or city and country. If the consumer enters ambiguous search criteria in the "Where" component of this tool, the system provides the consumer with a results page that lets the consumer select from a list of search results and preferably provides the consumer with the most likely choice at the top of this list. For instance, if the consumer enters "Paris" in the "Where" component of the tool, the systems provide the consumer with a list of cities that are named Paris, with Paris France at the top of the list.

E. Temporal Navigator

In addition to searching by geography, by the What/Where tool, by category, or by locale/context, the systems and methods of the invention also support navigation by time. As with the other methods of navigation, the temporal navigator is not mutually exclusive to the other modes of navigation but instead is intertwined with the other navigation methods. The temporal navigator is a calendar-display that contains a wealth of information and allows consumers to navigate temporally. The navigation tool serves to display forecast information and allows consumers to click on any day or other time period to jump directly to that period in time. More detailed information for that selected period of time can then be shown to the consumer. In addition to moving through time, the consumer is preferably also able to specify a specific period of time and obtain historical, current, or climatological data. As part of the calendar-like display, details for a "selected" day is preferably shown, such as the current weather conditions. The default "selected" day is the present day but the consumer can select another day in order to reveal details relevant to that day.

An example of such a calendar-like display is shown in FIG. 4. As shown in this figure, the display shows seven days of forecast data with the current day being the first, or leftmost day, in the display. The display preferably shows seven days of forecast data since most local forecasts are at most a seven day forecast. The invention however is not limited to just a seven day forecast but can have a greater number of days displayed on the local weather page. For example, many international cities have ten days of forecast information available, in which case the temporal navigator preferably shows seven days but allows the user to obtain the other days of forecast data. The consumer can obtain all ten days through a pop-up window by scrolling through the days, or resizing a window. FIG. 5 shows an example of a ten day forecast for Paris, France which allows the consumer to scroll through the ten days of forecast data. As shown in above in both FIGS. 4 and 5, the weather information that is shown includes a UV index. The UV index is shown by default but other indices may be shown. For example, when the consumer is on a planner page, the temporal navigator may show planner index values. Additional description of the planner index values is given below.

F. Map Navigator

Figure 6:
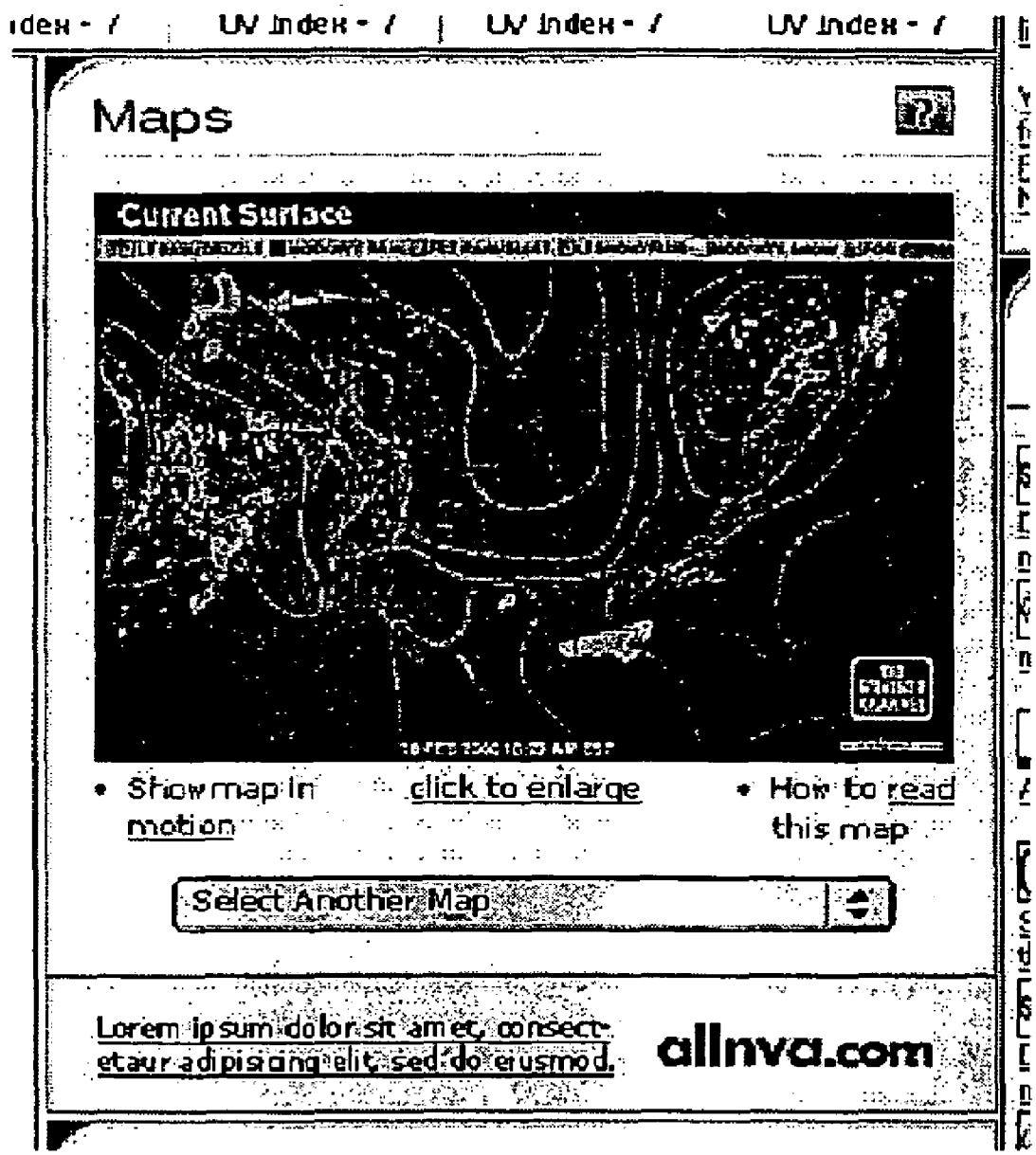
FIG. 6 is an exemplary screen shot of a map navigator used in the preferred embodiment of the invention.

A map navigator is a functional tool available through the systems of the invention which consumers can use when viewing maps. The map navigator presents a single, consistent way of viewing maps and present a set of related maps in an easy-to-browse package. An example of a map navigator is shown in FIG. 6. The map navigator includes a window having a title, the map itself, a "click to enlarge" link which, when selected, causes a pop-up window to appear with a larger version of the map navigator tool showing the larger sized map. If the map cannot be enlarged any further, the "click to enlarge" link is not shown. The map shown in FIG. 6 also includes a "Show map in motion" link which causes a pop-up window to appear with controls to allow for map animation. The "Show map in motion" link appears with only certain types of maps that lend themselves to animation, such as those that can provide useful information on the time-varying characteristics of the content being shown in the map. While not shown in FIG. 6, some maps also have a set of links for days of the week, such as weekly forecast maps. The consumer can select any one of these daily links to see the same map for a different day. The map navigator tool also enables the consumer to select other maps, such as a list of related maps to the one shown. The map navigator tool also has a link "How to read this map" which activates a pop-up window displaying an explanation for the currently selected map. The map navigator tool preferably allows the consumer to change the scale of the selected map by zooming in or out and also to pan across the map, such as by moving north, south, east, or west.

The map navigator tool discussed with reference to FIG. 6 can appear in many places throughout the site. For example, as shown in FIG. 2, the map navigator tool can appear on the "Home" page as one of the presentation components. As will be described in more detail below, the map navigator tool can also appear through the "Local Weather" tab or "My Weather" tab. A more direct route to obtain the map navigator tool is through the "Maps" tab or through the "Forecast & Maps" menu item in the global navigation tool. The map navigator tool and the particular map shown forms a presentation component that can appear virtually anyplace within the site.

V. Maps category

Figure 7:
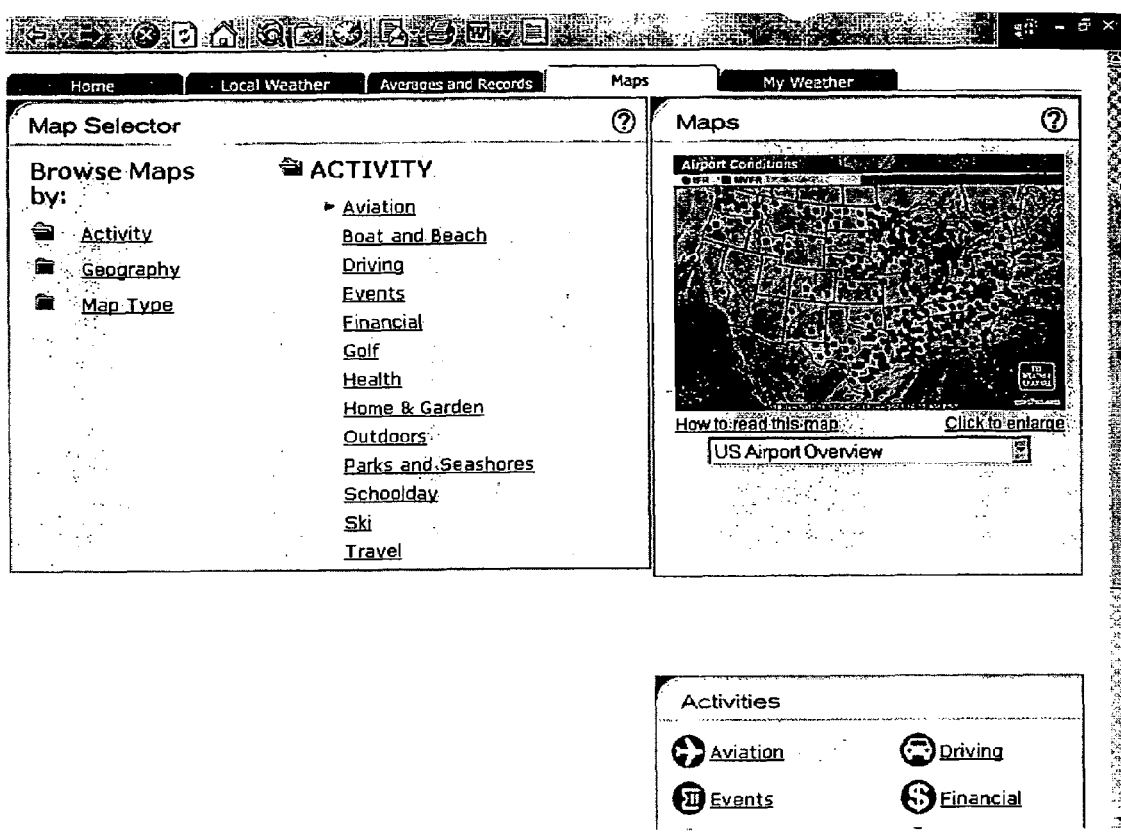
FIG. 7 is an exemplary screen shot of an interface available through a Map tab.

The "Maps" tab allows the consumer to navigate through the maps available at the site. FIG. 7 is an example of an interface that can appear upon selecting the "map" tab. As shown in FIG. 7, a presentation component on the right side of the interface shows a map navigator tool and the left side has a presentation component of a Map Selector. The Map Selector allows consumers to browse through different categories of maps, such as Activity, Geography, Type, and Popularity. When a consumer selects one of the categories, a default map is shown in the map navigator tool with other maps in that category being available to consumers through a pull-down menu on the map navigator tool. For example, when the consumer selects the Activity maps and further chooses the Travel Maps, a default map of the "Current Surface" conditions is shown, with other travel maps being available through the drop-down menu having the prompt "Select Another Map." If the consumer selects the popular maps, the consumer is presented with links to Current Surface map, Radar, and Satellite maps. If the consumer selects the Radar maps category within popular maps, then the consumer is presented with a default Radar map, such as the US Radar map, and can choose from other radar maps through the pull-down menu, such as regional and popular local radar maps.

The Maps category in the site allows the consumer to search and sort through the entire inventory of maps available on the site. The consumer can sort through the maps by selecting certain categories of maps and also from groups of maps within each category. Furthermore, the user can use the drop-down menu on the map navigator to select other related maps. While not shown, the consumer is preferably also able to enter criteria for a search of a particular map or a set of maps. For example, the user preferably is able to search for maps by city, zip code, or other geographical division. For example, if the consumer selects the Geography category of maps, the consumer is presented with a category called "Local Weather maps." The consumer is then presented with a search box where the consumer can enter a city or zip code and obtain the desired map or category of maps in the map navigator.

As should be apparent, a given map available through the site can be obtained by a consumer in multiple ways through the site. For example, the Current Surface conditions can be pulled through more than one of the Activity groups of pages, such as Travel and Golf, but also can be obtained through Geography or the Popular maps categories of maps. Also, as discussed above, the map navigator preferably allows the consumer to zoom in and out and also to move to the north, south, east, and west.

VI. Local Weather

Figure 8A:
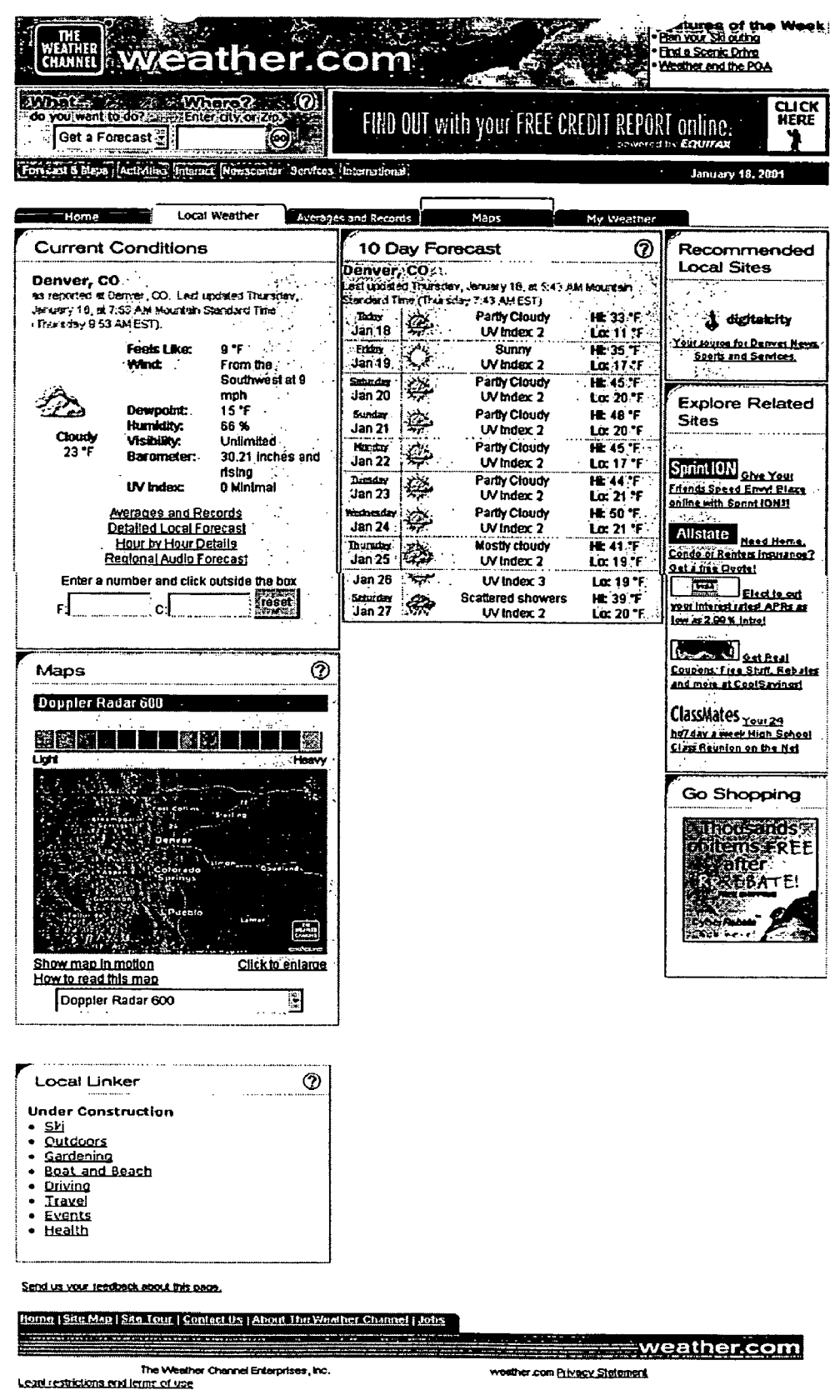
Figure 8B:
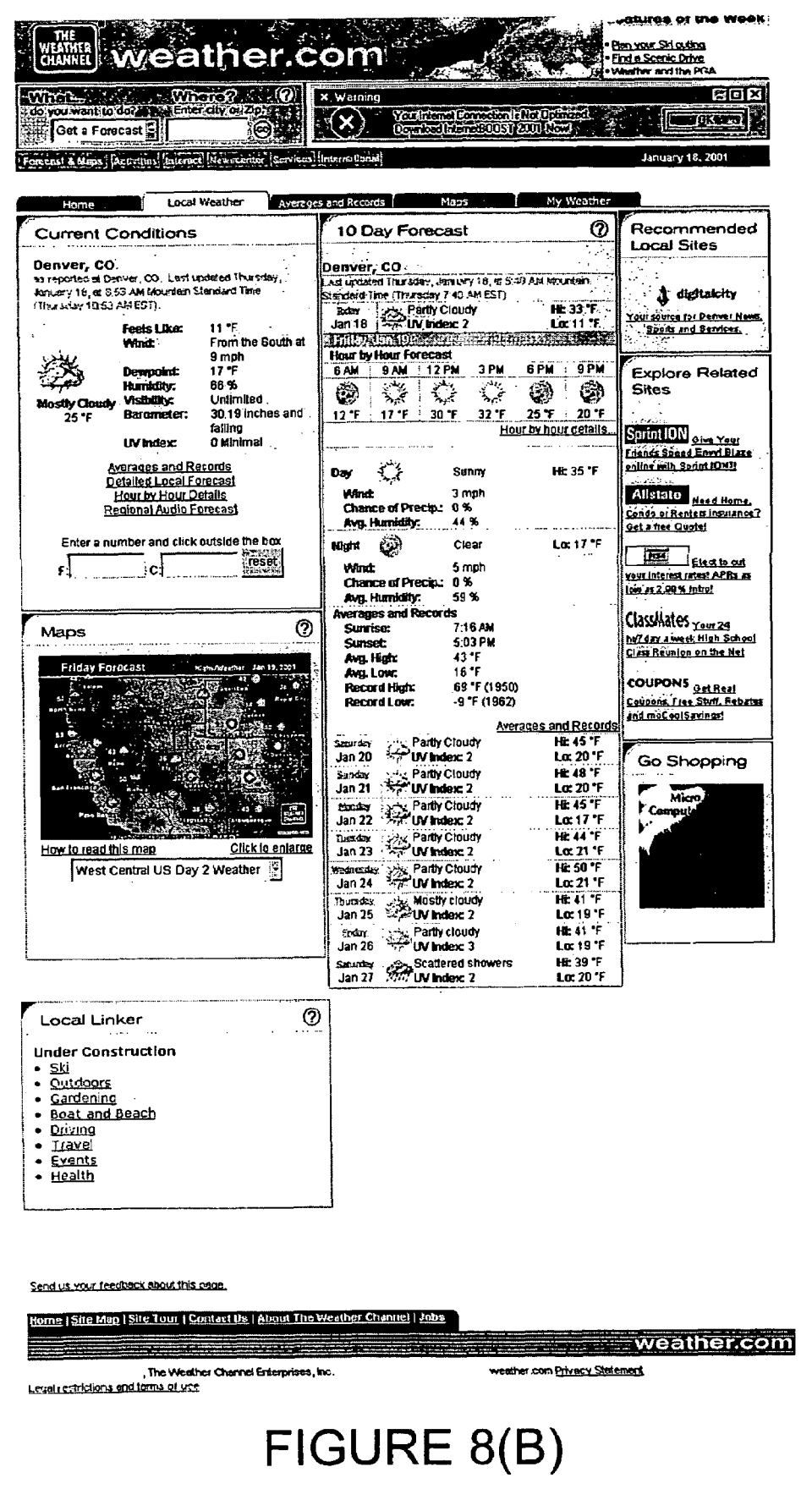

By selecting the "Forecasts" tab, the What/Where tool, and in other ways, consumers can obtain local weather conditions and/or forecasts for a geographical division. Examples of local weather pages are shown in FIGS. 8(A) and 8(B). As is true with all pages on the site, the banner section (1), featured links section (2), What/Where section (4), ad section (5), and global navigation section (3) appear at the top of the interface. The local weather interfaces have a plurality of presentation components, including the temporal navigator showing a multi-day forecast. The local weather interface also includes a current conditions presentation component which shows the current or predicted conditions for the selected day within the temporal navigator. The local weather interface includes a map navigator which is selected based on the geographical division specified and a local linker presentation component which shows a list of links associated with the geographical division. An activity planners presentation component is also placed on the local weather interface and shows a list of links for planning different aspects of the consumers' lives. The main content section (6) of the local weather interface includes one or more presentation components for displaying advertisements and also for related sites.

FIG. 8(A) shows the local weather page for Dallas, Tex. for Jul. 16, 2000. When the consumer selects a different day in the temporal navigator, the current conditions presentation component shows the conditions or predicted conditions for the selected day and the maps navigator is also changed to display a map corresponding to that selected day.

FIG. 8(B) illustrates how the interface changes when Jul. 17, 2000 is selected. While not shown, other presentation components may also be tied to the day selected within the temporal navigator and have the content changed accordingly. For example, the local linker may provide links associated with events on the new day and the advertisements may vary with the selected day.

The local weather interface may also include a weather alert presentation component, as shown in FIGS. 8(A) and 8(B) below the tabs. This presentation component appears as part of the local weather interface only when a weather alert has been issued for the geographical region selected by the consumer. A shortened version of the full weather alert preferably scrolls across the presentation component and the consumer can click on the scrolling text to receive the full details of the alert in a pop-up window. The weather alert is preferably color coded to indicate its severity, with urgent severe weather being displayed in red and non-urgent in yellow.

VII. Climatology

The consumer can also navigate through the site with the "Climatology" tab. After the consumer selects the "Climatology" tab, the systems of the invention prompt the consumer to specify a geographical division. Preferably, the systems provide the consumer with a geographical search box to allow the consumer to enter the geographical division of interest. The systems then deliver the climatology details page for the requested geographical division. If the consumer has already entered a geographical division, such as through a local weather page or in some other context, the systems provide the consumer with climatology results for that particular division upon selection of the "Climatology" tab. Therefore, the consumer does not need to reenter a particular geographical division but instead can continue navigating through the site along a previously defined thread.

Figure 9:
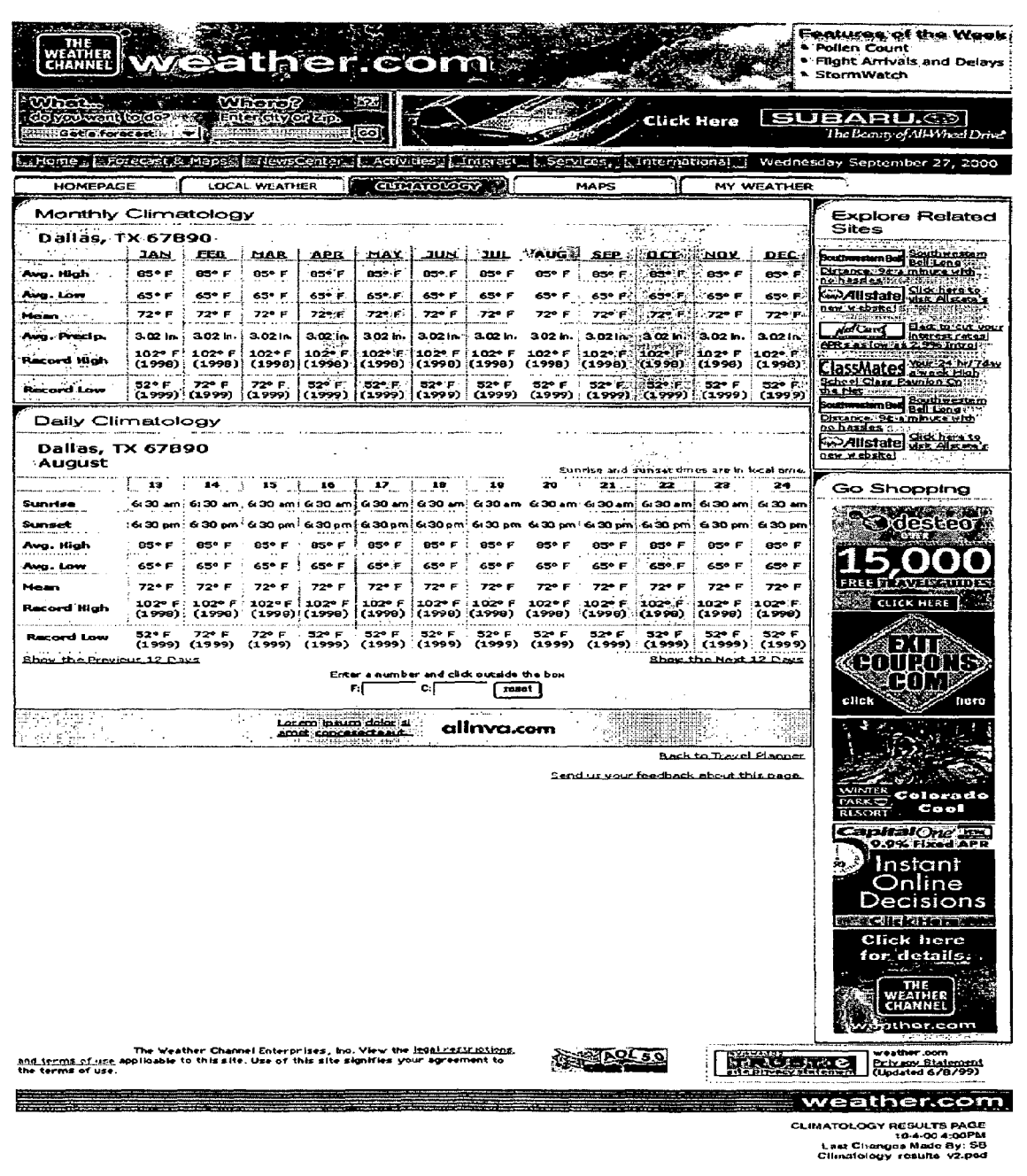
Figure 10:
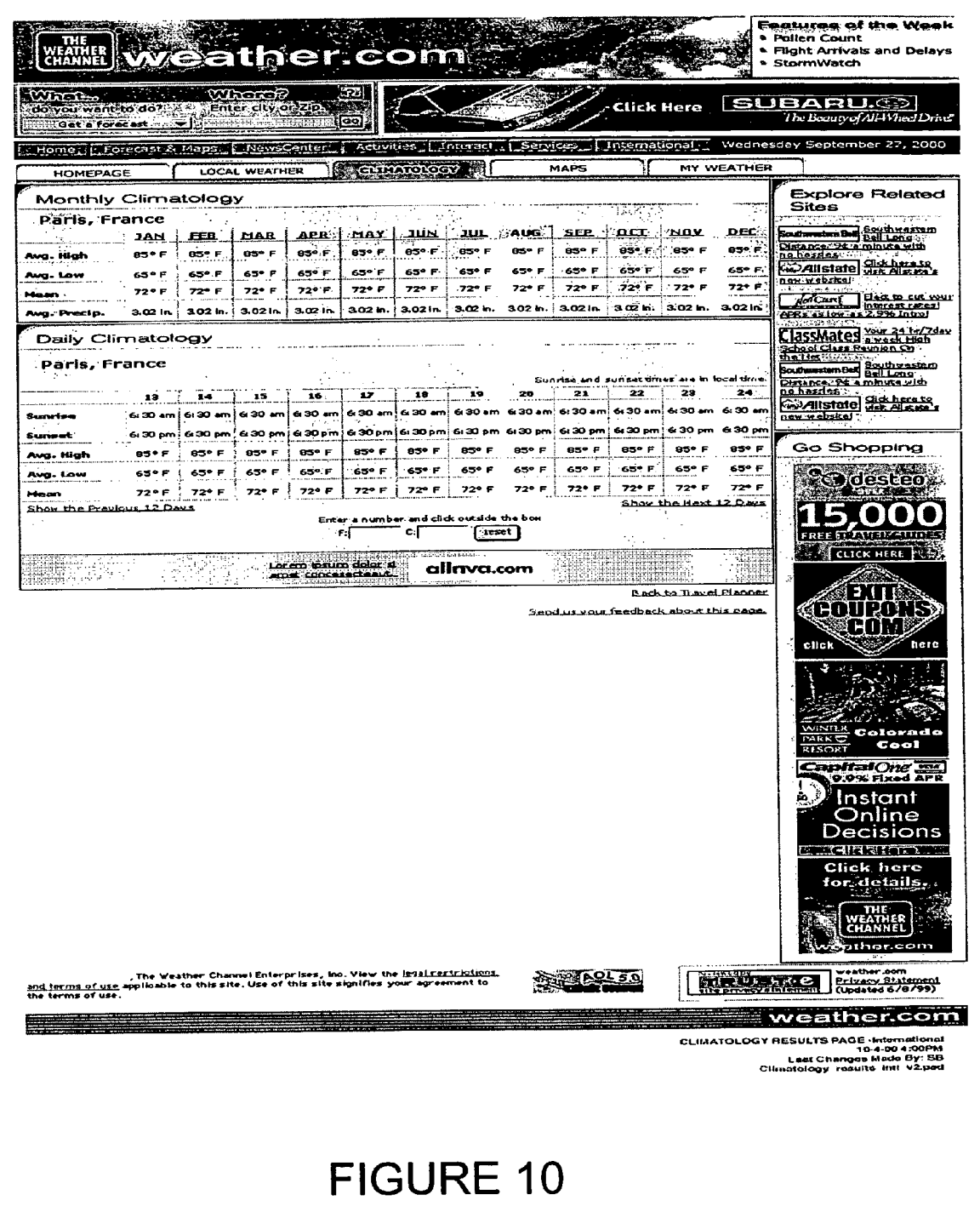

The climatology results page shows the climatology data for the specified geographical division over a twelve month period. This climatology data may include the average high temperature, average low temperature, mean temperature, average precipitation, record high, and record low for each month. An example of a climatology results interface is shown in FIG. 9. In this example, the monthly climatology information is placed in a first presentation component and, if the consumer has selected a particular month or day, daily climatology is shown in a separate presentation component. In this manner, the consumer can select any month of the year as well as any day for every geographical division available in the site. If the consumer has already specified a period of time, such as a month or a particular date, then the systems provide the consumer with the climatology results for that particular time. An example of a climatology results interface for an international city, namely Paris, France, is shown in FIG. 10.

VIII. Planner Functionality

Figure 11A:
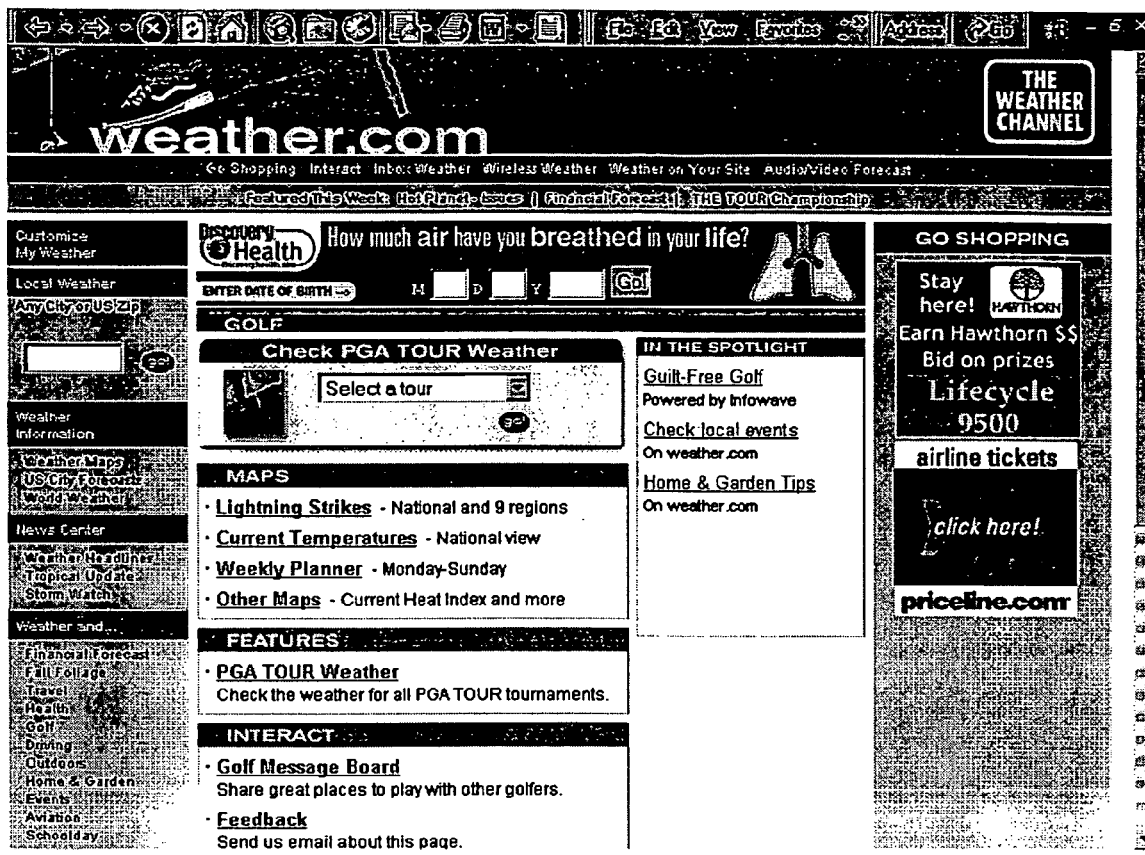
FIGS. 11(A) and 11(B) illustrate screen shots of conventional interfaces for providing weather and planning content.
Figure 11B:
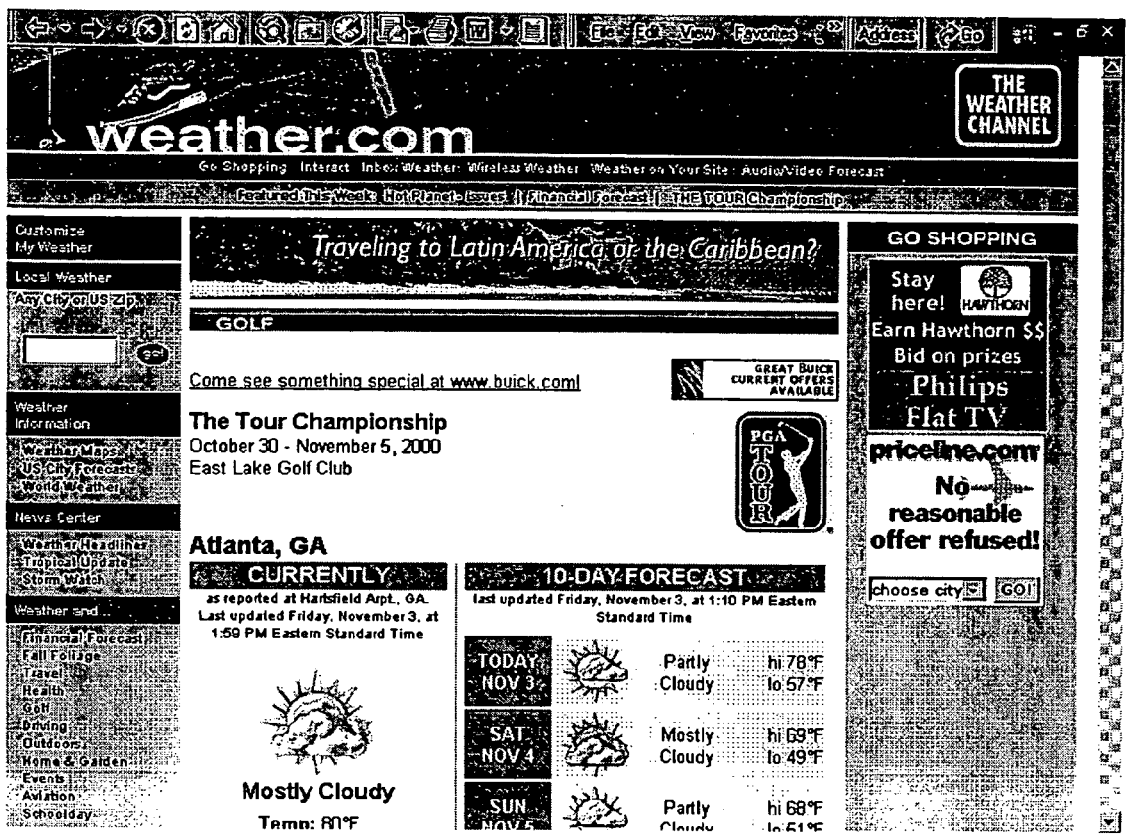

As mentioned above, a significant advantage of the systems and methods of the invention is that consumers can better plan their lives around the weather. Conventional weather sites on the Internet are primarily focused on publishing current weather conditions and also weather forecasts. The typical approach of many weather sites is to offer information on activities segregated from the actual weather information. An example of a golf index page currently available through weather.com is shown in FIG. 11(A). As shown in this figure, weather.com provides a collection of weather information that may be of interest to golfers, such as maps of lightning strikes, current temperatures, weekly planner, and other maps. Weather.com also provides some golf-related information, such as a golf message board, tips on golf, and weather at PGA tournaments. An example of the weather conditions at The Tour Championship in Atlanta, Ga. is shown in FIG. 11(B).

Figure 11C:

The systems and methods of the invention, in contrast to conventional weather sites, allow consumers to not only obtain pertinent weather information but also to actually plan their activities. To illustrate the advantages of the planning functionality in the invention, an example will be given with reference to planning a golf event. FIG. 11(C) illustrates a golf index page which is presented to the consumer after selecting the link "plan for golf" in the activity planner presentation component. This activity planner presentation component is preferably located in many places through the system, such as on the "Home" page, "Forecast & Maps" tab, in the "Activities" menu heading, as well as in other places. The golf index page allows the consumer to obtain golf and weather information. For example, as shown in FIG. 11(C), a consumer is presented with a "Find a Local Golf Course" presentation component which serves as a tool for searching for a golf course. The golf course locator tool preferably allows consumers to search public, private, semi-private, military, resort, or all courses for a specified geographical division. Thus, through this golf index page, the consumer can plan to play golf in a specified geographical division by entering the division of interest. While not shown, the golf course locator tool preferably also enables the consumer to search for courses by name, golf index, weather conditions, cost, level of difficulty, and availability.

Figure 11D:
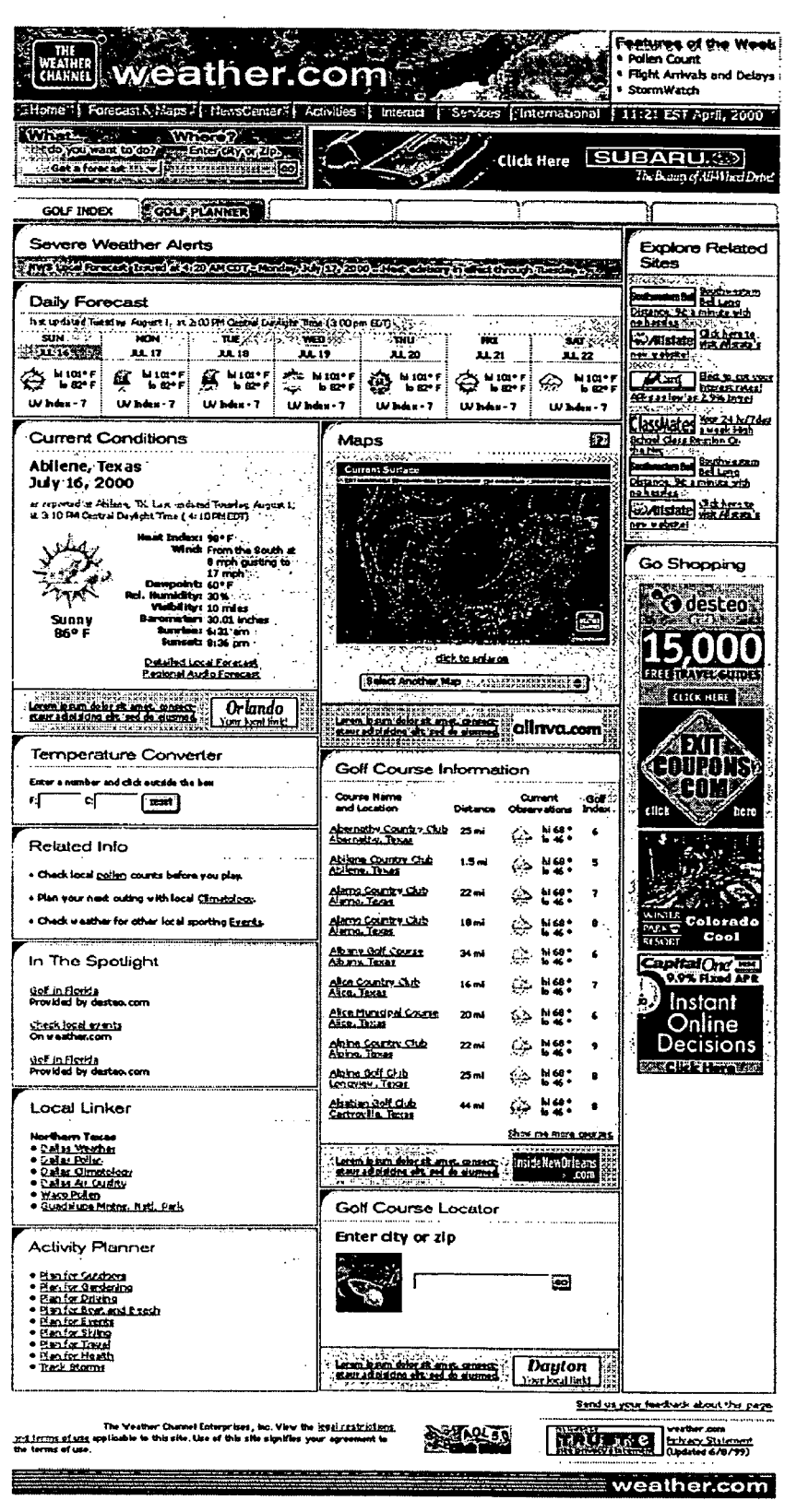

For instance, if the consumer is interested in playing golf in Abilene, Tex., the consumer can enter the city and state in the "play golf in" text box and the consumer can receive a page such as the one shown in FIG. 11(D). As shown in this figure, the consumer receives the current weather conditions for Abilene, Tex., the temporal navigator, the maps navigator, and the severe weather alert, if one has been issued for that region. The golf planner page additionally provides the consumer with a list of golf courses near Abilene, Tex., current observations at those courses, and a golf index. The golf index is a measure of a set of weather conditions that influence the game of golf, such as temperature, humidity, lightning conditions, wind conditions, and precipitation. The golf course information presentation component shown in FIG. 11(D) also provides other useful information on courses, such as distance from the geographical location of interest, which in this case is Abilene, Tex. Other information, such as cost, availability, and level of difficulty could also be provided in the presentation component and/or may be available on links to the individual courses. The golf course information presentation component therefore allows consumers to more easily plan their activities by giving consumers the weather information tightly integrated with golf information, such as a list of golf courses associated with a geographical division, weather conditions, and an index that consumers can use as a tool to rank the courses based on weather.

In this example the consumer went to the golf index page and entered the geographical region of interest. The consumer can obtain the golf planner page in other ways without going through the golf index page. For example, if the consumer had already specified a geographical division, such as through a local weather search, through a search of maps, through climatology, through "My Weather" or in planning for other types of activities in the geographical division, such as travel.

IX. Exemplary Consumer Navigation

Figure 12A:
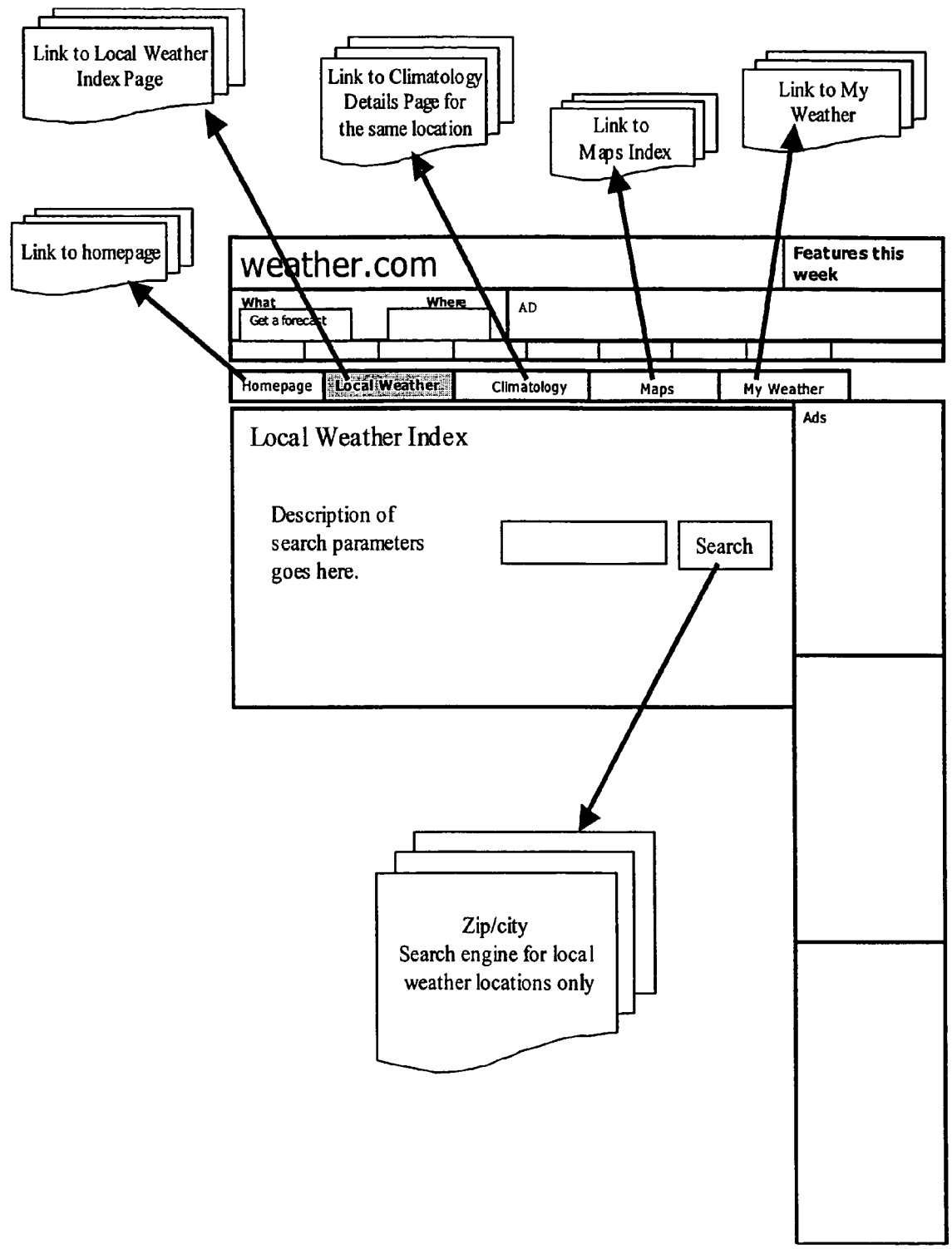
FIGS. 12(A) to 12(N) are mock-up screen shots of interfaces describing an exemplary consumer navigation through the system.
Figure 12B:
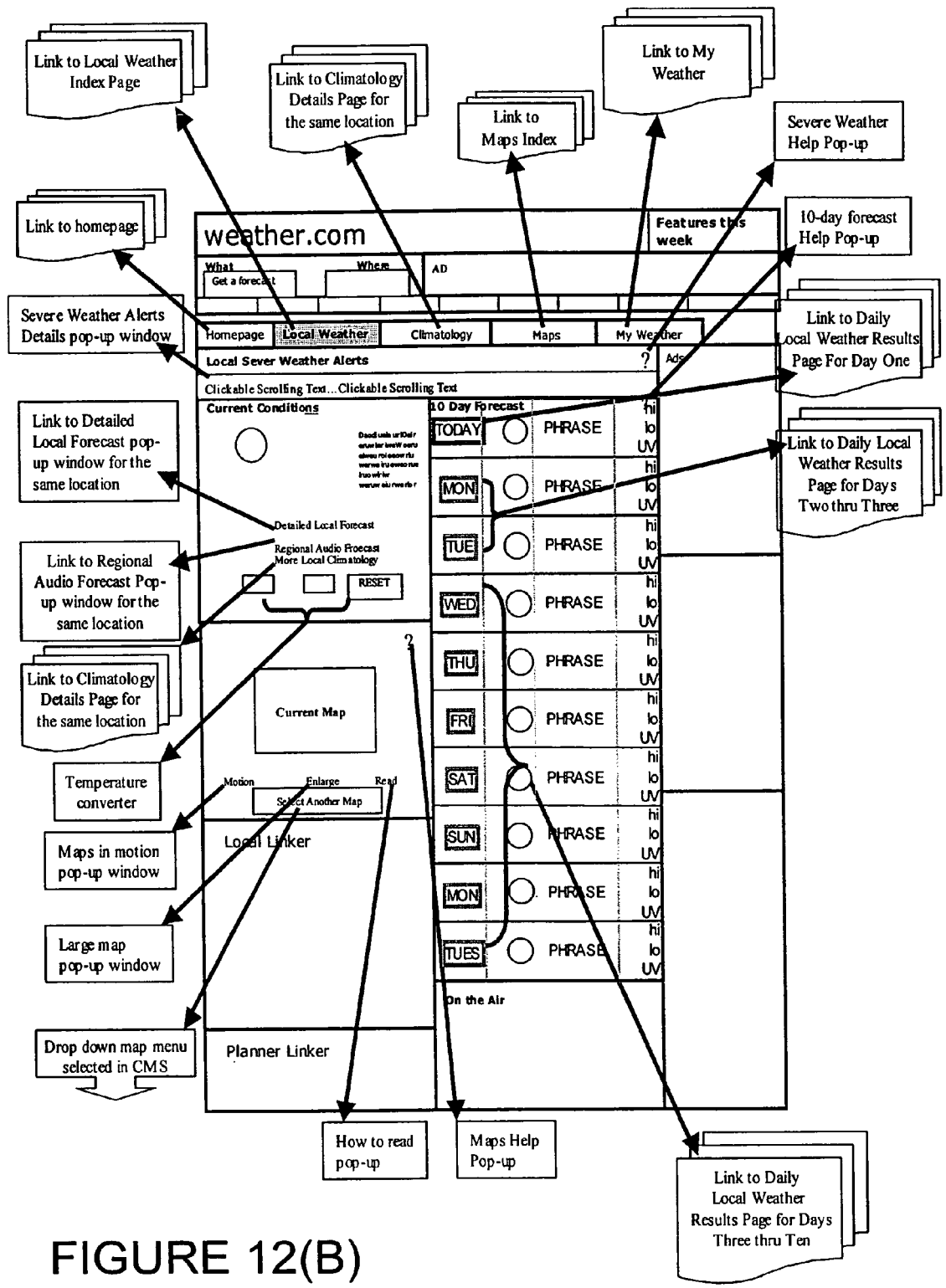
Figure 12C:
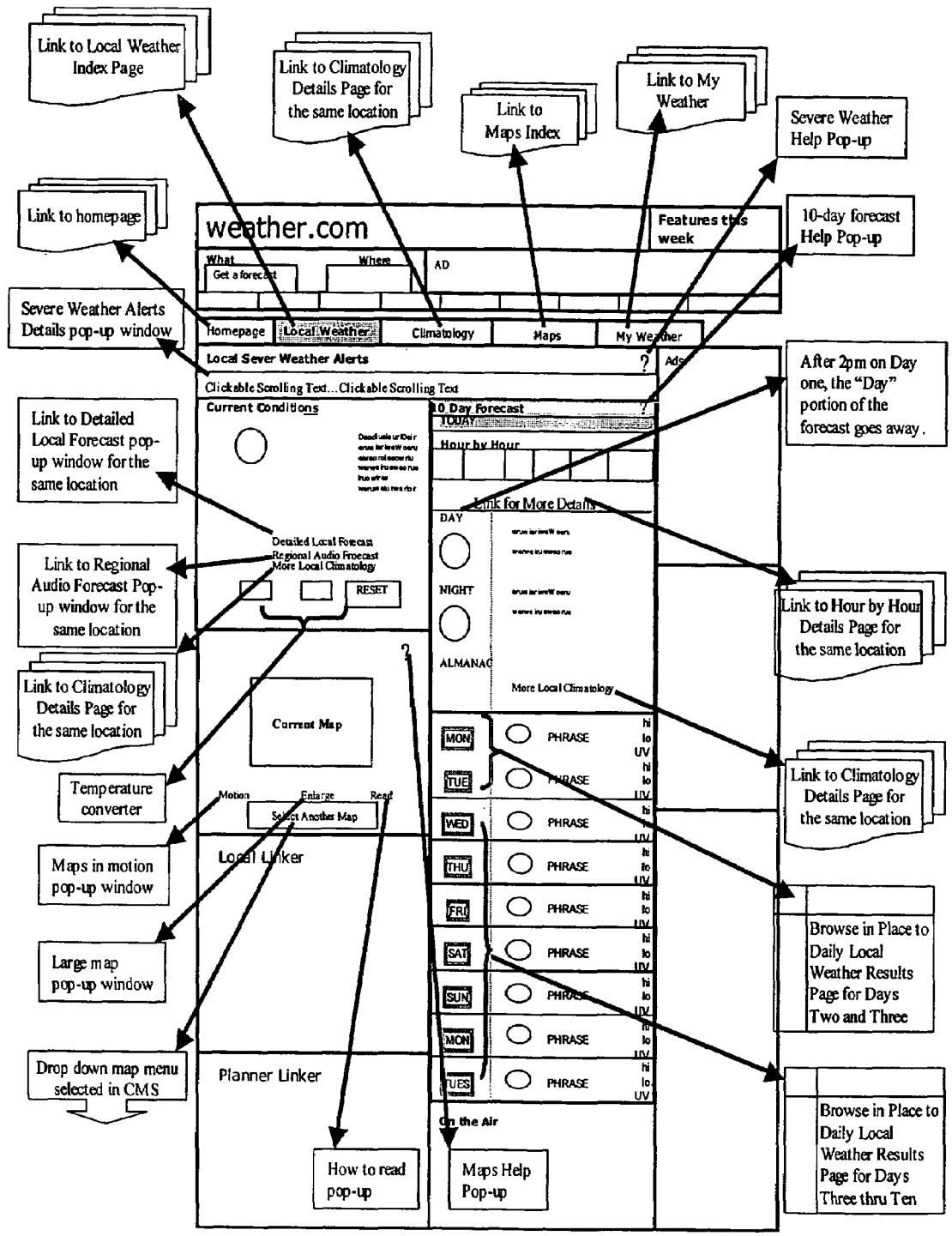

The invention has been described above with reference to various tools, navigators, presentation components, content areas, linkage, interfaces, and planning functionality. An example will now be given of a consumer's possible navigation through a site operated by a system of the invention in order to illustrate aspects of the invention. In this example, the consumer first goes to the home page and then clicks on the "Local Weather" tab to obtain local weather conditions for a desired geographical division. The consumer is then presented with the interface shown in FIG. 12(A) in which the consumer is prompted to enter the geographical division of interest, such as by entering a zip code or city. The consumer next receives the interface shown in FIG. 12(B), which is the local weather page for the specified division. As discussed above, the local weather page has the map navigator and temporal navigator which allow the consumer to navigate through the maps and also navigate through time. If a weather alert has been issued for that region, then the interface shown in FIG. 12(B) displays the alert in clickable scrolling text. The consumer also receives a local linker presentation component to allow the consumer to navigate through the hub-and-spoke localized/contextual architecture. The local weather page also has a planner linker presentation component to allow the consumer to plan for activities.

Figure 12D:
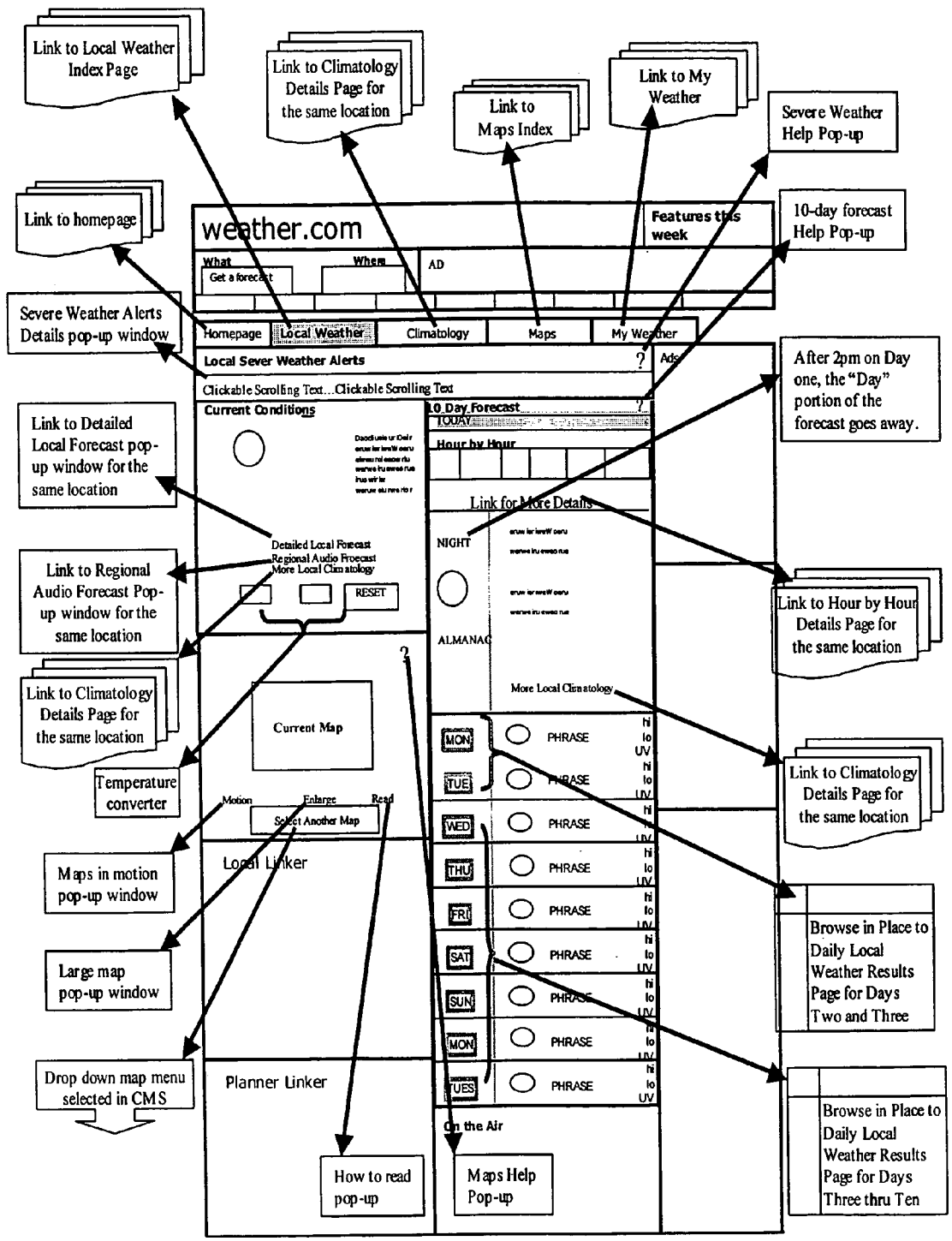
Figure 12E:
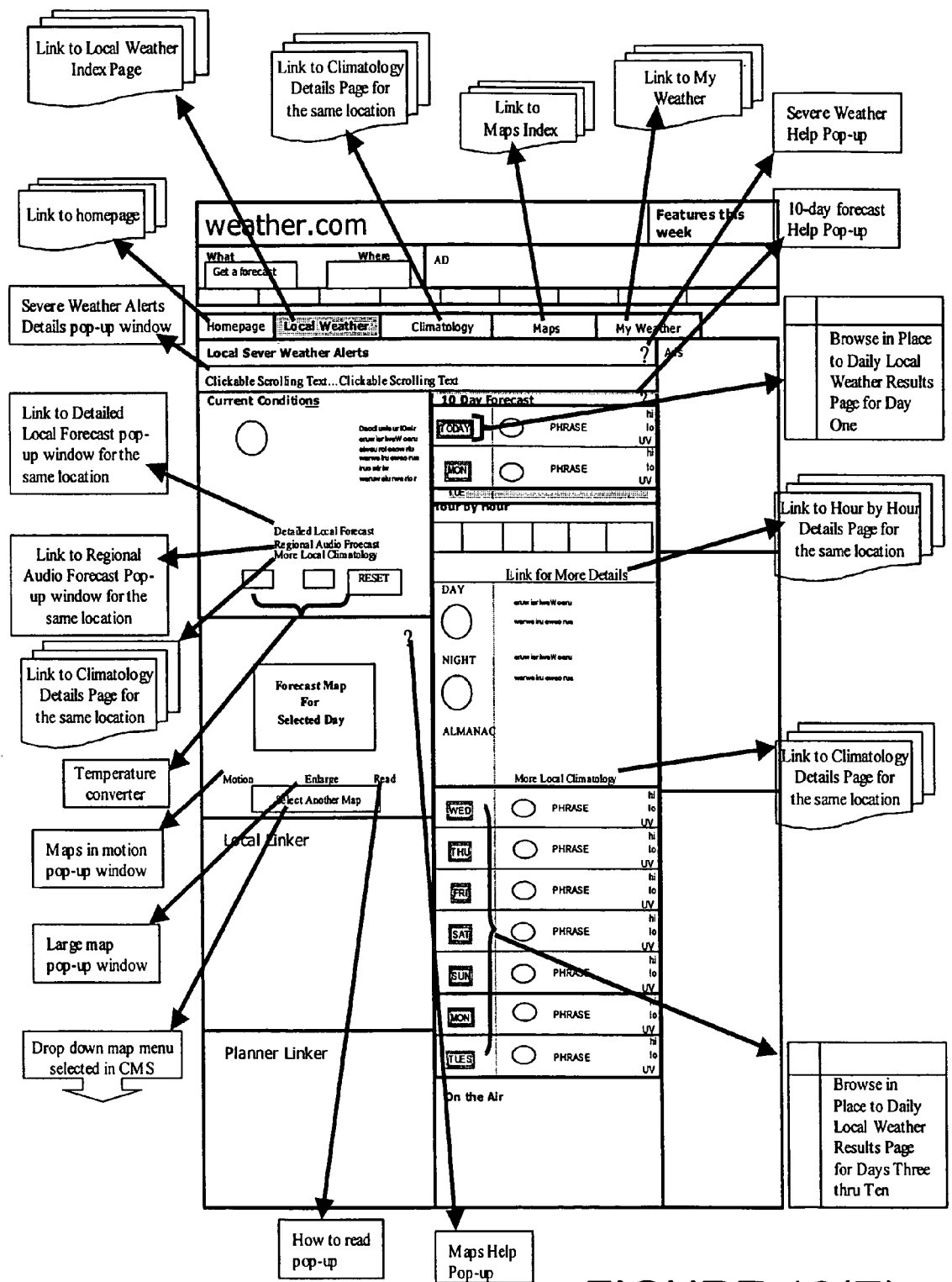
Figure 12F:
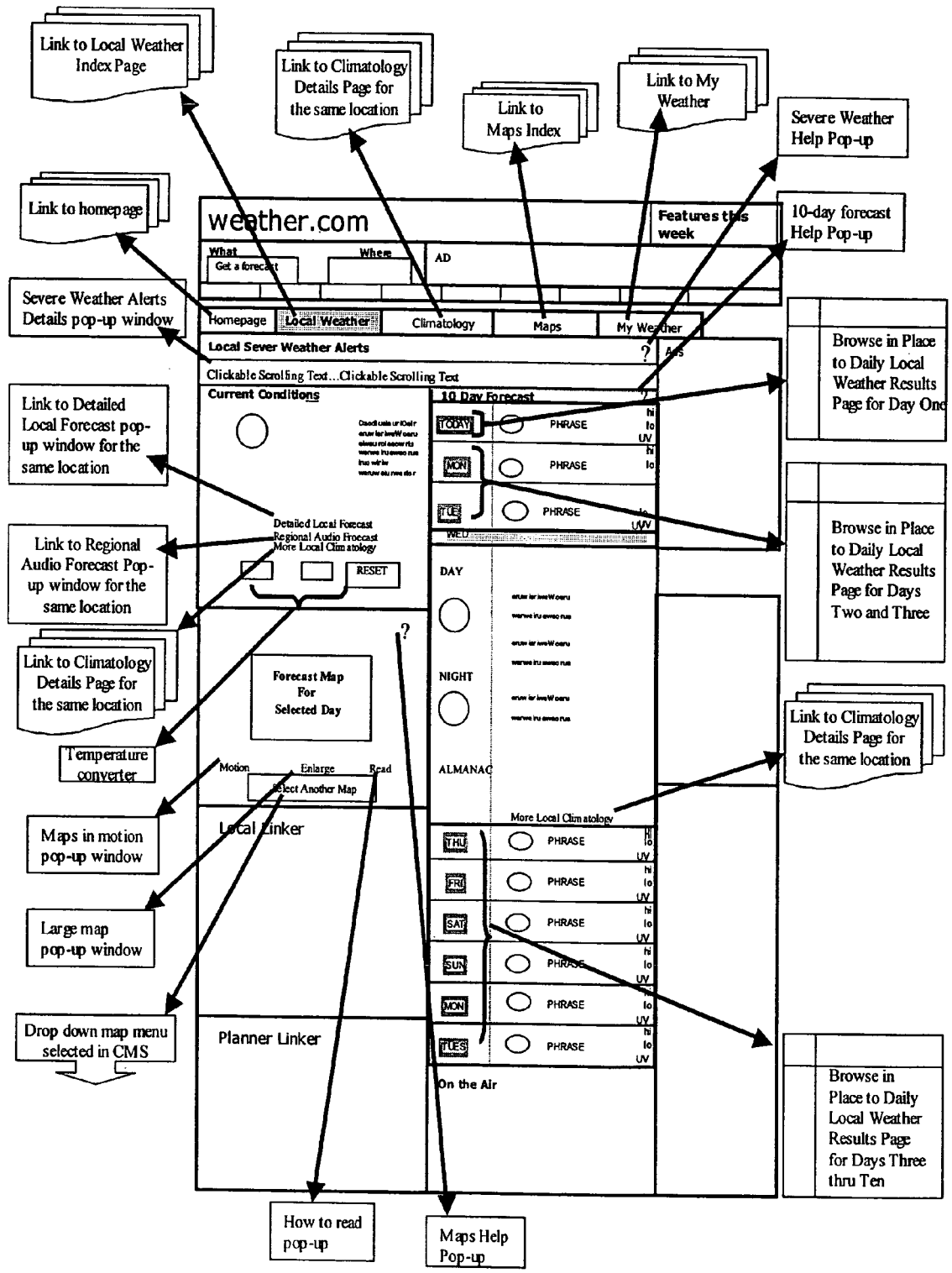
Figure 12G:
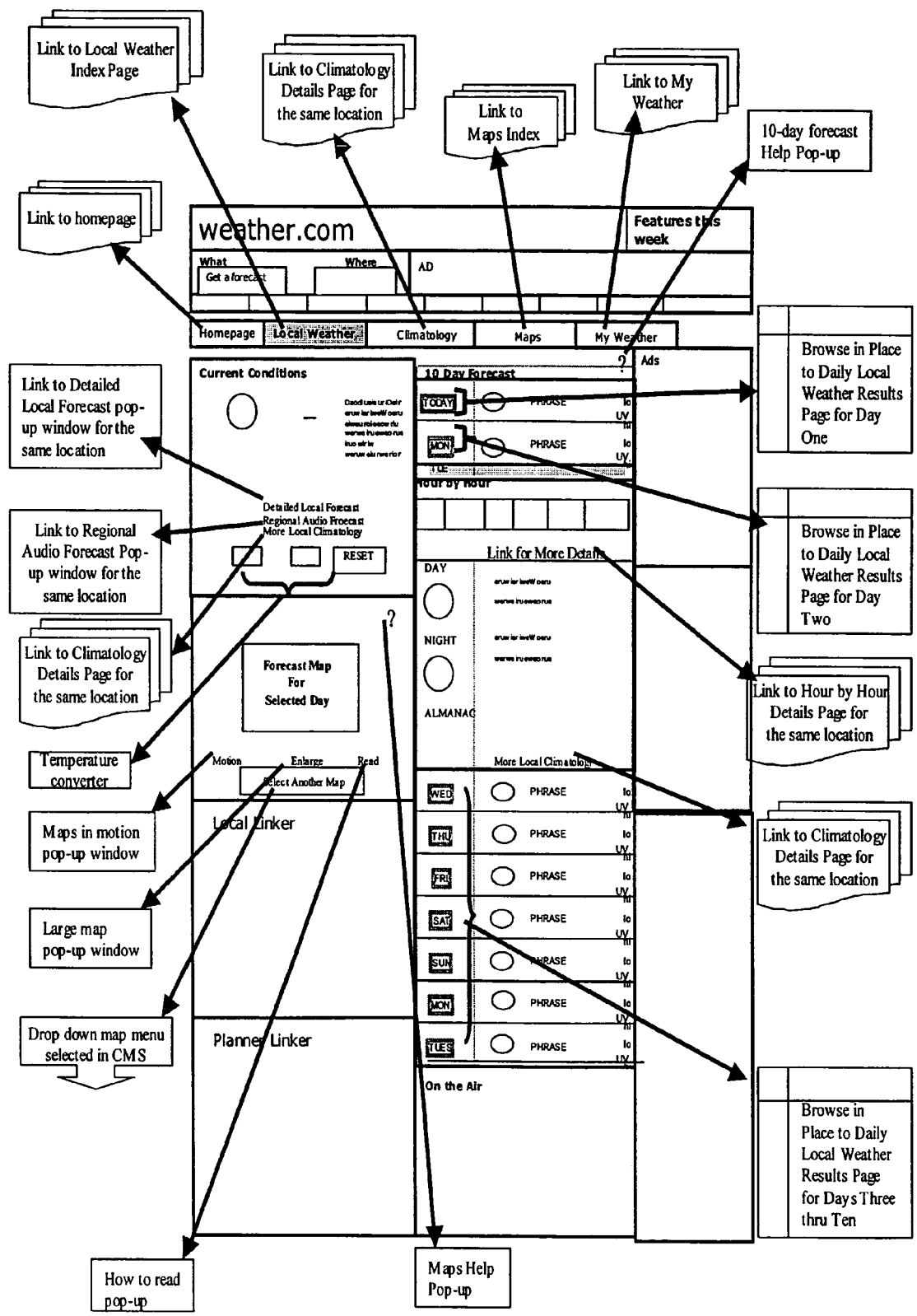
Figure 12H:
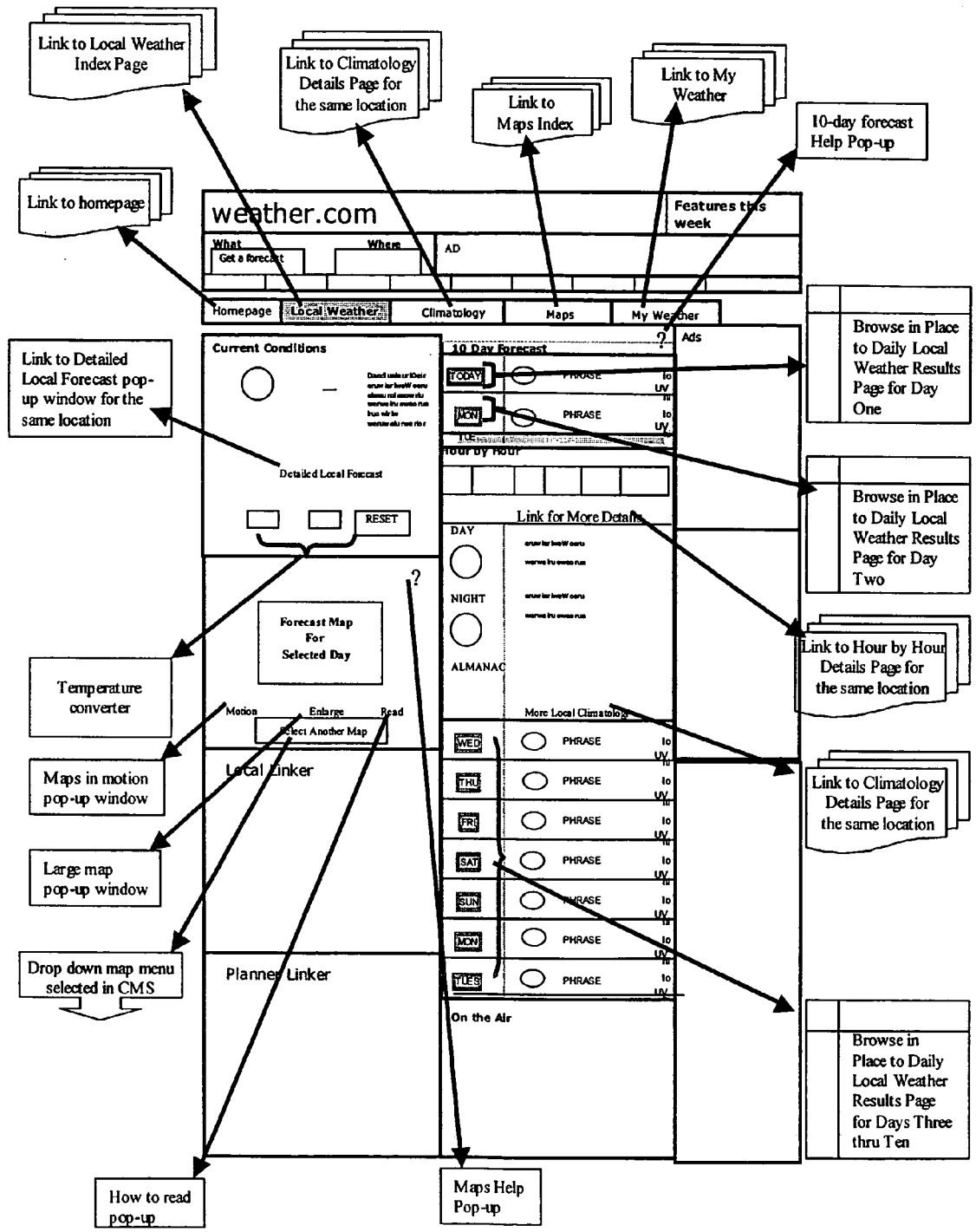

Through the temporal navigator, the consumer can obtain more detailed weather information for the days shown in the forecast window. For example, by selecting the present day, the consumer obtains a more detailed break down of the weather conditions for the day, such as hour by hour, day conditions, night conditions, and almanac data. After 2:00 p.m. for the region of interest, the consumer preferably receives the interface shown in FIG. 12(D), which includes the night forecast but does not include the day portion of the forecast. If instead of selecting the current day, the consumer selects either day two or three from the temporal navigator, the consumer preferably receives the interface shown in FIG. 12(E). As the consumer navigates farther in time, the ability to provide precise weather forecasts on a granular level becomes impossible. Consequently, when the consumer selects day four from the temporal navigator, the consumer preferably receives the interface shown in FIG. 12(F) in which the hour by hour forecast information has been deleted. The local weather pages shown in FIGS. 12(B) through 12(F) include a local severe weather alert presentation component for displaying weather alerts. An example of an interface without the severe weather alert is shown in FIG. 12(G). An example of local weather for an international city is shown in FIG. 12(H).

Figure 12I:
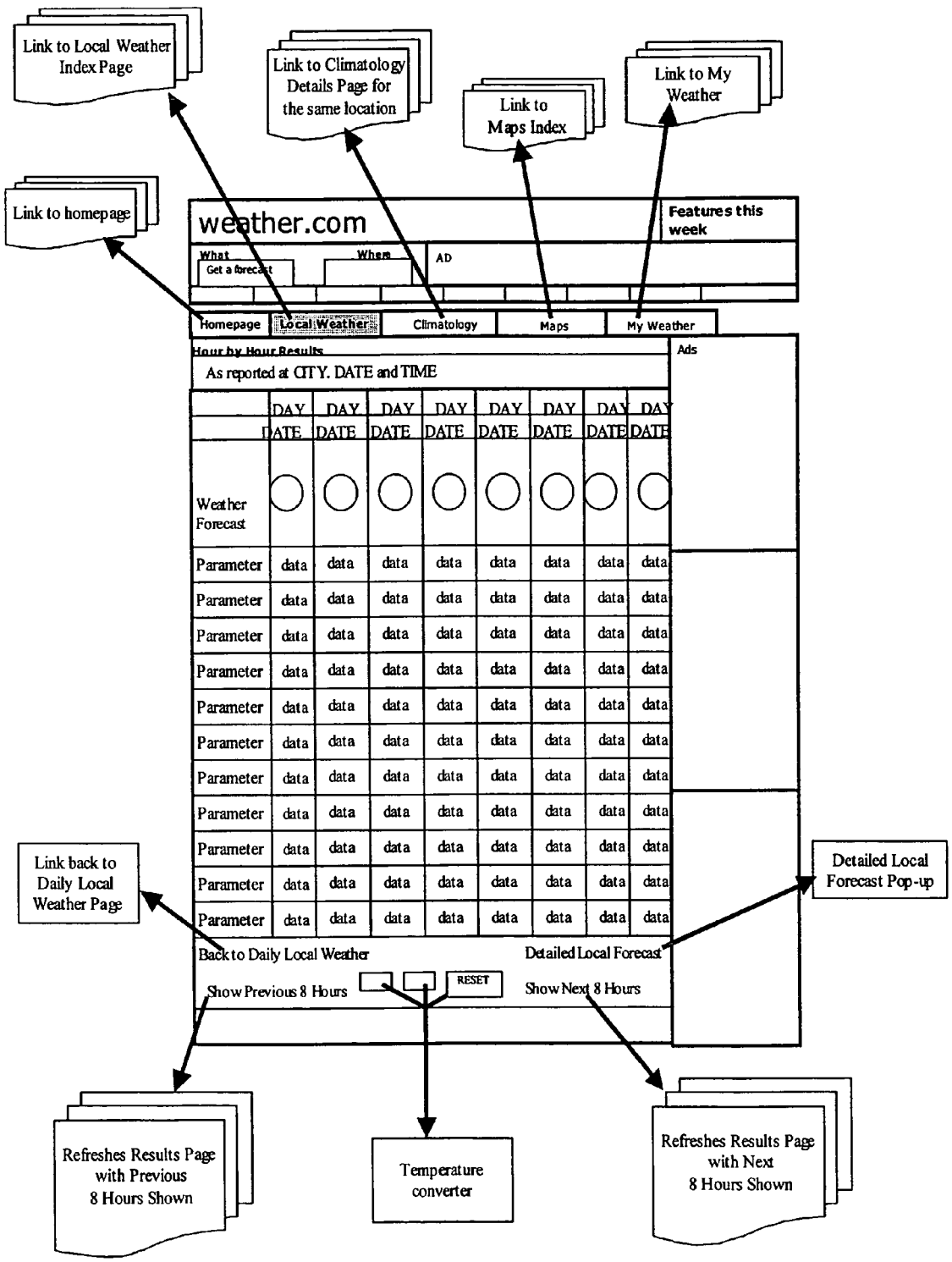

As shown above in FIGS. 12(C), (D), (E), (G), and (H), a link to an hour by hour details page is provided on the temporal navigator when the results for one day are displayed. An example of an hour by hour details results page is shown in FIG. 12(I). Through this hour by hour details results page, the consumer can navigate hour by hour through the weather data for a particular location and date. From this page, the consumer can also jump back to the daily local weather or go to other information contained on the site.

Figure 12J:
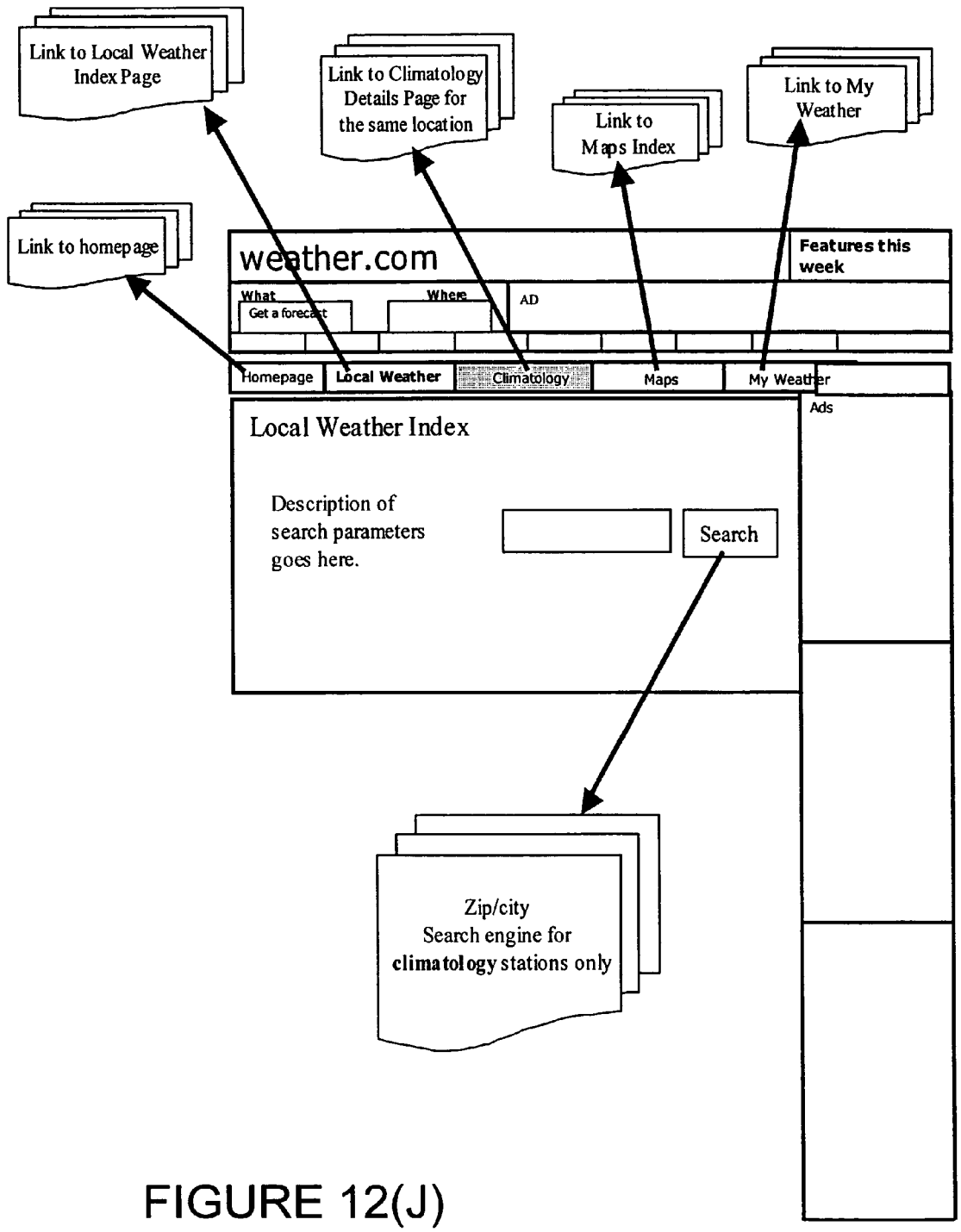
Figure 12K:
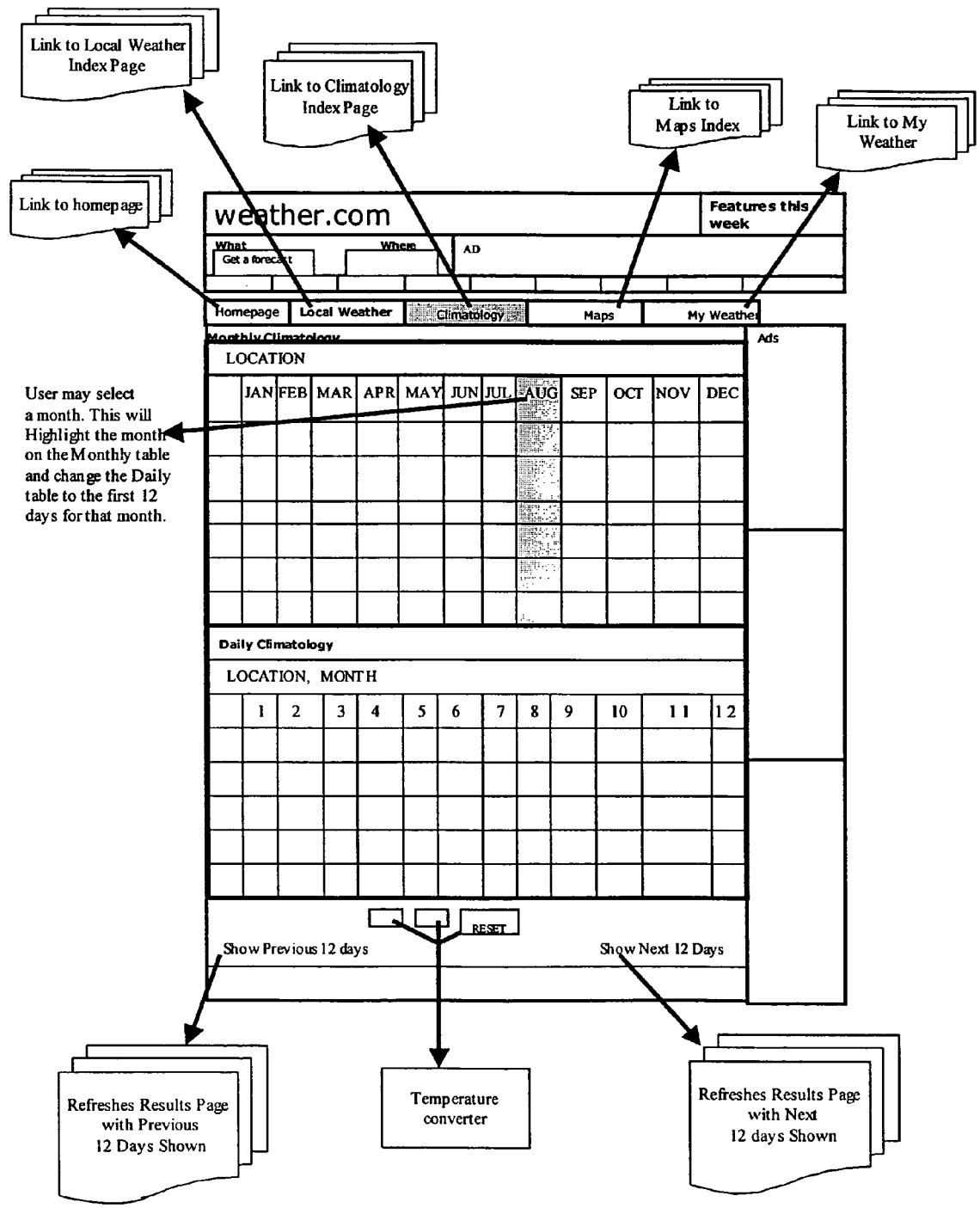

By selecting the "Climatology" tab, the consumer receives a climatology index page, such as the one shown in FIG. 12(J). From this index page, the consumer enters the geographical division where the consumer desires climatology information. For instance, the consumer can enter the zip code or name of a city to receive the corresponding climatology data. An example of a climatology details results page is shown in FIG. 12(K). At first, the climatology details results page includes a presentation component for monthly climatology data for the geographical region of interest. Upon selecting one of the months within the monthly climatology presentation component, the consumer receives a daily climatology presentation component beneath the monthly climatology presentation component. If all days of the month are not shown in the daily climatology presentation component, the consumer can select the other days in order to obtain climatology data for any day of the month. As with the local weather, if the consumer had already specified a geographical division or period of time and then selected the climatology tab, the consumer directly receives the climatology data for the geographical division of interest and the daily climatology presentation component has the selected period of time highlighted.

Figure 12L:
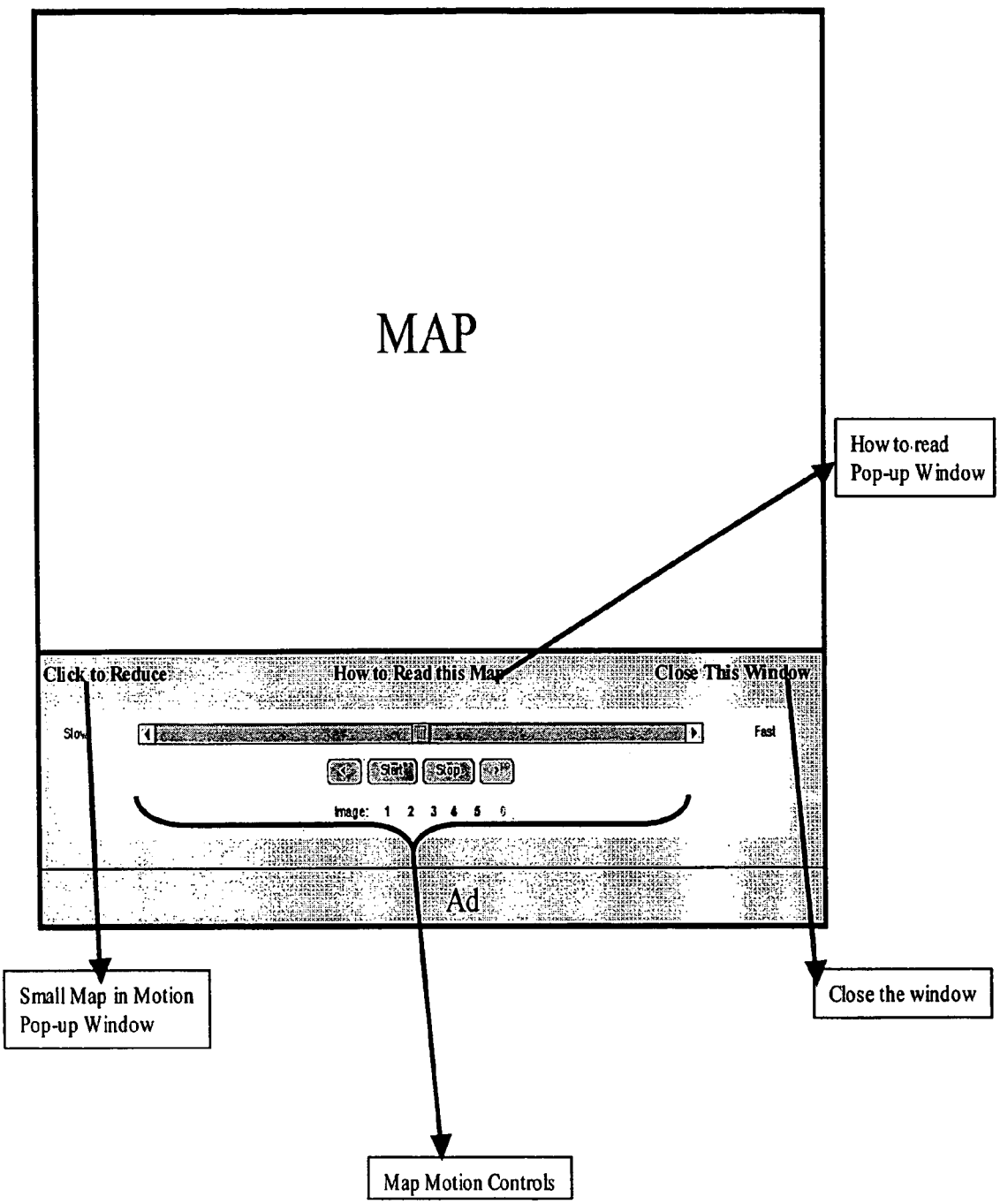
Figure 12M:
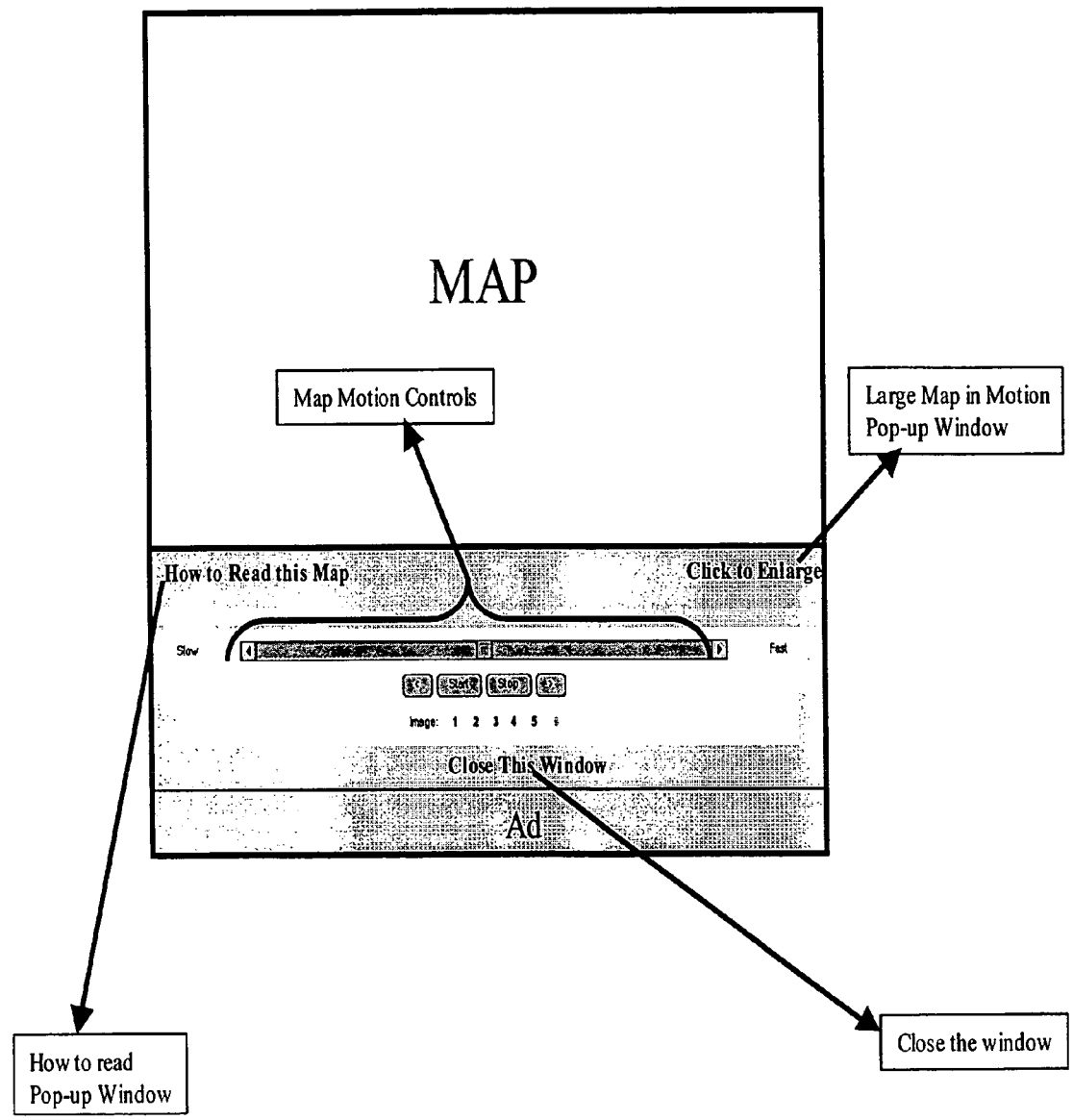
Figure 12N:
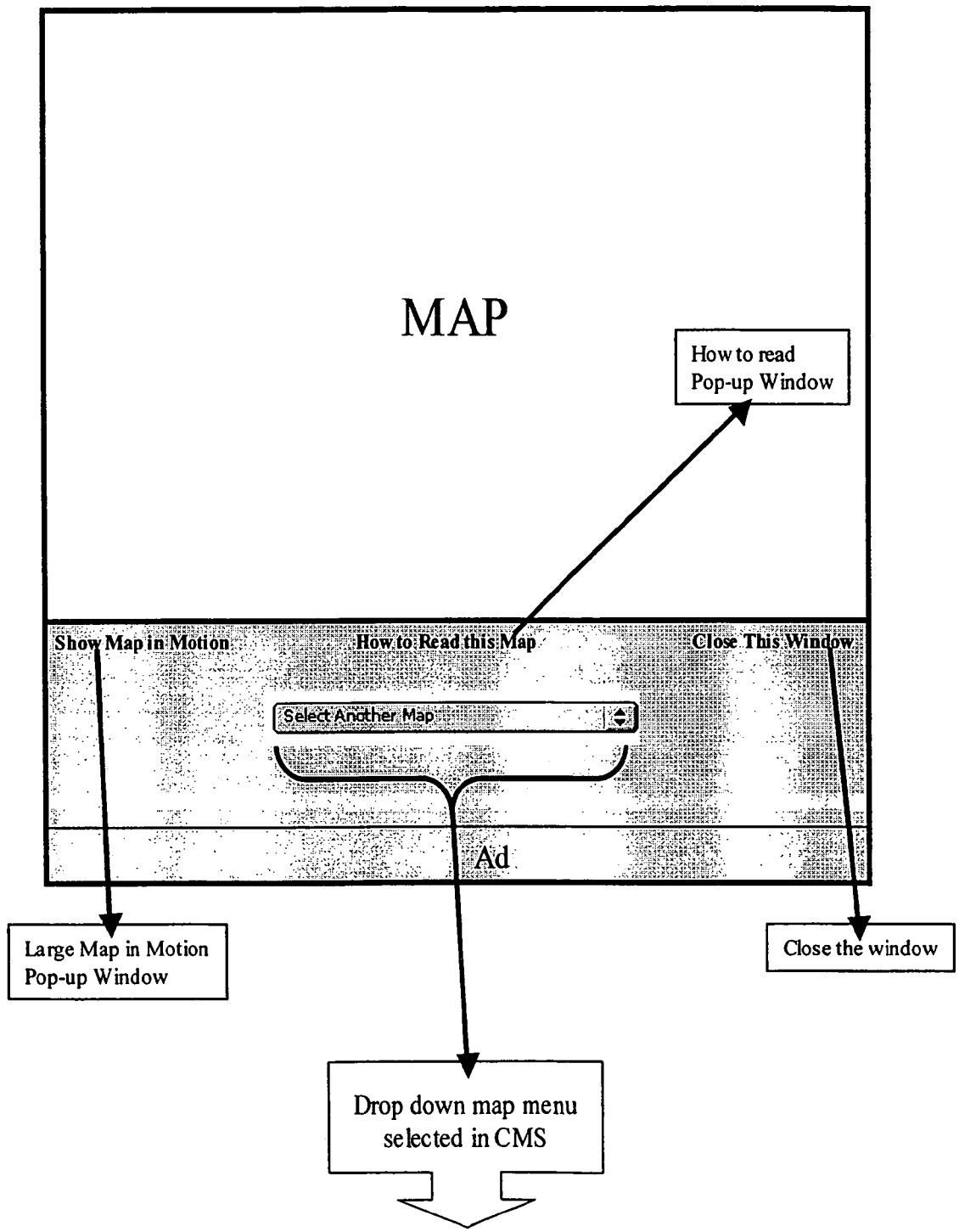

As mentioned above, a map navigator is provided on many of the interfaces and can be obtained through the "Maps" tab or through other navigation routes. Upon selecting the map navigator, the consumer receives a pop-up window of the map, such as shown in the interface in FIG. 12(L). With reference to FIG. 12(L), the consumer can use map motion controls to view the map in motion, if the map is motion-enabled. The consumer can click on a "How to Read this Map" link to obtain an explanation of the map and can click on a "Click to Reduce" link to obtain a small map pop-up window, such as the one shown in FIG. 12(M). The small pop-up window shown in FIG. 12(M) includes similar links but includes a "Click to Enlarge" link to obtain the large pop-up window shown in FIG. 12(L). The maps shown in FIGS. 12(L) to 12(N) form a family of maps which in this example are maps of different sizes. Some of the map navigators allow consumers to view a collection of maps, each of which may be part of a family of maps. FIG. 12(N) illustrates a pop-up window of map navigator having a drop-down menu of maps in the same collection as the one shown. The consumer can use this drop-down menu to select any one of the maps in that collection.

X. Architecture Overview

Figure 13:
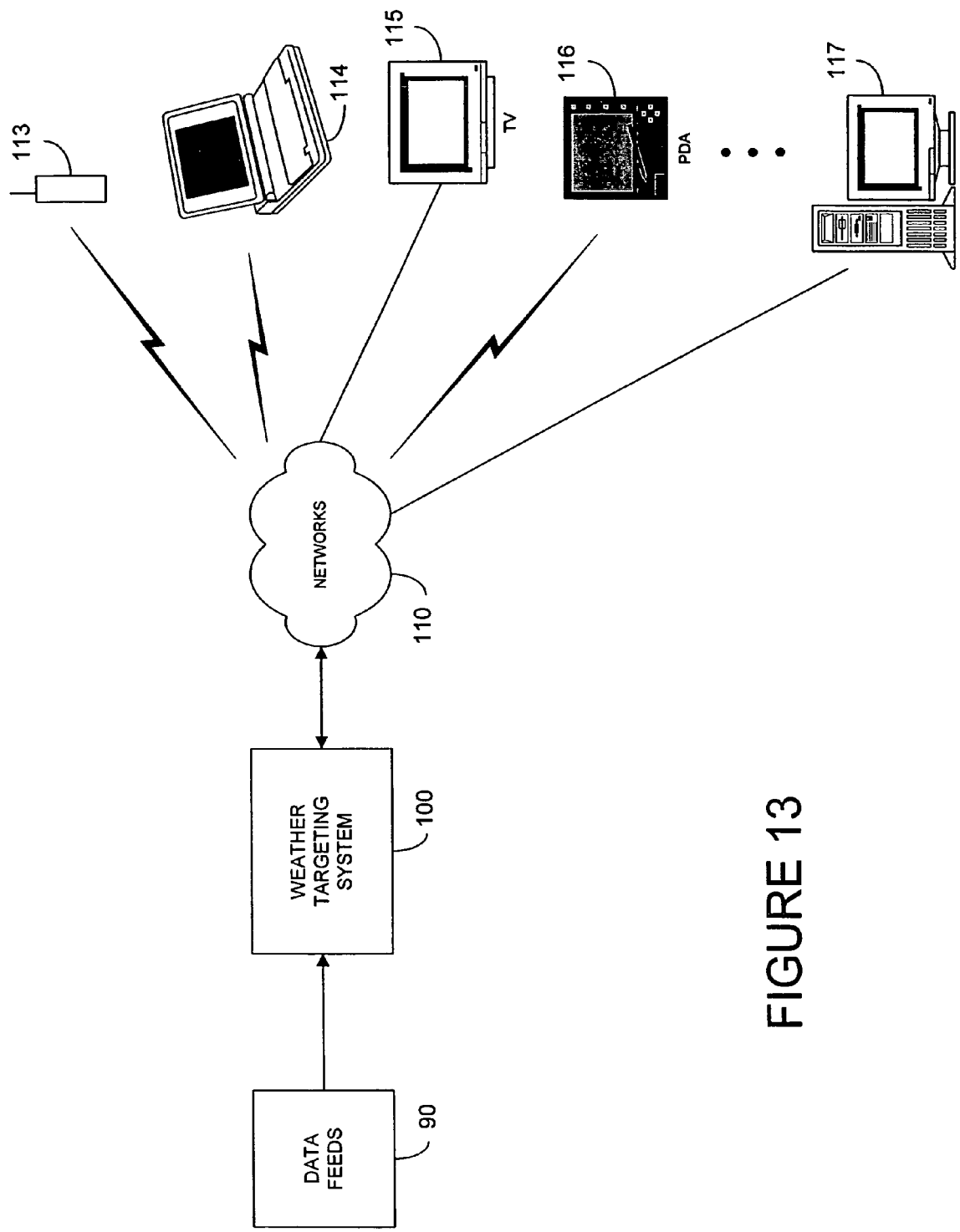
FIG. 13 is a block diagram of a network including the system according to the preferred embodiment of the invention.

A weather system 100 according to a preferred embodiment of the system is illustrated in FIG. 13. The weather system 10 receives information from one or more data feeds 90. These data feeds 90 may be derived from governmental sources, commercial suppliers, private citizens or groups, mobile or stationery sources, or terrestrial, air-borne, space-situated, or marine-based sources. Some examples of data feeds 90 for weather information include National Weather Service, the National Center for Environmental Predictions, The Weather Channel, NOAA, Fleet Weather, Weather Labs, Inc., Accu Weather, Weather Concepts, or any third party value added supplier. The data feeds 90 also include non-weather information which could relate to golfing, skiing, traffic, airport delays, events, activities, sporting events, advertisements, recommendations, commands, etc.

The weather system 100 communicates with a plurality of devices through one or more networks 110. For instance, as shown in FIG. 13, the weather system 10 communicates with mobile radiotelephones or other communication devices 113, lap-top computers 114, digital TV, WebTV, and other TV products 115, Palm Pilots, Pocket PCs, and other Personal Digital Assistants 116, and desk-top computers 117. The weather system 100 advantageously is not limited to these types of products 113 through 117 but is able to accommodate new products as well as new brands, models, standards or variations of existing products. As will be described in more detail below, the weather system 100 can optimize the presentation and selection of information according to the network 110 as well as the product.

The network 110 will, of course vary, with the product receiving the information from the weather system 100. For mobile radiotelephones 113, the network may comprise AMPS, PCS, GSM, NAMPS, USDC, CDPD, IS-95, GSC, Pocsag, FLEX, DCS-1900, PACS, MIRS, e-TACS, NMT, C-450, ERMES, CD2, DECT, DCS-1800, JTACS, PDC, NTT, NTACS, NEC, PHS, or satellite systems. For a lap-top computer 114, the network 110 may comprise a cellular digital packet data (CDPD) network, any other packet digital or analog network, circuit-switched digital or analog data networks, wireless ATM or frame relay networks, EDGE, CDMAONE, or generalized packet radio service (GPRS) network. For a TV product 115, the network 110 may include the Internet, coaxial cable networks, hybrid fiber coaxial cable systems, fiber distribution networks, satellite systems, terrestrial over-the-air broadcasting networks, wireless networks, or infrared networks. The same type of networks 110 that deliver information to mobile radiotelephones 113 and to lap-top computers 114 as well as to other wireless devices, may also deliver information to the PDAs 116. Similarly, the same types of networks 110 that deliver information to TV products 115 may also deliver information to desk-top computers 117. It should be understood that the types of networks 110 mentioned above with respect to the products 113 to 117 are just examples and that other existing as well as future-developed networks may be employed and are encompassed by the invention.

A. System Diagram

Figure 14:
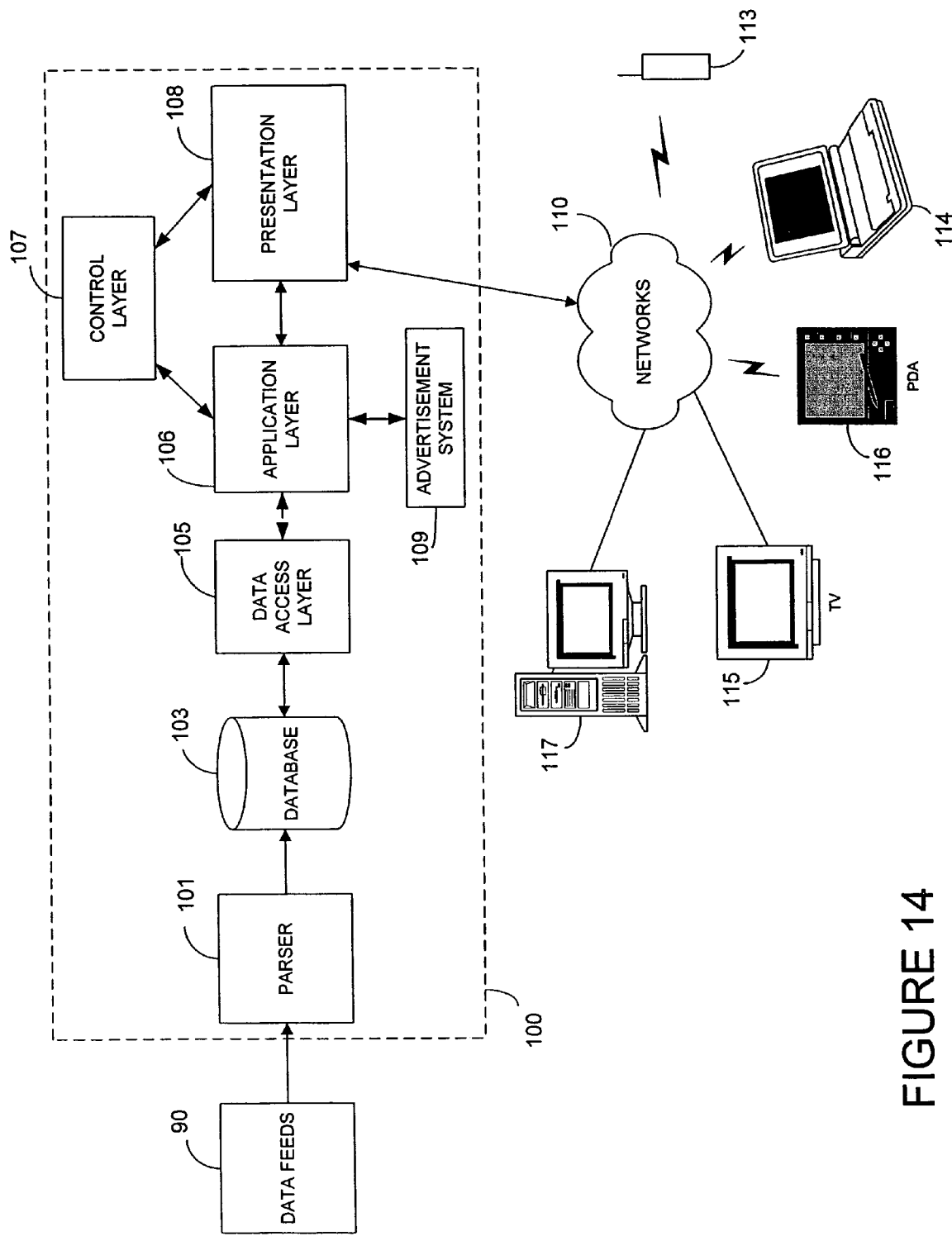
FIG. 14 is a high-level block diagram of the system of FIG. 13.

A more detailed block diagram of the weather system 100 is shown in FIG. 14. As discussed above with reference to FIG. 13, the weather system 100 receives weather information from data feeds 90 which not only include weather information but are also intended to encompasses other content, especially content suitable for planning purposes. The weather system 100 includes a parser 101 for receiving the data and for storing the data within database 103 and a data access layer 105 for controlling the retrieval of data from the database 103. A control layer 107 controls the application flow, such as the flow of information, data, and other signaling, between the various components of the system 100. An application layer 106 incorporates business rules and other logic to manage the application data and to determine how to respond to consumer requests. A presentation layer 108 controls the look and feel of the content and delivers the content to the consumers. The system 100 preferably also includes an advertisement system 109 managing the advertisements that are selected and delivered to consumers. It should be understood that the structure of the system 100 is one example of how the system 100 may be implemented and that the system 100 may vary from that shown in FIG. 14.

The weather system 100 advantageously creates the single database 103 which stores the weather information and other information used by all of the products. Thus, the information delivered to a PDA 116 is obtained from the database 103 as is the information that is delivered to TV products 115. In contrast, many conventional systems presently create one database of information that is suitable for delivery to one particular type of product, such as the PDA 116. These systems have a second separate database of information that is suitable for delivery to other products, such as desk-top computers 117. When another type of product is introduced into the market, these conventional systems create yet another database which stores information in a format compatible for the new product. The weather system 100 eliminates the need for these multiple databases and consequently greatly simplifies the manner in which information can be delivered to multiple products.

In the preferred embodiment, the parser 101 receives information from data feeds 90 and parses the data into XML. The parser 101 receives the data feeds 90, tags the information, and stores the tagged information in the XML database 103. The parser 101 performs a translation function parsing the data from data feeds 90 into a common document model tree. In the tree, which is preferably based on XML or successors to it, the data and their attributes are mapped into nodes which fit the common document model for storage in the database 103. The parser 101 accepts a wide variety of data types or formats and puts the data in a form and format that can be used by the common document or data model. The parser 101 uses rules in determining how exactly the data should be formatted and what attributes the data should take. These rules are preferably written using a uniform rules definition language (URDL). The parser 101 may comprise a plurality of parsing engines with each engine associated with one of the data feeds 90 or associated with a type or format of data feed 90. The parser 101 defines which template to provide based on either extension or language as defined by the URL. The deliverable is device dependent but language independent. The template defines what elements to include so that a Palm template will only load Palm elements, a pager element will only load pager elements, etc. The manner in which data is parsed and stored in the database 103 will become more apparent from the description below.

A preferred system according to the invention allows for the delivery of dynamic content to consumers. The system is used for the delivery of content and other data to any type of product, such as the wireless phones 113, personal digital assistants (PDAs) 116, TV products 115, and computers 117, as well as different platforms, such as web, wireless, etc. The system 100 separates the presentation of data from the actual application processing and data itself. The system 100 has many advantages over conventional systems, including it provides a quick development and delivery of applications, is scalable, and provides optimal performance.

B. System Architecture

The system 100 preferably adopts a model-view-controller design paradigm (MVC) to enable the business logic to be separated from the presentation, thereby making it easier to modify either one without affecting the other. The MVC paradigm was introduced by Small Talk Developers at Xerox PARC in the late 1970's and its basic idea is to split an application into three distinct parts, each of which can be replaced without affecting the others. The model part is the data of the application which, along with the business logic, defines how to change and access the data. The model part can be shared among any number of view and controller objects. The view part relates to presenting the model's data to the outside world and can take the form of a graphical user interface (GUI), generated speech, audible tones, printouts, or even non-user oriented output, such as turning on an air conditioner. The controller part involves gathering consumer or other environmental input and providing feedback to the model. The controller part normally involves changing some of the data in that model or changing the view, such as the presentation. In general, the view, and possibly the controller ask the model for its current state. The view may present data to the consumer and the controller may check the data to help decide how to handle consumer interaction. The controller monitors input, such as consumer input, interprets the input, and, in response, asks the model to update its data and/or asks the view to change the way it displays the data. Advantageously with the MVC paradigm, the system 100 can have any number of controllers and any number of views while maintaining one set of business objects representing the model that supports multiple platforms.

Figure 15:
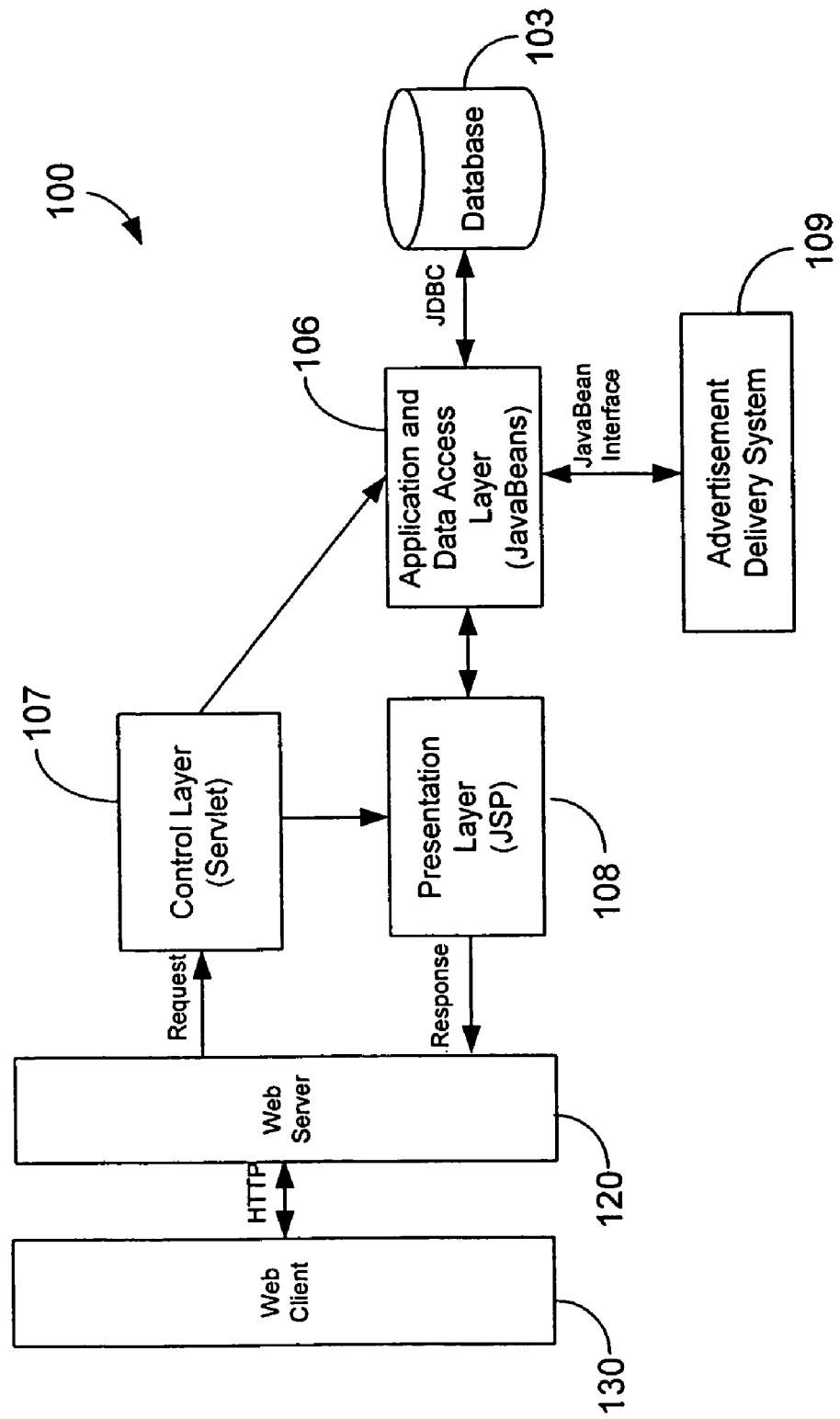
FIG. 15 is a diagram of a web application architecture for the system of FIG. 13 representing a model-view-controller pattern.

FIG. 15 is a more detailed block diagram of the system 100 representing the MVC pattern. In the example shown in FIG. 15, the system 100 is applied to a web architecture but it should be understood that the MVC model remains the same for other application delivery platforms. The system includes a web server 120 for receiving requests over the Internet from a web client 130. A controller servlet 107 serves requests made by consumers and forwards the control to an appropriate Java script page (JSP) in the presentation layer 108 based on the request. The control layer 107 uses a command framework to control the flow through the system 100. The JSPs are used for presentation purposes and use presentation beans to display the data to the consumer. The JSPs are preferably used in a comparable way to HTML pages but with almost no application logic and can be modified easily by content personnel.

C. Application and Data Access Layer

Figure 16:
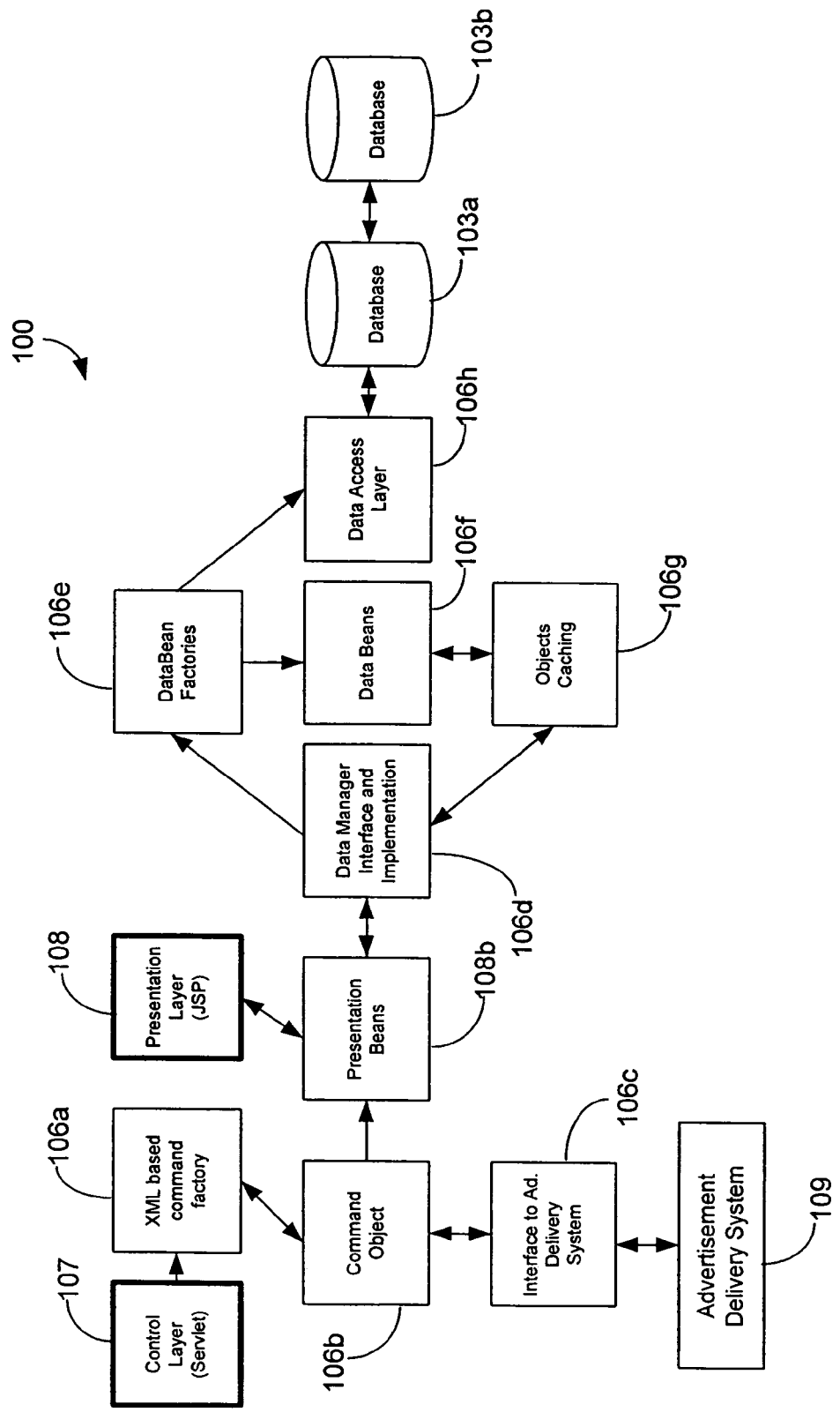
FIG. 16 is a more detailed block diagram of an application and data access layer of the system shown in FIG. 14.

FIG. 16 illustrates in more detail the application layer 106 shown in FIG. 15. The database 103 is separated into first and second databases 103a and 103b. According to this aspect of the invention, database 103b acts as a centralized data warehouse for all purposes, such as for other companies, and receives weather and other data from external systems. Database 103a, on the other hand, is a staging database used for delivering data to the system 100 and allows the data to be more efficiently accessed. For example, the database 103a provides data in a derived form, not normalized form, for access in severe weather alerts for a county or a National Weather Service zone. While the database 103 is shown as two separate databases 103a and 103b the database alternatively could comprise a single database.

The system 100 shown in FIG. 15 includes an application and data access layer 106. With reference to FIG. 16, a data access layer 106h deals with issues relating to the connection and communication with database 103a. For example, the data access layer 106h provides efficient access to business data through connection pooling and prepared statements. Data beans 106f are object representations of the business data and data bean factories 106e provide encapsulation of the logic related to the creation of the data beans 106f. Object caching 106g relates to caching of the data beans 106f and preferable adopts mechanisms which are flexible to cache any type of objects and not just data beans 106f. A data manager interface 106d provides a common interface for accessing the data beans 106f and encapsulates details concerning the finding of data beans 106f in cache and creating data beans 106f creating the data bean factory 106e, if necessary. The use of the data manager interface 106d allows the rest of the application to focus on processing business rules, both presentation and non-presentation related.

Presentation beans 108b process the business logic which, as discussed above, is both presentation as well as non-presentation related. Instead of having the presentation beans 108b process all of the business logic, the system 100 may include business objects for processing the non-presentation related business logic.

An XML based command factory 106a and command object 106b provide a framework for the flow control through the system 100. The command factory 106a is responsible for creating the command object 106b which, in turn, is responsible for creating all of the presentation beans 108b. The command object 106b is also responsible for retrieving all of the advertisements using an advertisement interface 106c. Overall, command objects 106b provide all of the data required by the presentation layer 108.

The advertisement interface 106c provides a common JavaBean interface to communicate with the advertisement system 109. The advertisement interface 106c passes parameters to the advertisement system 109 which allows the system 109 to make all of the advertisement decisions. The advertisement interface 106c encapsulates all of the functionality related to the communication with the advertisement system 109. Additional details about the advertisement interface 106c and the advertisement system 109 is provided below.

D. Process Flow

Figure 17A:
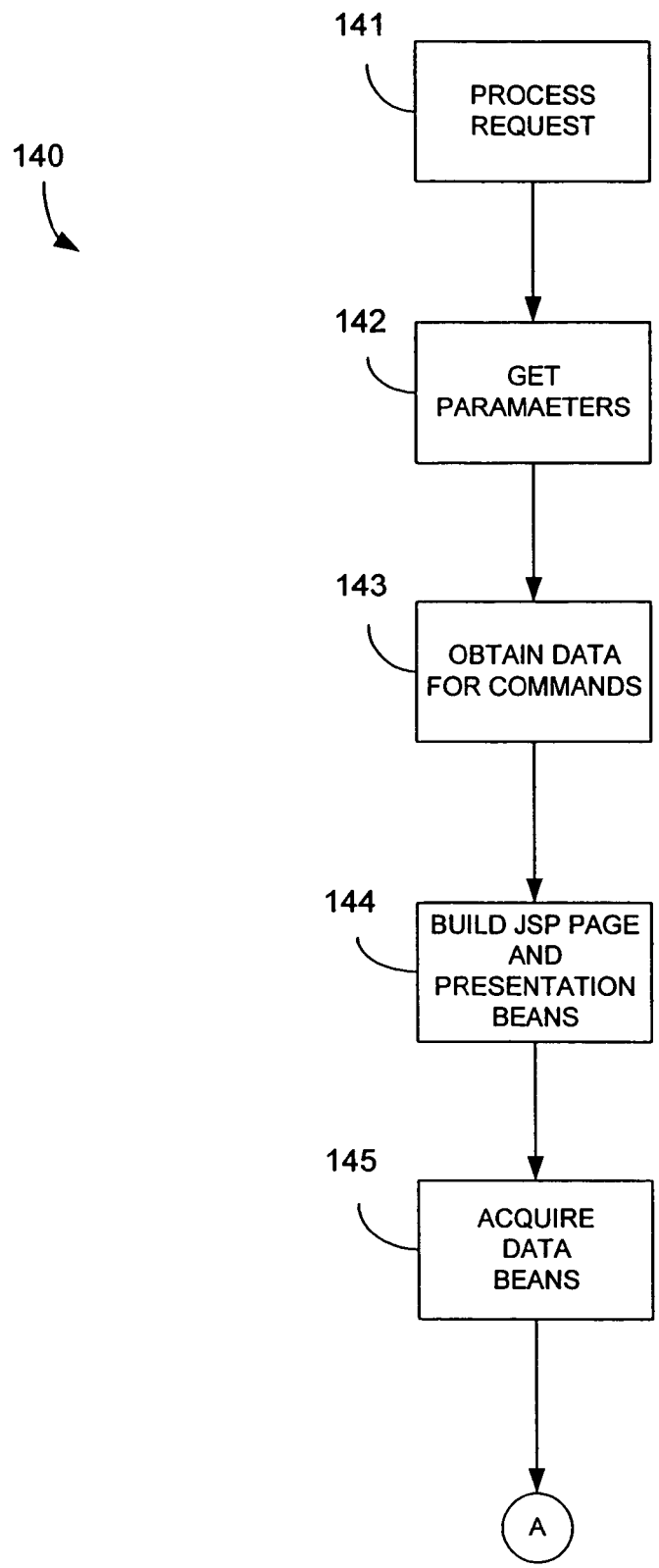
FIGS. 17(A) and 17(B) are flow charts depicting a method executed by the system of FIG. 14 in processing consumer requests.
Figure 17B:
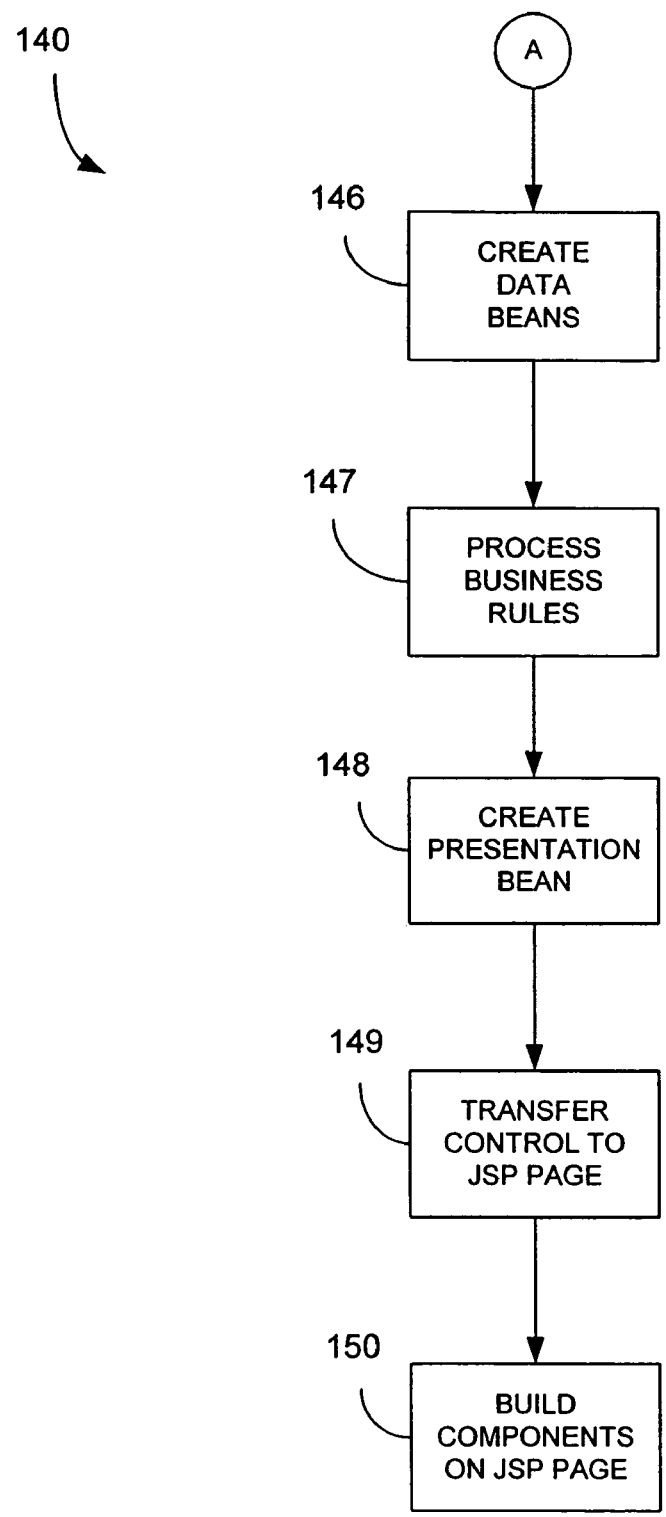

A control layer servlet 107 acts as a control layer and processes all requests received from consumers. The control layer servlet 107 is also responsible for forwarding control to a JSP page after all business logic related to a consumer action has been completed. A description of a process 140 by which a consumer moves from one JSP page to another will now be described with reference to FIGS. 17(A) and 17(B). At 141, the control layer servlet 107 receives a request from the consumer and processes the request, such as by using a doGet. The request can be any type of event that prompts the system 100 to perform some action, such as a consumer's request for a web page or an event that causes the system 100 to deliver information or commands. At 142, the control layer servlet 107 receives various parameters including command, which needs to be processed for displaying the other JSP page. At 143, the control layer servlet 107 retrieves from its global structure data regarding that command. The data regarding all of the commands is stored at the initialization of the control layer servlet 107 by reading an XML configuration file. At 144, some key data in the global structure is the JSP page to which control needs to be transferred after serving the request. Data in the global structure also includes presentation beans 108b that will need to be built for that JSP page. At 145, presentation beans 108b acquire the appropriate data beans 106f from the data manager interface 106d. The data manager interface 106d creates the data beans 106f if they are not available in the cache. The data access layer 106h is used to fill in the data that will be responsible for communicating with the database 103a. The presentation beans 106c process business rules, both presentation and non-presentation, related on the data at 147. At 148, a presentation bean 108b is created which contains HTML fragments for advertisements associated with all ad locations available on the JSP page. The ads themselves are retrieved using the advertisement interface 106c. At 149, after all of the presentation beans 108b have been built, control is transferred to the JSP page. At 150, the presentation beans 108b build dynamic components on the JSP page and static components are rendered as well.

E. Presentation Layer

Figure 18:
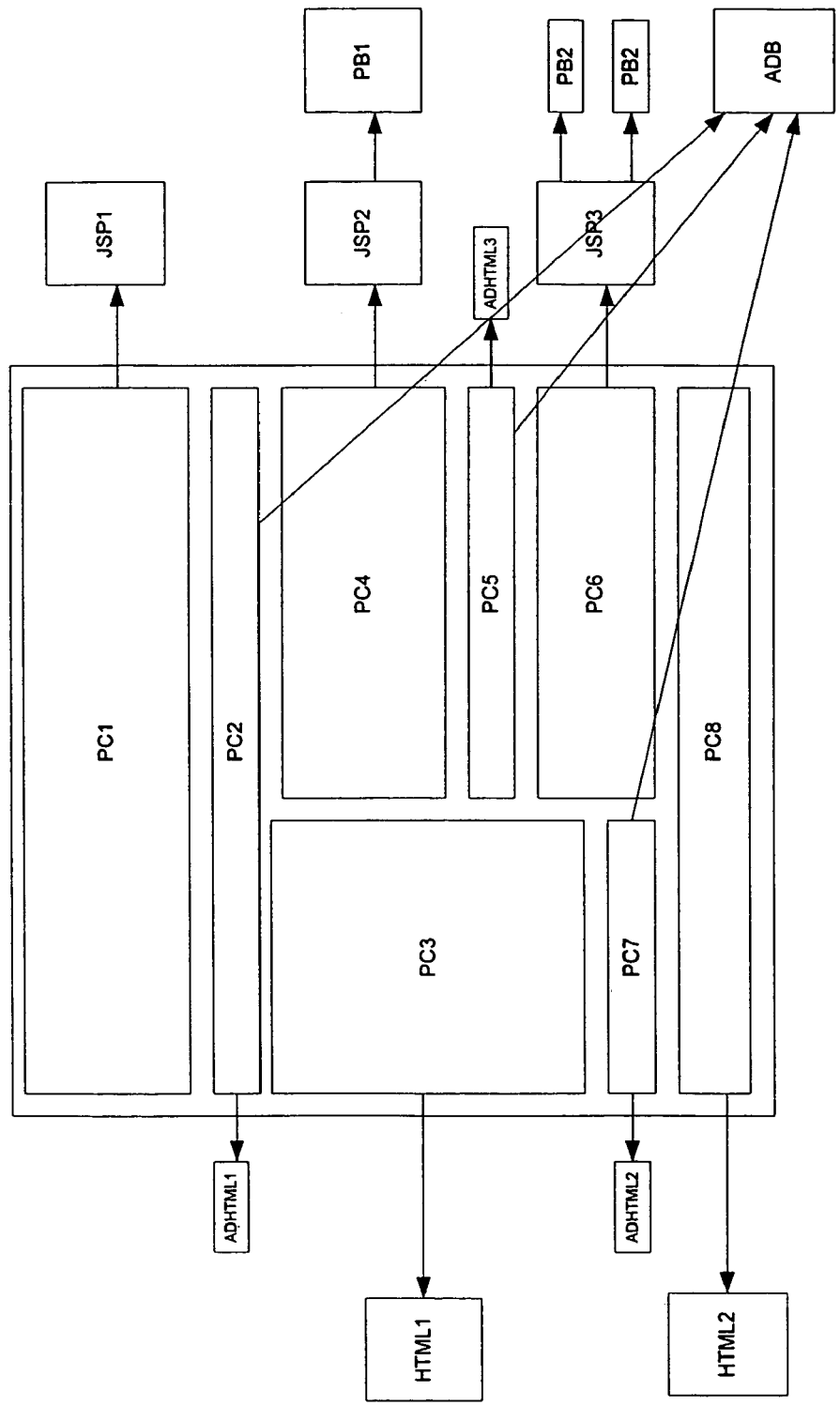
FIG. 18 is a diagram of a generic page delivered by the system of FIG. 14.

The presentation layer 108 will now be described in more detail in reference to FIG. 18. FIG. 18 is a diagram depicting a layout or template for a typical JSP page. The JSP page includes a plurality of presentation components, which in this example exist of presentation components PC1 to PC8. The description of the JSP page shown in FIG. 18 serves to illustrate the different types of presentation components and their interplay with HTML fragments, JSP fragments, presentation beans 108b, and advertisement beans. The actual JSP pages may use any combinations of these presentation components in delivering pages to consumers.

In the example shown in FIG. 18, presentation components PC3 and PC8 are static HTML fragments HTML1 and HTML2, respectively. If all of the presentation components on a page are HTML fragments, advertisements may be inserted using a plug-in interface instead of using the advertisement beans described below. The presentation components PC1, PC4, and PC6 are JSP fragments JSP1, JSP2, and JSP3, respectively. JSP fragment JSP1 is not associated with any presentation bean 108b but instead contains dynamic data retrieved using Java scriplets. JSP fragment JSP2 uses one presentation bean PB1 while JSP fragment JSP3 uses two presentation beans PB2 and PB3. The presentation beans provide dynamic data for the page, such as observations, weather forecasts, etc. Presentation components PC2, PC5, and PC7 are advertisement HTML fragments which are retrieved from an advertisement bean ADB. The advertisement HTML fragments are stored in the advertisement bean based on the position, which will be described in greater detail below.

A content developer can specify all of the presentation components, with the possible exception of the advertisement components, as well as the advertisement positions for a JSP page. The actual advertisements are preferably determined dynamically by the advertisement system 109. Preferably, non-Java content developers create all of the presentation components which can then be dragged and dropped onto a presentation page. The drag and drop of presentation components on a presentation page can be accomplished if the command factory 106a is implemented using an XML configuration file. This XML file is read at the load time and command objects 106b can be executed during the run time based on consumer input.

F. Command Framework

Figure 19:
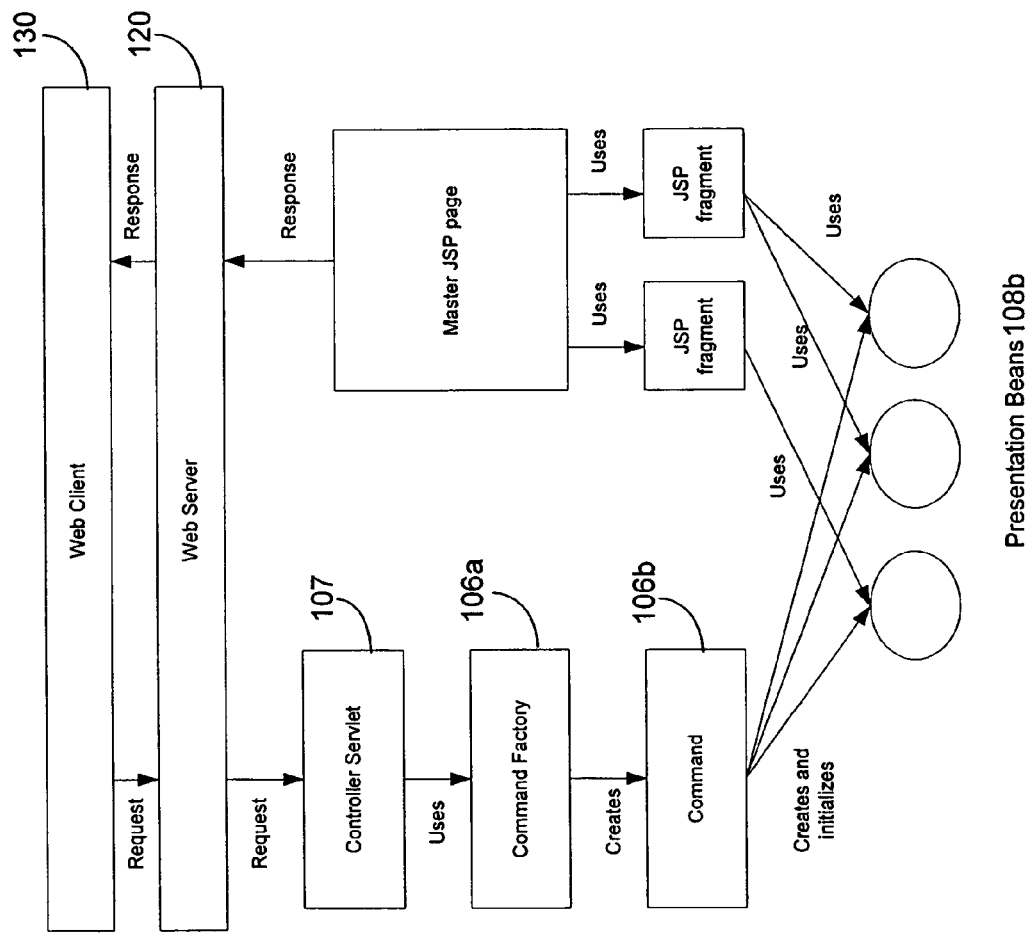
FIG. 19 is a diagram of a command framework used in the system of FIG. 14.

A command framework preferably used by the system 100 will now be described with reference to FIG. 19. With reference to FIG. 19, a consumer is displayed with an initial view, such as a home page, and the consumer then takes an action, which may include any combination of entering some data, clicking a link on the page, selecting a menu item, etc. By taking this action, the consumer receives a response from the system 100, such as a new view. For example, the consumer may enter a city and state and select the weather forecast for that region and the system 100 provides the consumer with the local weather page. A command corresponding to the consumer's action is passed as a parameter in a controller servlet 107 along with other parameters entered by the consumer. The controller servlet 107 calls a command factory 106a to create the command object 106b and passes all of the parameters entered by the consumer to the command 106b. The command object 106b performs the action intended by the consumer, such as creating a different view. Typically, the command object 106b creates and initializes presentation beans 108b to construct a JSP page which is displayed to the consumer.

G. Data Access Interface and Data Beans

Figure 20:
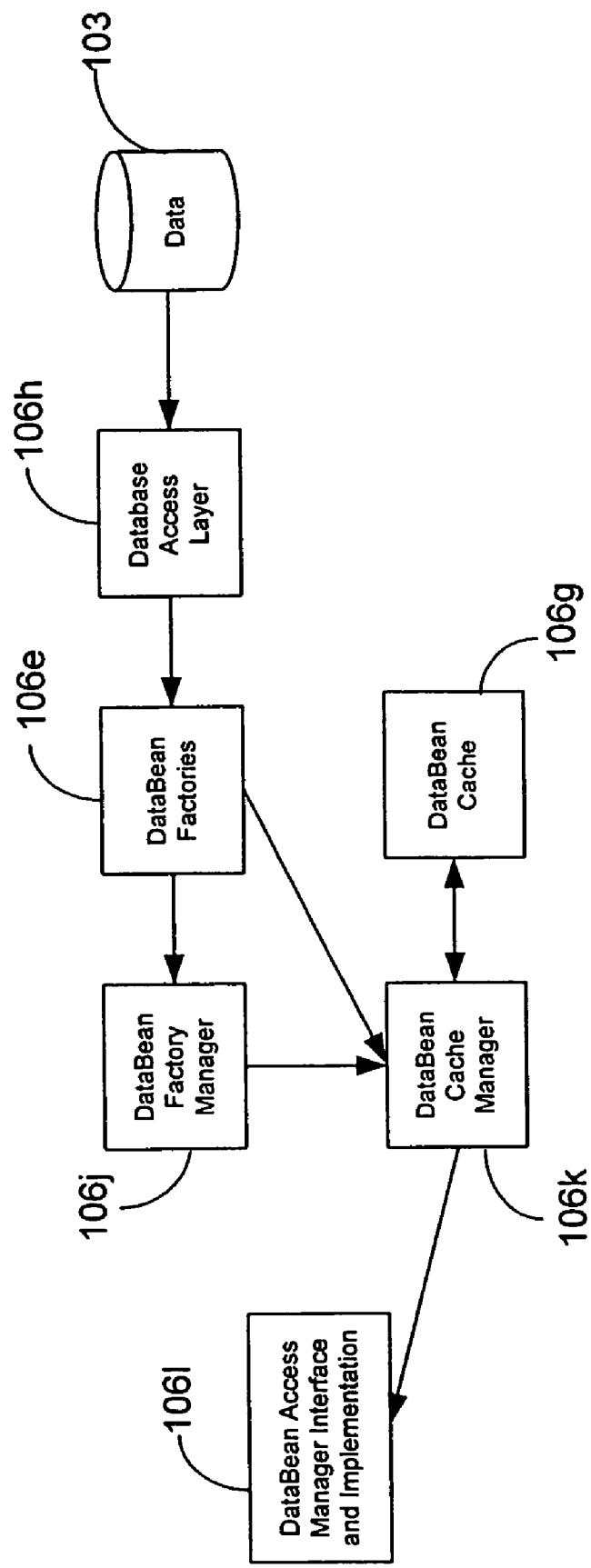
FIG. 20 is a more detailed block diagram of the data access layer shown in FIG. 14.

FIG. 20 provides a more detailed illustration of the data access layer 106. The database access layer 106 preferably maintains a pool of database connections using connection-pooling mechanism provided by JDBC 2.0 Standard Extension API. The database access layer 106 uses the Java Naming and Directory Interface (JNDI) and DataSource objects API as an alternative to using DriverManager objects to access relational data servers. Connection pooling eliminates overhead associated with establishing, maintaining, and dropping a database connection for every request and spreads the connection overhead across several user requests, conserving resources. Connection pooling also improves the performance by both identifying and terminating idle or orphaned connections. The data bean factories 106e are responsible for creating data beans 106f for an application and a particular factory 106e is responsible for creating a particular type of data bean 106f. For example, a data bean factory 106e for creating observation data bean 106f will create all observation data beans 106f. A data bean factory manager 106j is part of the data manager interface 106d and is used to manage the various data bean factories 106e. A data bean cache manager 106k is also part of the data manager interface 106d and is used in managing the data bean cache 106g. For example, the data bean cache manager 106k maintains all information regarding the data beans 106f that are placed within the cache 106g. The data bean cache 106g is preferably used to cache the most frequently used data beans 106f. A data bean access manager interface 1061 is part of the data manager interface 106d and provides a common interface for the rest of the system 100 to access the data beans 106f.

H. Business Logic and Presentation Beans

The presentation beans 108b process all of the business rules, both presentation and non-presentation related, for all of the other beans. For example, an observation presentation bean 108b processes all of the business rules related to observations. The business rules may include a non-presentation related rule such as displaying wind chill when temperature is less than a certain specified temperature and displaying heat index when the temperature is more than a second temperature. The presentation beans 108b also process format related rules, such as displaying time and data in a certain format. As discussed above, the business-related functionality separate from presentation functionality can be handled separately. For example, with the use of EJB, entity beans can be used to represent entities and session beans can be used to encapsulate the processes whereby presentation beans may be used to handle only the presentation-related logic.

I. Advertisement Interface Module

Figure 21:
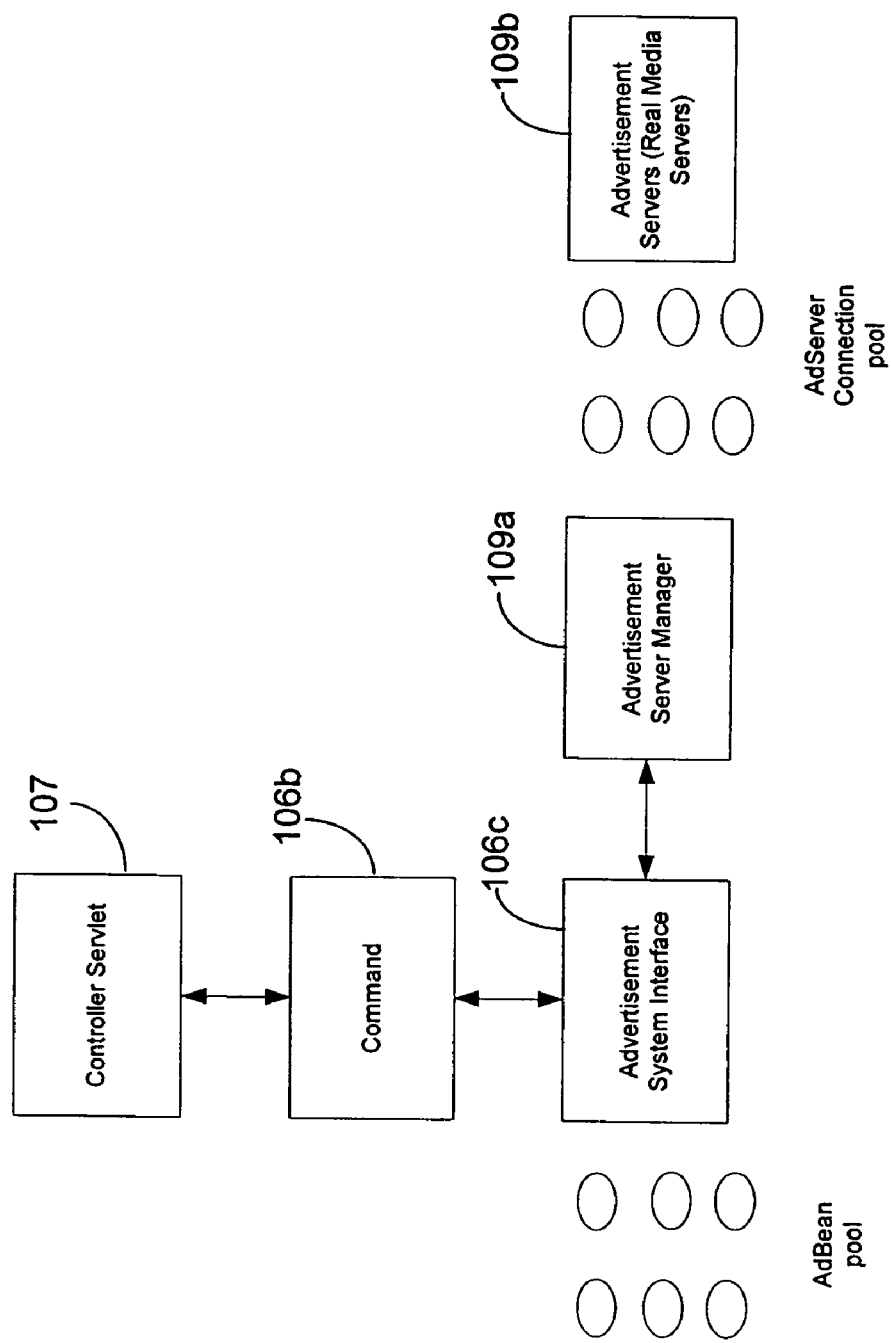
FIG. 21 is a more detailed block diagram of an interface to an advertisement system.

The system 100 preferably delivers advertisements that are targeted so as to command a greater value to the advertisers. The advertisements may be targeted in any one of a number of ways, such as based on the person, geography, weather conditions, product, and partner relationship. Accordingly, the advertisements are not static but rather are dynamically determined and retrieved. With reference to FIG. 21, the advertisement interface 106c is used to determine the advertisements and generates corresponding HTML fragments for those advertisements. The advertisements themselves are stored in servers 109b, such as Real Media Ad servers. These servers 109b deliver ads based on the product, location, weather, time, and consumer parameters. The advertisement interface 106c sends key words and data to an advertisement server manager 109a. The advertisement system interface 106c also receives a list of beans that are converted into an "AdList," which is a more developer-friendly container that contains a hashtable. The AdList is passed to JSP through the command object 106b, which pulls the appropriate advertisements by keyword from the list to display them. The advertisement interface 106c is preferably lightweight and abstract from the ad source and has extensions for bean pooling and the adaptation of new key words and data sources. A configuration of the advertisement system 109 and the product/ad location translation are configured by a properties file that can be used to add more servers 109b for load balancing and scalability.

The advertisement interface 106c may use any set of parameters to retrieve suitable advertisements from the advertisement servers 109b. These parameters may include the name of the site, such as www.weather.com, AOL.weather.com, etc., which can be used to specify desired language, co-brand, platform, etc. Another parameter may be a setup tag specified in a spoof URL, which may be used to indicate a product, country, state, direct marketing area, city, and zip code. The setup tag may also be used to specify the language of the site or the format of the information. Another parameter may be a position indicator, which may comprise a string of the name of ad positions for where the advertisement servers 109b need to provide advertisements.

Some of the other parameters that may be passed to the advertisement servers 109b through the advertisement system interface 106c are one or more keywords. The keywords can relate to weather conditions, such as rain, snow, cloud, clear, wind, or other keywords that specify sky conditions. As an example, the keyword may describe the current temperature such as hot, warm, cool, or cold. The keyword may also provide other information of interest in delivering targeted advertisement. For instance, the keyword may specify a referral domain, a client IP address, or a target cookie and a value of the cookie.

XI. Multi-Channel/Multi-Cobrand/Multi-Language Delivery

The system 100 preferably delivers information and services across multiple channels, in multiple co-brand relationships, and in multiple languages. Thus, with the system 100, a consumer can select any language and have the system 100 fulfill requests appropriate to that language. Also, the system 100 preferably provides a localized face or entry point for international consumers. In the preferred embodiment, the system 100 has a default based locale setting that can be changed by the consumer. The base locale determines what language is used to display and is determined according to the specific entry page the consumer uses to access the system 100. Both the content and advertisements are preferably tagged for the locale so that when the consumer navigates to some specific location, the content and advertisements will match that location. As mentioned above, however, the consumer is preferably able to change the default setting to a language or local of his or her preference.

For example, if the consumer enters the site via www-.weather.com, the default display language is set to English. If the user then navigates to the Paris, France local weather page, content modules that have been tagged for Paris would appear, but would still appear in English. If the user enters the site via tiempo.weather.com the system 100 sets the default display language to Spanish. If that user then visited the Paris, France local weather page, the consumer would receive contents and advertisements in Spanish. Also, if the consumer enters the site www.weather.com and changes the default display language from English to Spanish, the system 100 would provide the consumer with Spanish language content, even if the consumer goes to the Paris, France local weather page. The system 100 preferably has a plurality of entrance pages, such as deutschland.weather.com, uk.weather.com, and nippon.weather.com that effectively set the default display language. Also, the language preference that a particular consumer selects is preferably remembered from session to session so that the same language is displayed until the consumer makes another change. Consequently, the consumer need not go to a particular entrance point in order to obtain a desired language. The system 100 preferably not only selects the language but can also select a dialect or version of the language for a locale. For example, the English language may be further separated into Canadian English, US English, Australian English, U.K. English, etc.

The system 100 may deliver part or all of its information and services in a partner relationship, such as in a co-brand agreement. A co-brand can be a separate version of the information and services delivered from the system 100 which have modified branding in the header (1) and/or footer (7) sections of the page, such as the one shown in FIG. 1. For instance, a modified header section (1) can have a set of co-brand navigation links but could be combined with the same main content area section (6). Some examples of co-brands include The Weather Channel or weather.com in combination with AOL, Netscape, Earthlink, and CompuServe.

As discussed above, the presentation page is made from a plurality of presentation components PC. These presentation components can be, but need not necessarily be, JSP or HTML and can be divided into additional presentation components. A JSP or HTML fragment is associated with a presentation component and uses the presentation beans 108*b*. The command objects 106*b* create and initialize these presentation beans 108*b*, which use appropriate business or data objects. By putting the information about the presentation beans 108*b* and presentation pages into a file, such as an XML file, than the same command can be used with different presentations for different kind of channels, locale, co-brands, language, etc.

A presentation page can be defined in terms of its page descriptor, which contains the final presentation page information along with any needed parameters and all the components needed for that presentation page. A component prescriptor provides information about the components, such as class name and initialization information. By defining the presentation descriptor and component descriptors at compile time, an executable command, such as a class file, is created.

Figure 22:
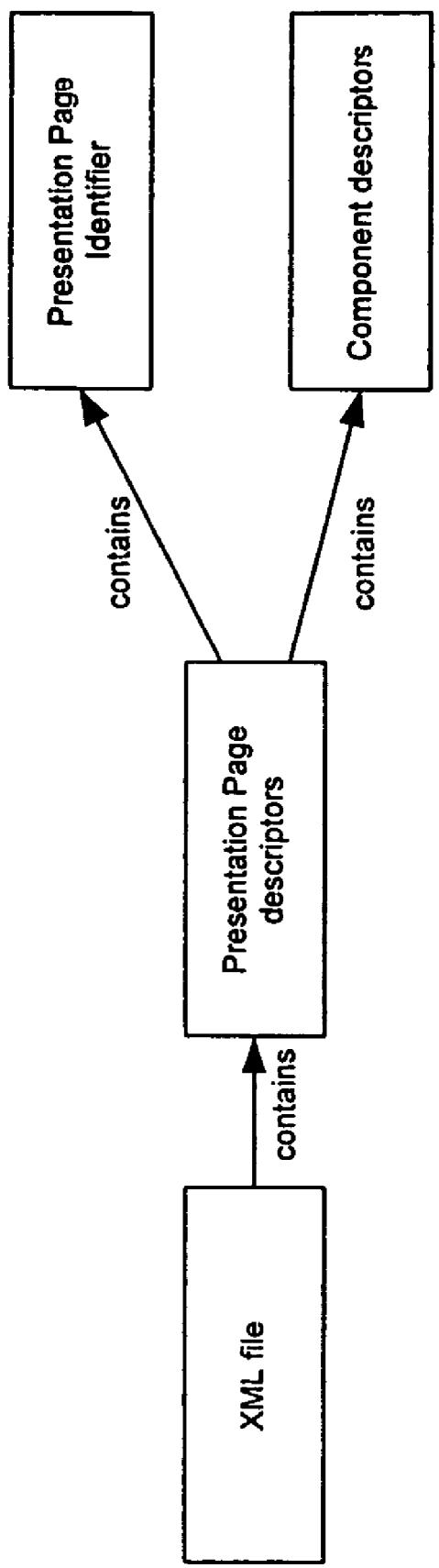
FIG. 22 is a conceptual diagram of a delivery method according to another embodiment of the invention.

Alternatively, rather than determining these descriptors at compile time, a run time interpretation is possible. A diagram of an XML file, presentation page descriptors, presentation page identifier and component descriptors is shown in FIG. 22. As represented by this diagram, the XML file contains the presentation page descriptors and the presentation page descriptors, in turn, contains the presentation page identifier and component descriptors.

XII. Alternate Embodiment

Figure 23:
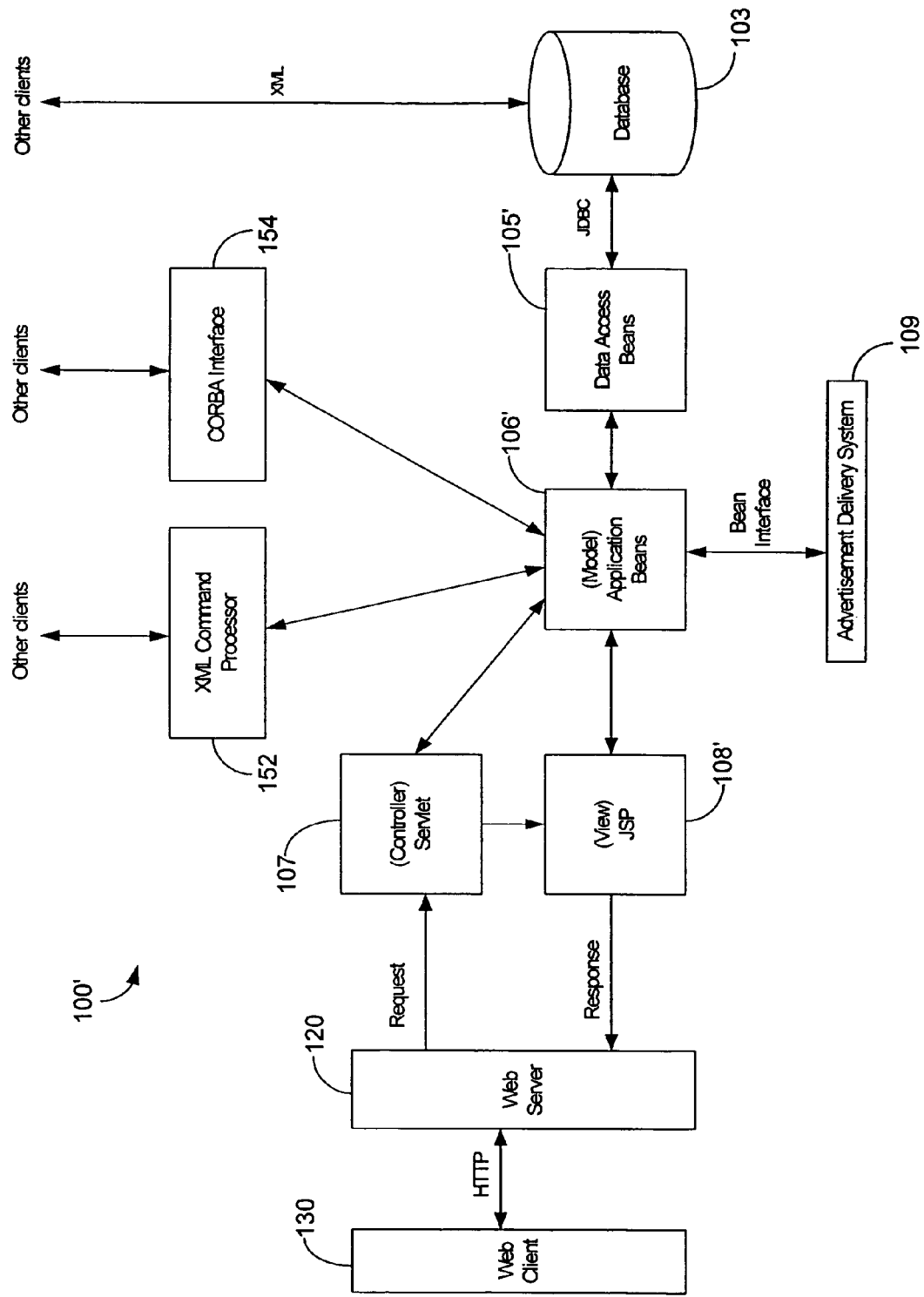
FIG. 23 is a block diagram of a system according to another embodiment of the invention.

In the system 100 described above, the application layer 106 contains business data and objects and a JSP layer represents only the presentation. The control layer 107 is also relatively thin with the resultant architecture allowing for the reuse of the same application layer 106 for various controllers and views. In an alternate embodiment shown in FIG. 23, a system 100' has an XML based command processor 152 which gives the command and various parameters to the system 100' and receives a response back in XML format. The web client 130 can use any controller and presentation desired. Also, the system 100' may have a CORBA interface 154 with appropriate interfaces surrounding the application layer 106'. A CORBA can therefore request application data using the CORBA interface 154. Additionally, the system 100' may have a direct XML feed directly from the database 103 to other systems.

XIII. Conclusion

The invention has generally been described with reference to a consumer requesting information. As a common example, the consumer requests information from a web site associated with the weather system and, in response to this request, the weather system delivers the information to the consumer. The request may therefore involve the consumer entering a domain name or clicking on a link. A request can also be generated when the consumer interacts with the product, such as when the consumer enters information on the PDA 116 to cause the PDA 116 to request weather information. The interaction sufficient to initiate the request may be as simple as the consumer providing power to the product, establishing communications with the product through the network, traveling to a new zone, or the issuance of a weather alert.

Furthermore, the weather system may make the information available to the consumer before the consumer actually makes the request. For example, the weather system may deliver information to a consumer through one of the TV products. This information may be broadcast to the consumer or downloaded to the consumer's product. As a result, when the consumer then later desires to have the information, the consumer can cause the product to change channel to receive the broadcast or the consumer can cause the information to be retrieved by the product. Additionally, the request may be automatically generated by the product without requiring any consumer action. Other types of requests for information are encompassed by the invention.

In the preferred embodiments, the request is sent through the Internet and the weather system delivers the information through the Internet. Thus, the request and the information are transmitted through the same network. It should be understood that the request and the information may be delivered through different networks. For example, the request may be delivered through the Internet to the weather system but then the weather system fulfills the request by delivering the information through a cable network. Additionally, the information that is transmitted to the consumer may be carried by more than one network. For instance, the weather system can deliver some information through a paging network to the consumer's pager, some other information through a cellular network to the consumer's PDA, and commands through the Internet to the consumer's home thermostat.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

We claim:

1. A weather system for use in providing weather information to consumers over the Internet, the system employing a navigational architecture having:
    a weather page for a geographical region;
    a set of pages contextually-related to each other and associated with the geographical region;
    the weather page including links to each one of the contextually-related pages;
    the set of contextually-related pages containing links to both the weather page and also to all other contextually-related pages; and
    the weather page and the set of contextually-related pages being arranged in a hub-and-spoke fashion with the weather page being a hub and the set of contextually-related pages being spokes,
    wherein from any one of the contextually-related pages or from the weather page, consumers can navigate directly to all other contextually-related pages or to the weather page.

2. The system as set forth in claim 1, wherein the contextually-related set of pages are related activities for the geographical region.

3. The system as set forth in claim 1, wherein the weather page includes a local forecast for the geographical region.

4. The system as set forth in claim 1, wherein contextually-related set of pages contain content for the geographical region.

5. A method of providing weather-related information to a user over a network comprising:
    providing a first hub web page associated with a first context and not associated with a second context and comprising (i) links for directly accessing each of a first group of spoke web pages and (ii) links for directly accessing each web page of a group of hub web pages;
    providing each web page of the first group of spoke web pages, wherein each web page of the first group of spoke web pages is associated with the first context and not associated with the second context and comprises (i) a link for directly accessing the first hub web page and (ii) a link for directly accessing each of the other web pages of the first group of spoke web pages;
    providing a second hub web page associated with the second context and not associated with the first context and comprising (i) links for directly accessing each of a second group of spoke web pages and (ii) links for directly accessing each other web page of the group of hub web pages; and
    providing each web page of the second group of spoke web pages, wherein each web page of the second group of spoke web pages is associated with the second context and not associated with the first context and comprises (i) a link for directly accessing the second hub web page and (ii) a link for directly accessing each of the other web pages of the second group of spoke web pages.

6. The method of claim 5, wherein the first hub web page is a weather page for a geographical region and the first context is the geographical region.

7. The method of claim 6, wherein at least one of the first group of spoke web pages relates to an activity for the geographical region.

8. The method of claim 6, wherein at least one of the first group of spoke web pages relates to a weather-related health topic for the geographical region.

9. The method of claim 6, wherein the second hub web page is a weather page for a geographical region different from the geographical region of the first hub web page.

10. A method of permitting navigation through a weather site on the Internet, comprising:
    allowing a consumer to select from any one or a combination of a plurality of navigational modes available at the weather site, the navigation modes including at least two from the group comprising:
        navigating through a geographical architecture provided by the weather site in which weather information is arranged in a hierarchical manner;
        navigating through a categorical architecture in which weather information is grouped by category;
        navigating through a contextual architecture in which information is organized into contextually-related groups of pages;
        navigating through a temporal architecture in which information is interrelated chronologically;
    receiving a first request from the consumer through one of the navigation modes, the request including a first constraint for allowing the consumer to move within a selected one of the architectures;
    delivering a first set of information to the consumer in response to the request and the first constraint;
    permitting the consumer to switch to a second navigation mode;
    receiving a second request from the consumer through the second navigation mode, the second request including a second constraint for allowing the consumer to move within the second architecture; and
    delivering a second of information to the consumer in response to the second request;
    wherein the second set of information delivered to the consumer is selected based on both the first constraint and the second constraint.

11. The method as set forth in claim 10, wherein receiving the first request is through the geographical architecture, the first constraint is a geographical region, the second request is through the contextual architecture, and the second constraint is an activity and wherein delivering the second set of information comprises delivering information on the activity within the geographical region.

12. The method as set forth in claim 10, wherein receiving the first request is through the geographical architecture, the first constraint is a geographical region, the second request is through the categorical architecture, and the second constraint is a type of weather data and wherein delivering the second set of information comprises delivering the type of weather data for the geographical region.

13. The method as set forth in claim 10, wherein receiving the first request is through the geographical architecture, the first constraint is a geographical region, the second request is through the categorical architecture, and the second constraint is a category of data and wherein delivering the second set of information comprises delivering the category of data associated with the geographical region.

14. The method as set forth in claim 10, wherein receiving the first request is through the categorical architecture, the first constraint is a category of data, the second request is through the temporal architecture, and the second constraint is a time period and wherein delivering the second set of information comprises delivering information on the category of data for the time period.

15. The method as set forth in claim 10, wherein receiving the first request is through the categorical architecture, the first constraint is a category of data, the second request is through the geographical architecture, and the second constraint is a geographical region and wherein delivering the second set of information comprises delivering the category of information associated with the geographical region.

16. The method as set forth in claim 10, wherein receiving the first request is through the contextual architecture, the first constraint is an activity , the second request is through the geographical architecture, and the second constraint is a geographical region and wherein delivering the second set of information comprises delivering information on the activity for the geographical region.

17. The method as set forth in claim 10, wherein receiving the first request is through the contextual architecture, the first constraint is an activity, the second request is through the temporal architecture, and the second constraint is a period of time and wherein delivering the second set of information comprises delivering information on the activity for the period of time.

\* \* \* \* \*